（12） United States Patent
Lu et al.

(10) Patent No.: US 9,845,012 B2
(45) Date of Patent: Dec. 19, 2017

(54) SYSTEM AND METHOD FOR PREDICTING MECHANICAL FAILURE OF A MOTOR

(75) Inventors: Yinghui Lu, Erie, PA (US); Ajith Kuttannair Kumar, Erie, PA (US)

(73) Assignee: General Electric Company, Schenectady, NY (US)

( * ) Notice: Subject to any disclaimer, the term of this patent is extended or adjusted under 35 U.S.C. 154(b) by 1256 days.

(21) Appl. No.: 13/537,706

(22) Filed: Jun. 29, 2012

(65) Prior Publication Data

US 2013/0013138 A1 Jan. 10, 2013

Related U.S. Application Data

(63) Continuation-in-part of application No. 13/176,828, filed on Jul. 6, 2011, now Pat. No. 9,050,894.

(60) Provisional application No. 61/553,837, filed on Oct. 31, 2011.

(51) Int. Cl.
*G01R 31/00* (2006.01)
*B60G 17/00* (2006.01)
*B60L 3/00* (2006.01)

(52) U.S. Cl.
CPC ......... *B60L 3/0061* (2013.01); *B60L 2200/26* (2013.01); *B60L 2220/42* (2013.01); *B60L 2240/421* (2013.01); *B60L 2240/423* (2013.01); *B60L 2260/50* (2013.01); *Y02T 10/648* (2013.01); *Y02T 10/84* (2013.01)

(58) Field of Classification Search
CPC ............. B60L 2200/26; B60L 2220/42; B60L 2240/423; B60L 3/0061
USPC ........ 702/58, 132, 189, 34, 198; 701/20, 22, 701/39
See application file for complete search history.

(56) References Cited

U.S. PATENT DOCUMENTS

| 4,953,068 | A | 8/1990 | Henze |
| 5,726,905 | A | 3/1998 | Yazici |
| 6,185,111 | B1 | 2/2001 | Yoshida |
| 6,421,618 | B1 * | 7/2002 | Kliman et al. .................. 702/58 |
| 6,600,979 | B1 * | 7/2003 | Kumar et al. .................. 701/20 |
| 6,727,725 | B2 | 4/2004 | Devaney |

(Continued)

FOREIGN PATENT DOCUMENTS

| CL | 15831995 | 5/1997 |
| CL | 23012012 | 8/2012 |

(Continued)

OTHER PUBLICATIONS

M. Djeddi et al., Bearing Fault Diag. In Induct. Mach. Based on Current Analysis Using High-Res. Technique, Diags. For Elec. Machs., Sep. 6-8, 2007, pp. 23-28.

(Continued)

*Primary Examiner* — Eman Alkafawi
(74) *Attorney, Agent, or Firm* — Global Patent Operation; John A. Kramer

(57) ABSTRACT

A method for predicting mechanical failure of a traction motor in a vehicle includes monitoring first characteristics of an electrical signal supplied to a traction motor of a vehicle during a first detection window. The first characteristics represent a first motor electrical signature for the traction motor. The method also includes deriving one or more signature values from a first mathematical model of the first motor electrical signature and predicting a mechanical failure of the traction motor based on the one or more signature values.

29 Claims, 16 Drawing Sheets

(56) References Cited

U.S. PATENT DOCUMENTS

| | | | |
|---|---|---|---|
| 6,795,935 B1* | 9/2004 | Unkle et al. | 714/37 |
| 6,834,256 B2* | 12/2004 | House et al. | 702/181 |
| 7,184,930 B2 | 2/2007 | Miyasaka et al. | |
| 7,280,941 B2* | 10/2007 | Bonanni et al. | 702/189 |
| 2001/0035049 A1* | 11/2001 | Balch et al. | 73/488 |
| 2004/0162696 A1 | 8/2004 | Kumar | |
| 2005/0189886 A1 | 9/2005 | Donnelly et al. | |
| 2005/0267702 A1* | 12/2005 | Shah et al. | 702/81 |
| 2007/0001629 A1* | 1/2007 | McGarry et al. | 318/52 |
| 2007/0013232 A1* | 1/2007 | McNally et al. | 307/10.1 |
| 2007/0139975 A1 | 6/2007 | Yamauchi et al. | |
| 2009/0096405 A1 | 4/2009 | Flickinger et al. | |
| 2009/0100293 A1* | 4/2009 | LaComb et al. | 714/26 |
| 2009/0243647 A1* | 10/2009 | Chari et al. | 324/772 |
| 2010/0071469 A1* | 3/2010 | Luo et al. | 73/593 |
| 2010/0169030 A1 | 7/2010 | Parlos | |
| 2011/0249472 A1 | 10/2011 | Jain et al. | |
| 2013/0013231 A1* | 1/2013 | Banerjee et al. | 702/58 |
| 2013/0278298 A1 | 10/2013 | Curbelo et al. | |

FOREIGN PATENT DOCUMENTS

| | | |
|---|---|---|
| CN | 1233325 A | 10/1999 |
| CN | 1988349 A | 6/2007 |
| CN | 101087125 A | 12/2007 |
| CN | 101319966 A | 12/2008 |
| CN | 101413991 A | 4/2009 |
| CN | 202218161 U | 5/2012 |
| WO | 9749977 A1 | 12/1997 |
| WO | 2011072879 A2 | 6/2011 |

OTHER PUBLICATIONS

P. Jayaswal at al., Machine Fault Signature Analysis, Int'l J. of Rotating Mach. (v. 2008), 10 pages, Hindawi Pub. Corp.

J. Royo at al., Mach. Current Sig. Analysis As A Way for Fault Detect. In Perm. Mag. Motors in Elevators, Proc. of 2008 Int'l Conf. on Elec. Machs., (2008).

Search Report and Written Opinion from corresponding PCT Application No. PCT/US2012/045644 dated Dec. 4, 2012.

Unofficial English translation of Office Action issued in connection with corresponding CN Application No. 201280033496.1 on Jun. 3, 2015.

Unofficial English Translation of Chile Office Action issued in connection with Related CL Application No. 2592-2013 on Aug. 13, 2015.

Unofficial English Translation of Chile Office Action issued in connection with Related CL Application No. 2592-2013 on Mar. 28, 2016.

Unofficial English Translation of Chinese Office Action issued in connection with Corresponding CN Application No. 201280033496.1 on Mar. 31, 2016.

Unofficial English Translation of Chinese Office Action issued in connection with Corresponding CN Application No. 201280033496.1 on Dec. 7, 2016.

Unofficial English Translation of Chinese Office Action issued in connection with Related CN Application No. 201310418230.5 on Dec. 14, 2016.

* cited by examiner

SYSTEM AND METHOD FOR PREDICTING MECHANICAL FAILURE OF A MOTOR

CROSS-REFERENCE TO RELATED APPLICATIONS

This application claims priority benefit to U.S. Provisional Application No. 61/553,837, which was filed on 31 Oct. 2011 (the "'837 Application"). This application also is a continuation-in-part of U.S. application Ser. No. 13/176,828, which was filed on 6 Jul. 2011 (the "'828 Application"). The entire disclosures of the '837 Application and the '828 Application are incorporated by reference.

BACKGROUND

One or more embodiments of the subject matter described herein relate to electric motors, such as traction motors of a vehicle. While certain embodiments are described in terms of traction motors of a locomotive or other rail vehicle, the subject matter described herein also may apply to other off-highway vehicles (OHV) or other vehicles more generally.

Known vehicles may include several electric motors, such as three-phase alternating current (AC) traction motors, that receive three-phase AC to power the motors. With respect to each motor, different phases of the current are passed to different conductive coils disposed in a stator of the motor. The current generates a magnetic field in the stator and causes a rotor of the motor to rotate within the stator. The rotor may be coupled with an axle or wheel of the vehicle by one or more gears or other couplings. Rotation of the rotor causes rotation of the axle and wheel to propel the vehicle.

Several mechanical components may be used to enable rotation of the rotor within the stator of the motor. For example, bearings may be disposed between the rotor and the stator to center the rotor in the stator and allow the rotor to rotate at relatively high speeds within the stator. Gears and/or other coupling components may be coupled with the rotor to translate rotation of the rotor to rotation of an axle or wheels. Over time, one or more of the bearings, gears, and/or other coupling components may begin to fail. For example, friction between a bearing and the rotor or stator, friction between gears, and/or friction between two or more other components of the motor may increase as the bearing, gear, or other component begins to mechanically fail. If the motor having the failing bearing, gear, or other component is not identified in time, the failing bearing, gear, or other component may seize or lock up and cause the motor to fail. Once the motor fails, the motor can no longer operate to propel the vehicle.

Some known systems and methods use additional sensors that are added to the motors of a vehicle to determine if the motor is tending toward failure, such as by a failing bearing, gear, or other component. However, the addition of these sensors can increase the cost and/or maintenance required for the vehicles. Moreover, some of these known sensors may be unable to accurately distinguish between a motor that is tending toward failing and external noise, such as uneven surfaces, tracks, and the like, that the vehicle is traveling over. For example, the uneven surfaces can cause the sensors to detect false positive identifications of a motor tending toward failure.

A need exists for a system and method for predicting impending mechanical failure of an electric motor that does not significantly add to the cost and/or maintenance of the vehicle and/or can accurately distinguish between failing motors and external noise of the system.

BRIEF DESCRIPTION

In one embodiment, a method for a vehicle having plural electric motors includes generating motor electrical signatures for the motors. The motor electrical signatures can be representative of one or more characteristics of electrical energy that is supplied to the motors. Each motor may be a same type of motor and/or includes a same type of bearing (such as a pinion-end bearing or other type of bearing) as the other motors. ("Same type" means the motors have one or more of the following characteristics: the same manufacturer part or part number; the same non-trivial electrical or mechanical characteristics, such that one motor or bearing could be swapped out for another without re-work of the motor or vehicle interface; or sufficiently similar electrical or mechanical characteristics such that the motors and bearings could be compared, according to the aspects of the inventive subject matter described herein, with successful results.) The method further comprises identifying one or more fault measures of each of the motor electrical signatures. The fault measures are indicative of mechanical characteristics of the bearings of the motors. The method further comprises performing a comparison the one or more fault measures of each motor with the one or more fault measures of the other motors in the same vehicle. The method further comprises predicting a mechanical failure of one or more of the motors based on the comparison. A mechanical failure can include an event or failure of one or more components coupled to or interconnected with the motors that causes dysfunction of a propulsion system or subsystem that includes the motors to provide traction that propels the vehicle. Examples of mechanical failure include a locked axle of a traction motor, a seized bearing, and the like.

In another embodiment, a method for a vehicle having plural electric motors includes generating motor electrical signatures for the motors. The motor electrical signatures represent one or more characteristics of electrical energy that is supplied to the motors. The method also includes identifying one or more fault measures of each of the motor electrical signatures. The fault measures are indicative of mechanical characteristics of the motors. The method, further includes comparing the one or more fault measures of each motor with the one or more fault measures of the other motors in the same vehicle and predicting an impending mechanical failure of one or more of the motors based on comparing the fault measures of the motors.

In another embodiment, a failure prediction system includes an input/output (I/O) module, a signature generation module, and an analysis module. As used herein, the terms "unit" or "module" include a hardware and/or software system that operates to perform one or more functions. For example, a unit or module may include one or more computer processors, controllers, and/or other logic-based devices that perform operations based on instructions stored on a tangible and non-transitory computer readable storage medium, such as a computer memory. Alternatively, a unit or module may include a hard-wired device that performs operations based on hard-wired logic of a processor, controller, or other device. In one or more embodiments, a unit or module includes or is associated with a tangible and non-transitory (e.g., not an electric signal) computer readable medium, such as a computer memory. The units or modules shown in the attached figures may represent the hardware that operates based on software or hardwired instructions, the computer readable medium used to store and/or provide the instructions, the software that directs hardware to perform the operations, or a combination thereof.

The I/O module is configured to determine one or more characteristics of electrical energy that is supplied to plural electric motors in a vehicle. The signature generation module is configured to create motor electrical signatures for the motors. The motor electrical signatures represent the characteristics of the electrical energy supplied to the motors. The analysis module is configured to determine one or more fault measures of the motor electrical signatures of one or more of the motors. The fault measures are indicative of mechanical characteristics of one or more of the motors. The analysis module also is configured to compare the fault measures of each motor with the fault measures of the other motors in the same vehicle and predict an impending mechanical failure of one or more of the motors based on comparing the fault measures of the motors.

In another embodiment, a computer readable storage medium for a system having a processor is provided. The computer readable storage medium includes one or more sets of instructions that direct the processor to generate motor electrical signatures for plural electric motors of a common vehicle. The motor electrical signatures are representative of one or more characteristics of electrical energy that is supplied to the motors. The one or more sets of instructions also direct the processor to identify one or more fault measures of each of the motor electrical signatures. The fault measures are indicative of mechanical characteristics of the motors. The one or more sets of instructions also direct the processor to compare the one or more fault measures of each motor with the one or more fault measures of the other motors in the same vehicle and predict an impending mechanical failure of one or more of the motors based on comparing the fault measures of the motors.

In another embodiment, a method for a vehicle having plural electric motors includes obtaining respective electrical signatures of the plural electric motors. The electrical signatures relate to respective electrical energy supplied to the motors. The method also includes performing a comparison of the electrical signature of one of the motors to the electrical signatures of the other motors in the same vehicle, determining an impending mechanical failure of said one of the motors based on the comparison, and communicating a signal in response to determining the impending mechanical failure.

In another embodiment, a diagnostics method includes receiving a first signal relating to an automatic on-board determination of an impending mechanical failure of one of a plurality of motors of a vehicle and at least one of the following steps, in response to receiving the first signal: scheduling a maintenance operation for the vehicle, generating second signals for controlling the vehicle to at least one of stop the vehicle or cause the vehicle to travel to a designated maintenance facility, generating an alert signal relating to the impending mechanical failure, or generating information relating to performing the maintenance operation.

Another embodiment relates to a method for a vehicle having plural electric motors. The method comprises a step of generating motor electrical signatures of the motors (e.g., a respective motor electrical signature is generated for each motor) based on one or more characteristics of respective electrical energy that is supplied to the motors. The method further comprises identifying or otherwise determining one or more fault measures of the motor electrical signatures. The fault measures are indicative of mechanical characteristics of the motors, e.g., they are potentially indicative of impending mechanical failures of the motors. The method further comprises comparing the one or more fault measures of each motor with the one or more fault measures of the other motors in the same vehicle. The method further comprises predicting an impending mechanical failure of one or more of the motors based on comparing the fault measures of the motors. The steps may be carried out automatically, using a processor-based system (e.g., controlled via software) or other electronic system. In one aspect, predicting an impending mechanical failure includes generating an output signal indicative of the impending mechanical failure. The output signal may be a vehicle control signal that is used by the vehicle to automatically change tractive effort and/or braking effort of the vehicle, and/or to notify an operator of the vehicle to change the tractive effort and/or the braking effort of the vehicle.

Another embodiment relates to a method for a vehicle having plural electric motors (e.g., plural traction motors for propelling the vehicle). The method comprises a step of obtaining, for each motor, a measurement relating to electrical energy that is supplied to the motor. The method further comprises performing a comparison of the measurements of the motors to one another. The method further comprises predicting an impending mechanical failure of at least one of the motors based on the comparison. In an embodiment, the prediction of an impending mechanical failure is based only on the comparison of the plural motors. In another embodiment, the measurement for each motor is a frequency spectrum of the electrical energy supplied to the motor, and the comparison is of subharmonic portions of the frequency spectrum.

In another embodiment, a method (e.g., a method for predicting failure of a traction motor in a vehicle) includes monitoring first characteristics of an electrical signal supplied to a traction motor of a vehicle during a first detection window. The first characteristics can represent measurements of the electric current supplied to the traction motor and can be used to generate a first motor electrical signature representative of the current supplied to and/or demanded by the traction motor. The method also includes deriving one or more signature values from a first mathematical model of the first motor electrical signature and predicting a mechanical failure of the traction motor based on the one or more signature values.

In another embodiment, a system (e.g., a system for predicting mechanical failure of a traction motor in a vehicle) includes a signature generation module and an analysis module. The signature generation module is configured to monitor first characteristics of an electrical signal supplied to a traction motor of a vehicle during a first detection window. The first characteristics represent a first motor electrical signature for the traction motor. The analysis module is configured to determine a first mathematical model of the first motor electrical signal and to derive one or more signature values from the first mathematical model. The analysis module is further configured to predict a mechanical failure of the traction motor based on the one or more signature values.

In another embodiment, another method for a vehicle having plural electric, motors is provided. The method includes generating motor electrical signatures for the motors. The motor electrical signatures represent one or more characteristics of electrical energy that is supplied to the motors. Each motor may be a same type of motor and/or include a same type of bearing (such as pinion-end bearing) as the other motors. The method also includes identifying one or more fault measures of each of the motor electrical signatures. The fault measures are indicative of mechanical characteristics of the bearings of the motors. The method also includes performing a comparison of the one or more fault measures of each motor with the one or more fault measures of the other motors in the same vehicle and predicting a mechanical failure of the bearing of one of the motors based on the comparison.

BRIEF DESCRIPTION OF THE DRAWINGS

The present subject matter will be better understood from reading the following description of non-limiting embodiments, with reference to the attached drawings, wherein below.

DETAILED DESCRIPTION

Figure 1:
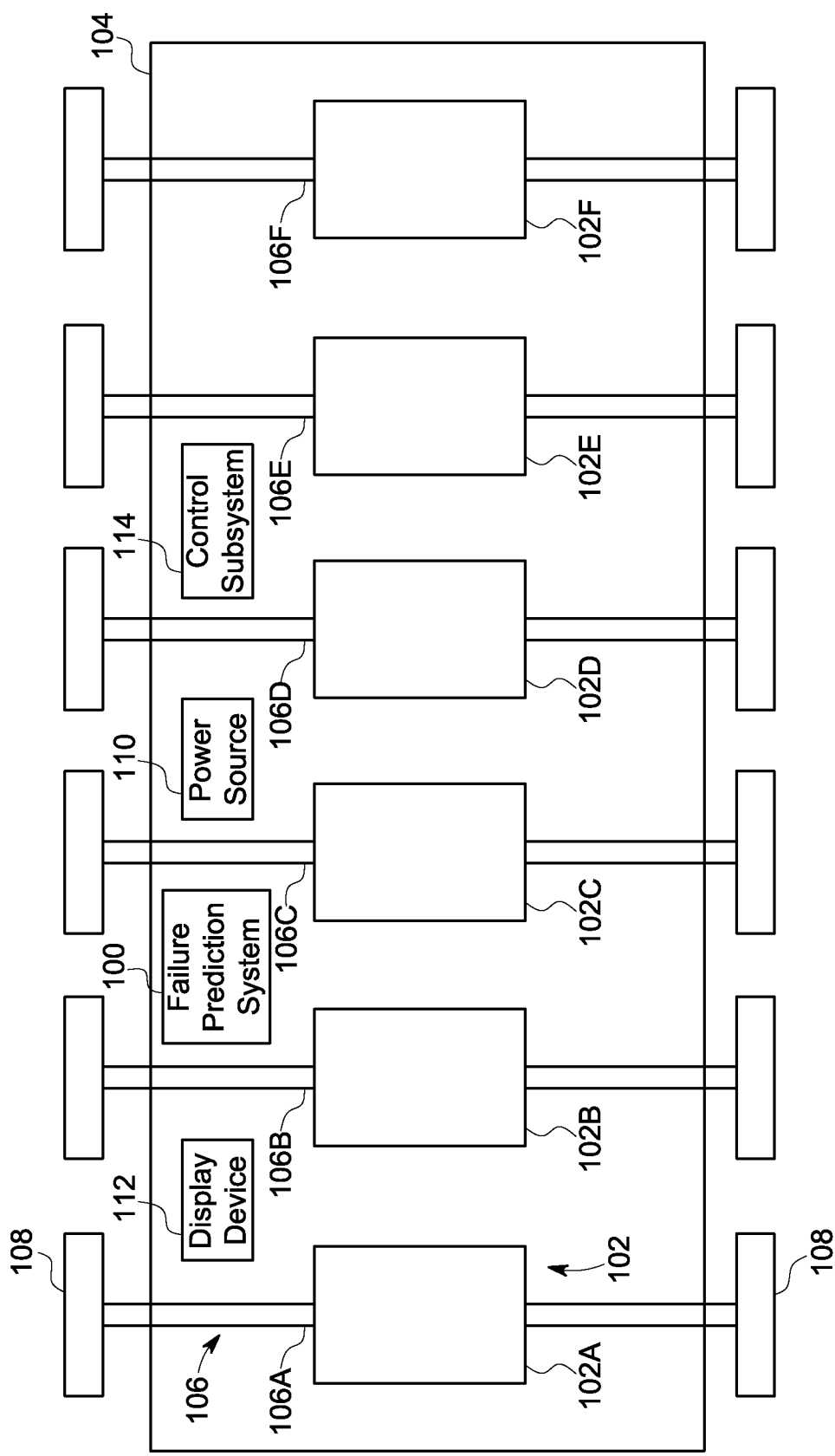
FIG. 1 is a schematic diagram of one embodiment of a failure prediction system.

Reference will be made below in detail to embodiments of the inventive subject matter, examples of which are illustrated in the accompanying drawings. Wherever possible, the same reference numerals used throughout the drawings refer to the same or like parts. Although example embodiments of the inventive subject matter are described with respect to three phase alternating current electric motors for vehicles, embodiments also may be applicable for use with electric motors generally.

At least one embodiment described herein relates to a system and method that monitors electric energy (e.g., electric signals such as electric current and/or voltage, inductance, or any combination thereof) that is supplied to an electric motor (e.g., a traction motor), such as to power the motor. The signals are monitored to measure characteristics of the signals. A variety of characteristics representative of the electric energy can be measured. These electric characteristics can include the frequency of one or more phases of current supplied to the motor and/or the voltage of the current supplied to the motor. Alternatively, other characteristics of the signals can be measured, such as phases or relative phases (e.g., between different phases of a multi-phase current supplied to the motor), changes (e.g., shifts) in one or more phases of the current supplied to the motor, inductances of the motors and/or conductive pathways to the motors, impedances of the motors and/or conductive pathways to the motors, resistances of the motors and/or conductive pathways to the motors, electric power (e.g., watts) supplied to the motors, the frequency of one or more harmonics of the current supplied to the motors, and the like.

Alternatively, other signals, such as temperature signals (representative of temperatures of one or more components of the motor or components connected with the motor), vibration signals (representative of movements of one or more components of the motor or connected with the motor), and the like, may be monitored. The characteristics that are measured of such signals can include temperature measurements, frequencies of vibration, magnitude of vibration, duration of vibration, and the like. In another embodiment, the characteristics of the motor that are measured can be operating or output characteristics of the motors 102, such as motor speed, torque generated by the motors 102, and the like.

The characteristics can be monitored while the motors operate, such as while the motors propel or act to propel a vehicle along a route. Signatures of the motors can be generated from the characteristics. The signatures may be referred to as motor electrical signatures and include representations of one or more characteristics of the electrical energy. Alternatively, the signatures may represent the non-electric characteristics (e.g., temperature, vibration, motor speed, torque, and the like) of the motor over time.

As one example, a signature can be a frequency spectrum of one or more of the three phases of current or voltage that is supplied to a three-phase AC motor. In another example, the signature can be a time-varying inductance characteristic of the motor. Alternatively, another type of signature can be generated based on the energy that is supplied to the motor. The signatures that represent electric characteristics of the motor can be referred to as motor electrical signatures or electrical signatures.

The signature of a motor can represent all of the characteristics of the motor that are obtained over a period of time or a subset of the characteristics. For example, a motor electrical signature of a motor can include a frequency spectrum of the current supplied to the motor when operational parameters fall within a detection window (as described below). Alternatively, the signature of the motor can include only a subset of this frequency spectrum, such as a peak of interest in the frequency spectrum.

Signature values can be measured from the signatures. Signature values can be measured directly from the signature (e.g., a location or frequency of a peak in the signature that is a frequency spectrum, the amplitude of the peak, the width of the peak, and the like) or can be derived from the signature (e.g., by fitting one or more mathematical models to the characteristics in the signature, determining which of the models matches the characteristics better than one or more, or all, of the other models, and identifying one or more parameters of the model as the fault measure or signature values). Signature values may alternatively be referred to herein as fault measures of the motors.

The signature values (or fault measures) can represent or indicate one or more mechanical characteristics of a motor. For example, a signature value or fault measure can indicate a potential impending mechanical failure of the motor, a trend in the characteristic that may indicate potential impending mechanical failure of the motor, or another mechanical characteristic of the motor. As described herein, the signature values or fault measures can be used to predict or determine if a motor has a mechanical fault that may lead to failure or the motor. This prediction can be useful when direct detection of failure would otherwise require or involve substantial maintenance on the motor, such as by taking the motor off-line or off the vehicle for inspection or taking apart. For example, where a bearing or other component of the motor has cracked or is otherwise damaged, but is still capable of operating to propel the vehicle, the signature values or fault measures can be used to identify this mechanical failure before the failure becomes so catastrophic that the motor entirely fails or necessitates taking the motor off-line for repair or replacement.

The signature values or fault measures may be used as failure precursors that quantify potential damage of one or more components of the motor or that are connected or interconnected to the motor. Failure precursors may represent damage (e.g., relatively small and/or insignificant damage) to the motor that allow the motor to continue to perform (e.g., provide tractive effort), but that may eventually lead to an early termination to the service life of the motor. The signature values or fault measures can be used to predict or determine when a motor will mechanically fail. For example, the signature values or fault measures can be tracked over time and one or more trends in the data of the signature values or fault measures can be identified. These trends can be useful in predicting a remaining service life of a motor, such as the time remaining before the motor will or is likely to mechanically fail. Based on this information, the use of the motor and/or repair or maintenance of the motor can be scheduled ahead of time at a time and location that is more convenient than may otherwise be necessary if the motor unexpectedly fails.

In one embodiment described herein, different signature values (e.g., based on different signatures representative of different characteristics) can be combined with each other to determine representative signature values of the motors. For example, a first signature value that is based on a first electrical characteristic of a motor, a second signature value that is representative of a different, second electrical characteristic of the motor, a third signature value that is representative of a different, third mechanical characteristic (e.g., temperature, vibration, speed, torque, and the like) may be combined (e.g., linearly combined) with each other to derive representative signature values of the motors. The representative signature values can be used to predict mechanical failure of the motor and/or when the mechanical failure will or is likely to occur, as described above.

In a vehicle having several motors, such as a locomotive having plural three-phase AC motors or a mining dump truck having multiple AC motors, motor electrical signatures may be generated for each motor. The motor electrical signatures are examined to obtain fault measures, signature values, and/or representative signature values associated with different motors. The fault measures, signature values, and/or representative signature values can be compared among the motors of the same vehicle to identify if one or more of the motors has a mechanical problem or impending failure such that the motor is likely to mechanically fail within the near future (e.g., within minutes, days, weeks, or during current operation of the motor) and/or is more likely to mechanically fail before one or more other motors in the same vehicle in the relatively near future.

The motors that are identified as being likely to mechanically fail and/or more likely to mechanically fail before one or more other motors may be referred to as "predicted failure motors." The predicted failure motors may be identified before the motors mechanically fail so that the motors can be repaired, if possible, before failure. In one embodiment, fault measures, signature values, and/or representative signature values may be associated with a bearing in the motor that is tending toward failing (e.g., friction between the bearing and the rotor or stator of the motor is increasing). Alternatively, the fault measures, signature values, and/or representative signature values may be associated with a gear interconnecting the motor with an axle, the axle, or some other traction component of the vehicle is tending toward failing.

Once a motor is identified as a predicted failure motor, or is associated with an impending mechanical failure, one or more embodiments of the systems and methods described herein may take additional responsive actions. For example, upon identification of a potential mechanical failure of a motor, a control signal may be generated that is communicated to a control subsystem that controls the tractive efforts and/or braking efforts provided by the vehicle that includes the motor. The control signal may automatically change the tractive efforts and/or braking efforts, such as by slowing down or stopping movement of the vehicle. Alternatively, the control signal may provide a notification to an operator of the vehicle (e.g., instructions that are displayed on a display device) that instructs the operator to slow down or stop movement of the vehicle. In another embodiment, the control signal may include an alarm signal that notifies and warns the operator of the identified impending mechanical failure.

In another example, upon identification of the potential mechanical failure of the motor, an output signal may be generated that is communicated to a location disposed off board of the vehicle, such as a dispatch center or a repair center that is remotely located from the vehicle. In response to receiving the output signal, the off-board location may schedule a maintenance operation for the vehicle, such as a scheduled examination and/or repair to the motor associated with the impending mechanical failure that is identified. The off-board location may transmit a responsive signal to the vehicle that controls the tractive efforts of the vehicle, or instructs an operator of the vehicle to change the tractive efforts of the vehicle, to stop the vehicle or cause the vehicle to travel to a designated maintenance facility where the motor can be examined and/or repaired. In one embodiment, the output signal from the vehicle may include information related to the maintenance operation to be performed on the motor, such as a potential identification of the motor and/or of a bearing or gear that may be the cause of the impending mechanical failure that is identified.

One or more embodiments of the disclosed systems can be retrofitted to an existing vehicle. For example, the output from one or more existing energy sensors (e.g., current or voltage sensors, speed sensors, and the like) that already are disposed on-board may be conveyed to a failure prediction system having modules that receive and analyze characteristics of the electrical energy that are measured by the energy sensors. The characteristics can be analyzed to identify the fault measures, signature values, and/or representative signature values described above. At least one technical effect of one or more embodiments described herein is ability to predict which electric motors in a vehicle are likely to mechanically fail before one or more other electric motors in the vehicle while the vehicle is moving based on characteristics of the electrical energy that is supplied to the motors. This prediction may be performed without removing the motor from the vehicle, taking the motor off-line, or otherwise taking apart the motor. At least one other technical effect described herein is to predict when the motor will fail or is likely to fail, based on data that is collected while the motor is operating to propel a vehicle and/or without taking apart the motor for inspection.

FIG. 1 is a schematic diagram of one embodiment of a failure prediction system 100. The system 100 can be used to predict which electric motors 102 in a vehicle 104 are likely to mechanically fail before one or more other motors 102 and/or to predict when one or more of the motors 102 will or is likely to fail. The motors 102 are generally referred to by the reference number 102 and are individually referred to by the reference numbers 102A, 102B, and so on. While six motors 102 are shown in FIG. 1, alternatively, a different number of motors 102 may be provided. The vehicle 104 may be a locomotive of a rail vehicle, or alternatively may be another vehicle capable of self-propulsion, such as an off-highway vehicle.

The vehicle 104 may include a control subsystem 114, such as a computer processor or other logic based device, that controls operations of one or more of the motors 102. The control subsystem 114 may be manually controlled by an operator and/or automatically controlled. For example, the control subsystem 114 may change operating speeds of one or more of the motors 102 based on a manually adjustable throttle and/or may automatically change operating speeds of one or more of the motors 102 based on detection of a predicted failure motor, such as a motor 102 that is identified by the system 100 as likely having one or more failed components (e.g., bearings) and that may require service relatively soon.

Figure 2:
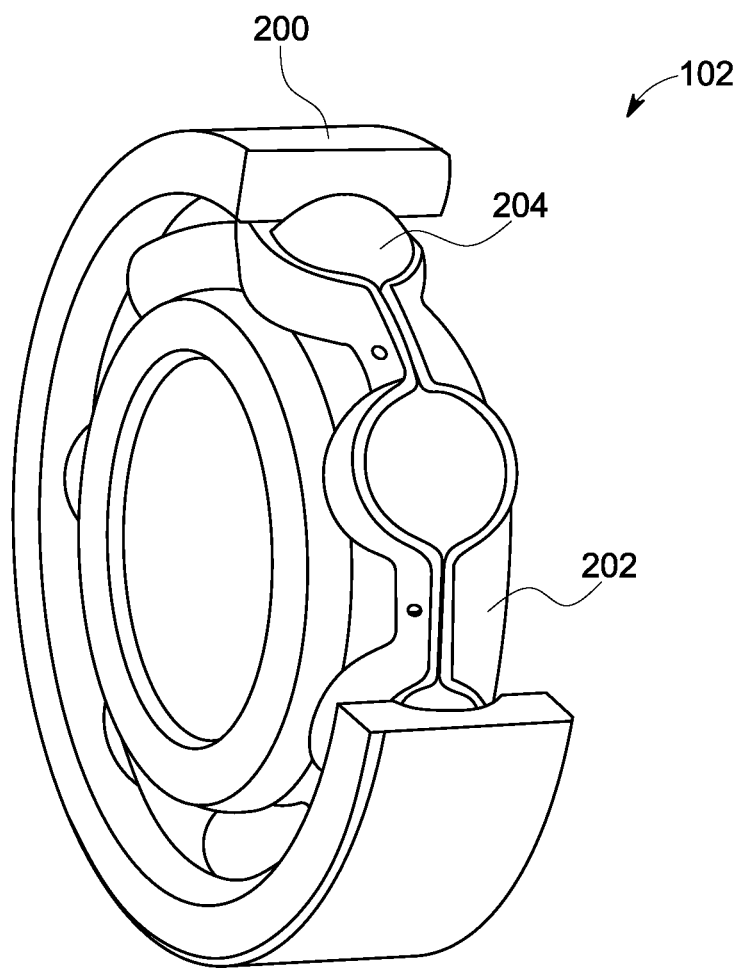
FIG. 2 illustrates a partial cut-away view of a motor shown in FIG. 1 in accordance with one embodiment.

With continued reference to FIG. 1, FIG. 2 illustrates a partial cut-away view of the motor 102 in accordance with one embodiment. The motors 102 may be inductor motors that include an outer stator 200 and an inner rotor 202. Only a portion of the stator 200 and rotor 202 are shown in FIG. 2. In one embodiment, the motor 102 is an alternating current inductor motor that is known in the art. The stator 200 can be a stationary component that remains relatively still relative to the vehicle 104 during operation of the motor 102 and the rotor 202 rotates with and relative to the stator 200 when electric energy is fed to the motor 102.

Several bearings 204 are coupled with the rotor 202 and engage the stator 200. The bearings 204 provide a reduced friction interface between the rotor 202 and the stator 200 such that the rotor 202 is able to rotate within the stator 200 with reduced friction. If one or more of the bearings 204 fails, such as by locking up or seizing, then the friction between the rotor 202 and the stator 200 may increase significantly and the motor 102 may mechanically fail. By "locking up" or "seizing," it is meant that the bearing 204 may stop rotating relative to the rotor 202 and/or stator 200 or may significantly reduce rotation relative to the stator 200 when the motor 102 is in operation. By "mechanically fail," it is meant that the rotor 202 locks up or seizes and the rotor 202 is unable to continue rotating within the stator 200. The motor 102 may mechanically fail when the rotor 202 locks up or seizes and is unable to continue rotating relative to the stator 200, or is only able to rotate at a significantly reduced rate.

The rotors 202 of the motors 102 are connected with different axles 106 of the vehicle 104. The rotors 202 may be directly coupled with the axles 106 (as shown in FIG. 1), or one or more gears may interconnect the rotors 202 with the axles 106. The axles 106 are generally referred to by the reference number 106 and individually referred to by the reference numbers 106A, 106B, and so on. The axles 106 are joined with wheels 108. During operation of the motors 102, the rotors 202 rotate the axles 106, which rotate the wheels 108. Rotation of the wheels 108 propels the vehicle 104.

The failure prediction system 100 can be disposed on-board the vehicle 104. For example, the failure prediction system 100 may be an electronic device, such as a computer or other processor-based device, that is located within the vehicle 104. Alternatively, the failure prediction system 100 may be a portable and/or moveable device that can be removed from the vehicle 104 by a human of average size and strength. The failure prediction system 100 can be retrofitted to an existing vehicle 104. For example, a vehicle 104 that has been previously used one or more times can have the failure prediction system 100 added to the vehicle 104. As described below, the failure prediction system 100 monitors electrical energy that is supplied to the motors 102 by a power source 110. The power source 110 is an assembly that generates electric current or voltage, such as a diesel engine coupled with an alternator or generator. The current or voltage is supplied to the motors 102 to cause the rotors 202 to rotate within the stators 200 of the motors 102. In one embodiment, the power source 110 provides an alternating current that is supplied to the motors 102 as a three-phase alternating current, such as an alternating current that includes three phases of the current that are offset from each other. The three phases of the current may be referred to as a first current phase ($I_A$), a second current phase ($I_B$), and a third current phase ($I_C$), as is known in the art. The power source 110 is located on-board the vehicle 104 in the illustrated embodiment.

A display device 112 is disposed on-board the vehicle 104 and is communicatively coupled with the failure prediction system 100. The display device 112 includes a component that provides output from the failure prediction system 100 to an operator of the vehicle 104. For example, the display device 112 can include a monitor that visually presents information, a printer that prints information onto paper or another medium, and the like. The display device 112 can present the results of the failure prediction system 100 analyzing the electrical energy supplied to the motors 102 to the operator. For example, the display device 112 may indicate which motor 102 is likely to fail relatively soon (e.g., within the next few hours or days) or which motor 102 is more likely to fail before the other motors 102.

Figure 3:
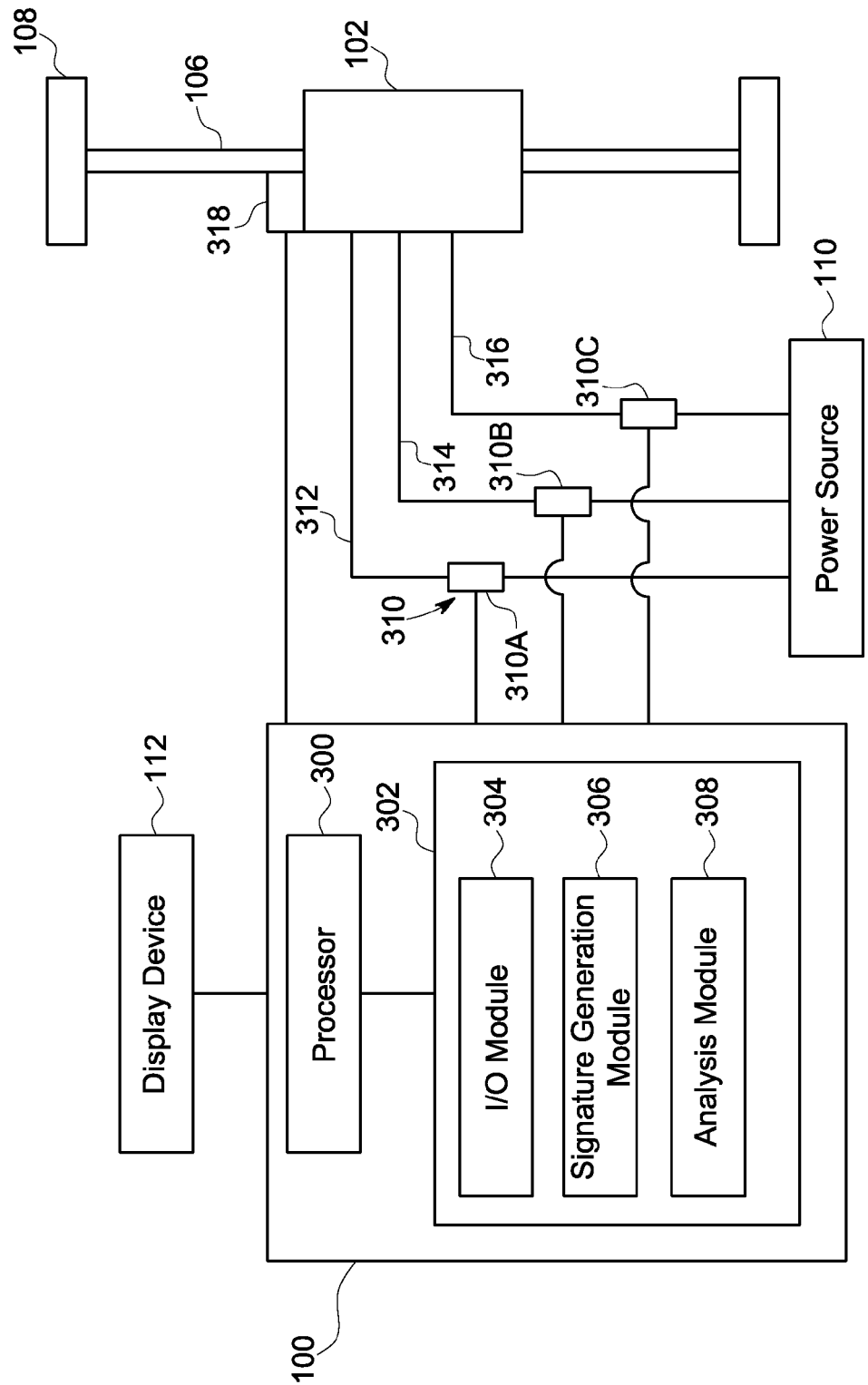
FIG. 3 is a schematic diagram of one embodiment of the failure prediction system shown in FIG. 1.

FIG. 3 is a schematic diagram of one embodiment of the failure prediction system 100. The system 100 includes a processor 300, such as a computer processor, microprocessor, controller, microcontroller, or other logic-based device that operates based on one or more sets of instructions stored on a tangible and non-transitory computer-readable storage medium, such as a memory 302. The memory 302 may include a hard drive, flash drive, RAM, ROM, EEPROM, CD-ROM, DVD-ROM, and the like, that stores instructions that are readable by the processor 300. The instructions may be represented by various modules that direct the processor 300 to perform operations. In the illustrated embodiment, the modules include an input/output module 304 ("I/O Module"), a signature generation module 306, and an analysis module 308.

The I/O module 304 receives input from an operator and/or forms output for the operator from the system 100. For example, the I/O module 304 may be communicatively coupled with an input device such as a keyboard, touchscreen, microphone, and the like, to receive input from the operator. The I/O module 304 may form instructions and/or information that are communicated to the display device 112 for presentation to the operator.

The signature generation module 306 is communicatively coupled with one or more sensors 310. The sensors 310 are individually referred to by the reference numbers 310A, 310B, and 310C. While three sensors 310 are shown in FIG. 3, alternatively, a different number of sensors 310 may be provided. Additional sensors 310 can be provided for other motors 102. For example and with respect to the embodiment shown in FIG. 1, eighteen sensors 310 may be provided, with three sensors 310 provided for each motor 102. The sensors 310 measure the characteristics of the motors 102. For example, the sensors 310 may be energy sensors that measure characteristics of the electrical energy supplied to the motors 102. Alternatively, the sensors 310 may be mechanical sensors, temperature sensors, speed sensors, torque sensors, or other sensors that measure vibration, temperature, speed, torque, and the like, of the motors 102.

As shown in FIG. 3, the power source 110 may be conductively coupled with the motor 102 by conductive pathways 312, 314, 316. The power source 110 feeds electrical energy to the motor 102 along the conductive pathways 312, 314, 316. For example, the power source 110 may deliver an alternating current to the motor 102 along the conductive pathways 312, 314, 316, with a different phase ($I_A$, $I_B$, $I_C$) of the current transmitted along each conductive pathway 312, 314, 316. The conductive pathways 312, 314, 316 may be separately joined with difference conductive coils of the stator 200 (shown in FIG. 2) of the motor 102 such that different phases ($I_A$, $I_B$, $I_C$) are delivered to different coils. As a result, the coils of the stator 200 can create a rotating magnetic field that rotates the rotor 202 (shown in FIG. 2) of the motor 102 within the stator 200. In one embodiment, the energy sensors 310 may be coupled with or disposed near the conductive pathways 312, 314, 316, such as by being conductively coupled or inductively coupled with the conductive pathways 312, 314, 316. The energy sensors 310 measure one or more characteristics of the electrical energy that is transmitted along the conductive pathways 312, 314, 316 to the motor 102 from the power source 110.

The sensors 310 can include current sensors that measure the electric current supplied to the motor 102 as a characteristic of the electric energy that is supplied to the motor 102. The sensors 310 can monitor different phases of an alternating current that is fed to the motor 102. For example, the first sensor 310A can measure a first current phase ($I_A$), the second sensor 310B can measure a second current phase ($I_B$), and the third sensor 310C can measure a third current phase ($I_B$), where the current phases ($I_A$, $I_B$, $I_C$) represent the three phases of an alternating current that is delivered to the stator 200 (shown in FIG. 2) of the motor 102 to cause rotation of the rotor 202 (shown in FIG. 2) of the motor 102. Alternatively, the sensors 310 may be voltage sensors that monitor the voltages that are supplied to the motor 102 from the power source 110. In another embodiment, the sensors 310 may be other sensors that measure another electric characteristic of the energy that is delivered from the power source 110 to the motor 102. For example, the sensors 310 may measure inductances, impedances, resistances, power (e.g., watts), and the like, of the electrical energy that is delivered to the motor 102 from the power source 110.

The sensors 310 can monitor the electrical energy fed to the motor 102 while the motor 102 is operating to rotate the axle 106 and wheels 108 in one embodiment. The sensors 310 communicate the electrical energy sensed by the sensors 310 to the system 100 via one or more wired or wireless pathways. The I/O module 304 receives the electrical energy monitored by one or more of the sensors 310. In general, the amount of electrical energy, such as current or voltage, that is fed to the motor 102 along the conductive pathways 312, 314, 316 is based on a speed or throttle setting of the motor 102. The speed or throttle setting may be an operator-selected setting to control the speed at which the vehicle 104 is propelled by the motors 102. In order to operate at the selected speed or throttle setting, the rotor 202 (shown in FIG. 2) of the motor 102 rotates within the stator 200 (shown in FIG. 2) at a rotational speed. If the bearings 204 (shown in FIG. 2), gears, axles 106, and/or other traction components coupled with the motor 102 are operating and not locking or seizing up (e.g., the friction between the components is not significantly degrading performance of the motor 102), then the electrical energy demanded by the motor 102 to continue operating at the speed setting may be approximately constant. However, if one or more traction components, such as a bearing 204, gear, axle 106, and the like, begin to seize or lock up (or the friction between the traction components significantly increases), then the motor 102 may demand increased electrical energy from the power source 110 along one or more of the conductive pathways 312, 314, 316. This increased demand may be periodic in nature given the rotational movement of the motor 102, gears, and axles 106. For example, the increased demand may occur at one or more frequencies.

A speed sensor 318 may be coupled or disposed near the motor 102 to monitor the rotational speed of the motor 102. For example, the speed sensor 318 can measure how fast the rotor 202 (shown in FIG. 2) of the motor 102 is rotating within the stator 204 (shown in FIG. 2) of the motor 102. The speed sensor 318 may be a rotational speed sensor, which also may be referred to as an angular speed sensor. The speed sensor 318 measures the rotational speed of the motor 102 as the operating speed of the motor 102. The speed sensor 318 reports the operating speed of the motor 102 to the system 100 via one or more wired and/or wireless connections.

Figure 4:
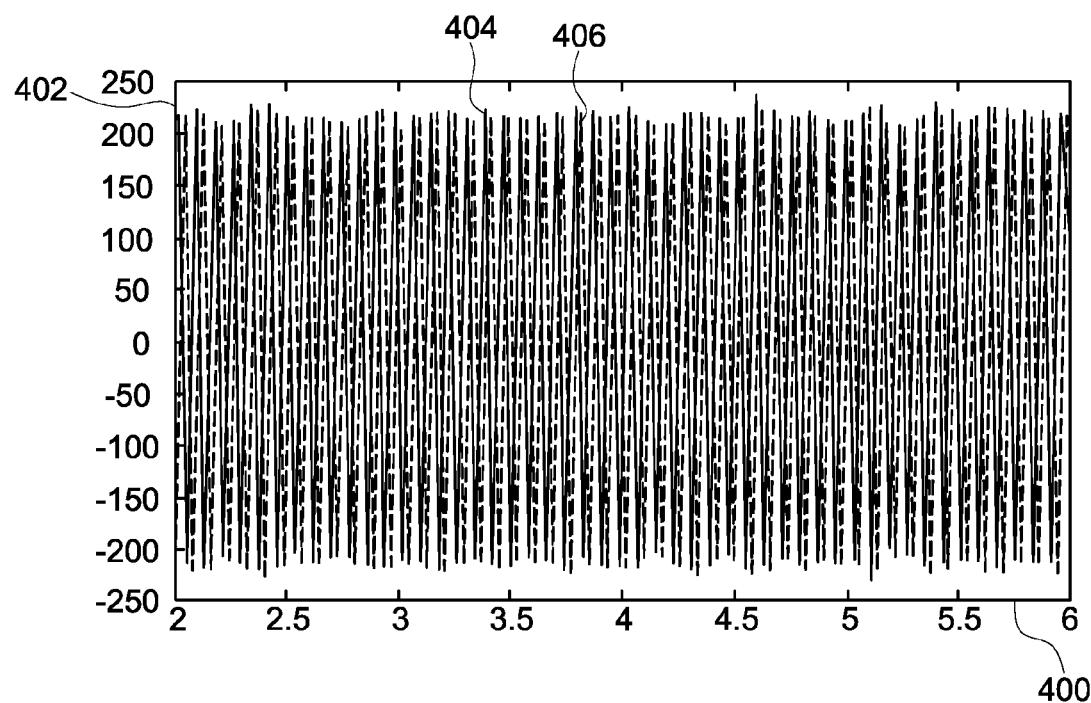
FIG. 4 is one example of a graphical representation of electrical characteristics of electrical energy that are measured by energy sensors shown in FIG. 3.

With continued reference to FIG. 3, FIG. 4 is one example of a graphical representation of electrical characteristics 404, 406 of the electrical energy that are measured by the sensors 310. The characteristics 404, 406 of the electrical energy are shown as first and second current phases ($I_A$, $I_B$) of the electric current that is supplied to the motor 102 from the power source 110. Alternatively, the characteristics 404, 406 may be represented as another plurality of the current phases ($I_A$, $I_B$, $I_C$), as all of the current phases ($I_A$, $I_B$, $I_C$), as a single current phase ($I_A$, $I_B$, $I_C$), or as another characteristic. The characteristics 404, 406 are shown in the time domain alongside a horizontal axis 400 representative of time and a vertical axis 402 representative of amplitude of the current phases ($I_A$, $I_B$). In the illustrated embodiment, the horizontal axis 400 represents time in units of seconds while the vertical axis 402 represents amplitude in terms of volts.

The characteristics 404, 406 shown in FIG. 4 may represent raw data that is measured by a plurality of the sensors 310, such as the sensors 310A and 310B, and communicated to the signature generation module 306 of the system 100. The signature generation module 306 receives the characteristics 404, 406 and generates a motor electrical signature based on the characteristics 404, 406. In one embodiment, the motor electrical signature includes a frequency domain representation of one or more characteristics of the electrical energy that is supplied to the motor 102 by the power source 110 and that is measured by one or more of the sensors 310.

Figure 5:
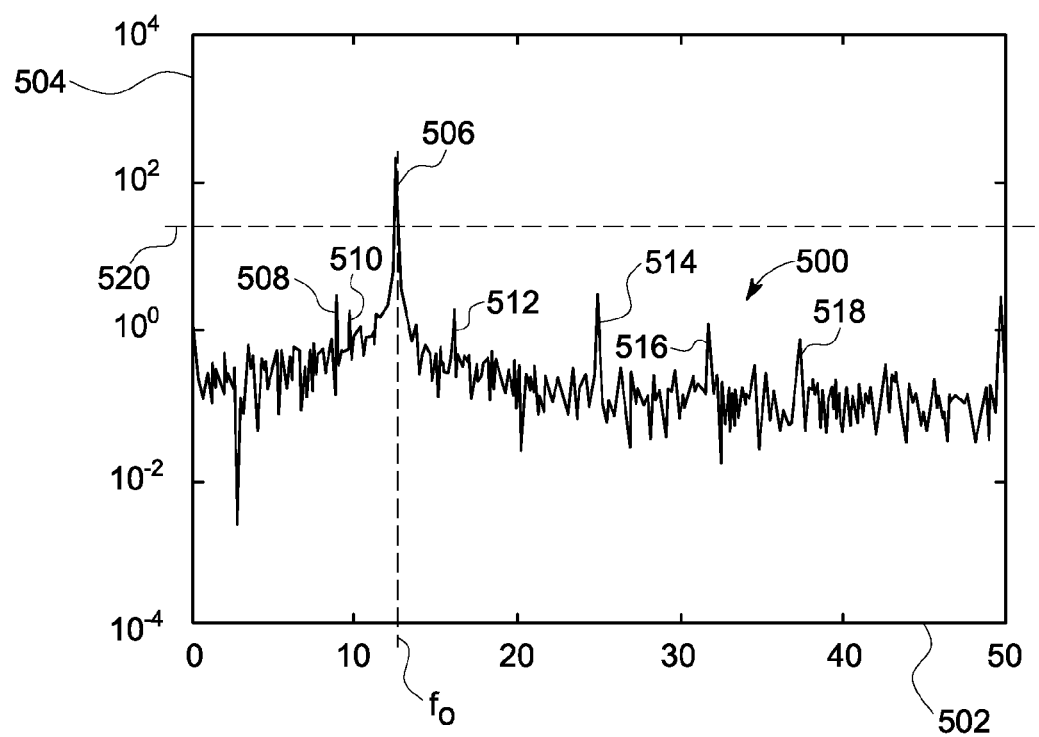
FIG. 5 is one example of a motor electrical signature.

FIG. 5 is an example of a motor electrical signature 500 that is created by the signature generation module 306 (shown in FIG. 3) of the system 100 (shown in FIG. 1). The motor electrical signature 500 is based on a single one of the characteristics 404, 406 (shown in FIG. 4) of the electrical energy that is supplied to the motor 102 (shown in FIG. 1). For example, the motor electrical signature 500 may be based on the characteristic 404 of the electrical energy. Alternatively, a different characteristic may be used. The motor electrical signature 500 may be unique to the motor 102. For example, different motors 102A, 102B, 102C, 102D, 102E, 102F may have different motor electrical signatures 500 at the same operating speeds.

In one embodiment, the signature generation module 306 (shown in FIG. 3) creates the motor electrical signature 500 by converting the time domain-based characteristic 404 (shown in FIG. 4) into a frequency domain. For example, the signature generation module 306 may convert the characteristic 404 from the time domain to the frequency domain by transforming the characteristic 404 using a Fourier transform. Alternatively, another type of transform from the time domain to the frequency domain may be used, such as a discrete Fourier transform, a fast Fourier transform, a Laplace transform, a Z-transform, a wavelet transform, and the like.

Figure 6:
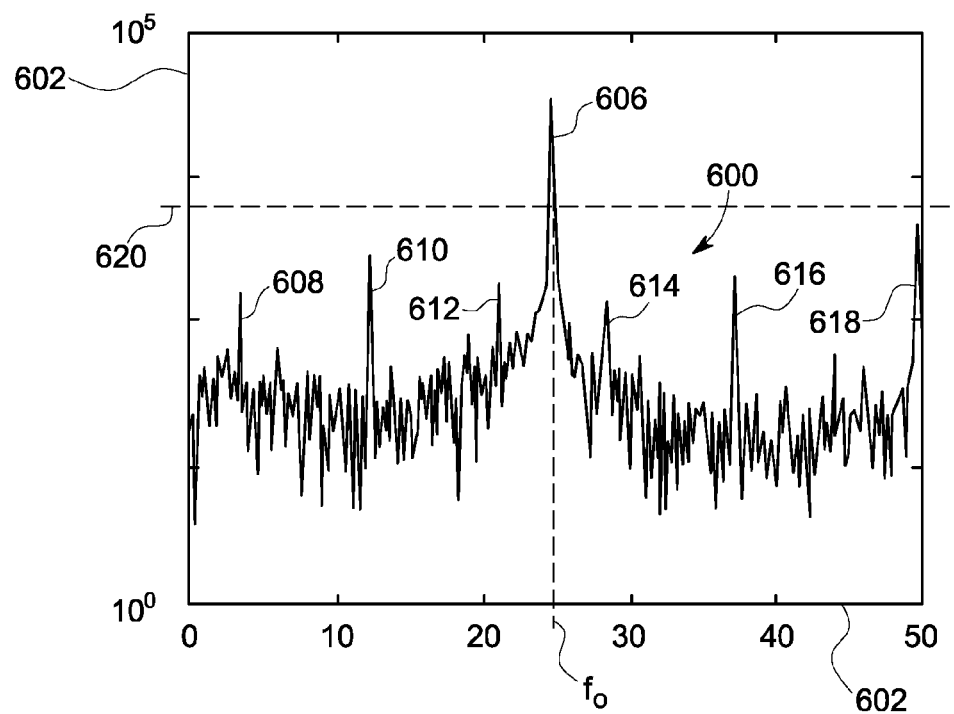
FIG. 6 is another example of a motor electrical signature.

FIG. 6 is another example of a motor electrical signature 600 that is created by the signature generation module 306 (shown in FIG. 3) of the system 100 (shown in FIG. 1). The motor electrical signature 600 is based on a plurality of the characteristics of the electrical energy that is supplied to the motor 102 (shown in FIG. 1). For example, the motor electrical signature 600 may be based on a product of two or more of the characteristics of the electrical energy, such as the product of the characteristic 404 (shown in FIG. 4) multiplied by the characteristic 406 (shown in FIG. 4). Alternatively, the motor electrical signature 600 may be based on a product of a different plurality of the characteristics.

In the illustrated embodiment, the signature generation module 306 creates the motor electrical signature 600 by calculating a product of the characteristics 404, 406 (e.g., multiplying the characteristics 404, 406 with each other) and converting the product from the time domain to the frequency domain using a Fourier transform. Alternatively, the signature generation module 306 may create the motor electrical signature 600 by calculating a different product of a plurality of other characteristics, such as a different plurality of current phases ($I_A$, $I_B$, $I_C$), voltages, resistances, impedances, and the like. The signature generation module 306 may create the motor electrical signature 600 by converting the time domain-based characteristics 404, 406 into the frequency domain, similar to as described above in connection with the motor electrical signature 500 (shown in FIG. 5).

Referring jointly to FIGS. 5 and 6, the motor electrical signatures 500, 600 are shown alongside horizontal axes 502, 602 that are representative of frequencies and vertical axes 504, 604 that are representative of amplitude, or prevalence, of the frequencies. In the illustrated embodiment, the horizontal axes 502, 602 are shown in units of hertz and the vertical axes 504, 604 are shown in a logarithmic scale. The motor electrical signatures 500, 600 represent frequency spectra of one or more of the characteristics of the electrical energy sensed by the sensors 310 (shown in FIG. 3). The motor electrical signatures 500, 600 can represent one or more of the characteristics of the electrical energy supplied to the motor 102 (shown in FIG. 1) over a relatively short time period. For example, the motor electrical signatures 500, 600 may each be based on one or more current phases ($I_A$, $I_B$, $I_C$) or voltages sensed by the sensors 310 while the motor 102 is operating to rotate the axle 106 (shown in FIG. 1) during a time period of several seconds (e.g., 1 to 5 seconds). Alternatively, a shorter or longer time period may be used. The motor electrical signatures 500, 600 may represent the frequency spectrum of the characteristics of the electrical energy when the motor 102 is rotating the axle 106 to propel the vehicle 104 (shown in FIG. 1).

As shown in FIG. 5, the motor electrical signature 500 includes several peaks 506, 508, 510, 512, 514, 516, 518, or waveform shapes having larger amplitudes or heights along the vertical axis 504 relative to other portions of the motor electrical signature 500. While only seven peaks 506, 508, 510, 512, 514, 516, 518 are identified in FIG. 5, the motor electrical signature 500 may include a smaller or larger number of peaks. In one embodiment, the peaks 506, 508, 510, 512, 514, 516, 518 include a speed-related peak 506 and several other peaks 508, 510, 512, 514, 516, 518. As shown in FIG. 5, the speed-related peak 506 may have a larger amplitude than the other peaks 508, 510, 512, 514, 516, 518. The frequency at which the speed-related peak 506 is located may be the frequency associated with the largest amplitude (or within a predetermined frequency range of the largest amplitude, such as 1 to 2 hertz). Alternatively, the frequency of the speed-related peak 506 may be the frequency at which the speed-related peak 506 exceeds or falls below a threshold amplitude. As shown in FIG. 6, the motor electrical signature 600 includes several peaks 606, 608, 610, 612, 614, 616, 618. While only seven peaks 606, 608, 610, 612, 614, 616, 618 are shown, the motor electrical signature 600 may include a smaller or larger number of peaks. The peaks 606, 608, 610, 612, 614, 616, 618 include a speed-related peak 606 and several other peaks 608, 610, 612, 614, 616, 618.

The speed-related peaks 506, 606 may have an amplitudes or vertical heights along the vertical axes 504, 604 that are larger than one or more other peaks 508, 510, 512, 514, 516, 518 or 608, 610, 612, 614, 616, 618, respectively. For example, the speed-related peaks 506, 606 can have amplitudes that are at least one to two orders of magnitude larger than the amplitudes of the other peaks 508, 510, 512, 514, 516, 518 or 608, 610, 612, 614, 616, 618, respectively. The speed-related peaks 506, 606 can be identified by comparing the amplitudes of the speed-related peak 506, 606 to the amplitudes of the other peaks 508, 510, 512, 514, 516, 518 or 608, 610, 612, 614, 616, 618. In one embodiment, the amplitude of the speed-related peaks 506, 606 exceed at least one or more of the other peaks and/or is the largest amplitude of the motor electrical signatures 500, 600. Alternatively, the speed-related peaks 506, 606 can be identified by determining which peaks in the motor electrical signatures 500, 600 exceed a threshold 520, 620.

The frequencies of the speed-related peaks 506, 606 may be referred to as fundamental frequencies ($f_0$) of the motor electrical signatures 500, 600. Alternatively, the frequencies of the speed-related peaks 506, 606 may be a different frequency other than a harmonic or fundamental frequency ($f_0$). The frequencies at which the speed-related peaks 506, 606 occur can be associated with a speed at which the motor 102 (shown in FIG. 1) operates. For example, the speed-related peaks 506, 606 may be located at frequencies that change based on the speed of the motor 102. When the motor 102 increases its operating speed, the frequencies of the speed-related peaks 506, 606 may increase, or shift to the right in the illustrated embodiment. When the motor 102 decreases its operating speed, the frequencies of the speed-related peaks 506, 606 may decrease, or shift to the left in FIGS. 5 and 6.

The frequencies of the speed-related peaks 506, 606 may be determined by identifying the frequencies associated with the largest amplitude (or within a predetermined frequency range of the largest amplitude, such as 1 to 2 hertz) of the peaks 506, 606. Alternatively, the frequencies of the speed-related peaks 506, 606 may be the frequencies at which the peaks 506, 606 rise above or fall below a threshold (e.g., the threshold 520 or 620). In another embodiment, the frequencies of the peaks 506, 606 may be selected as the frequencies located at the center of the frequencies encompassed by the peaks 506, 606, and the like. Alternatively, the frequencies of the peaks 506, 606 may be known or predetermined frequencies that are associated with various operating speeds of the motor 102 (shown in FIG. 1). For example, the medium 302 (shown in FIG. 3) of the system 100 (shown in FIG. 1) may store a list, database, table, or other memory structure that associates different operating speeds of the motors 102 (such as the revolutions per minute at which the motor 102 is operating) with harmonic or fundamental frequencies ($f_0$) for one or more of the motors 102. In operation, the analysis module 308 (shown in FIG. 3) of the system 100 may determine the speed of the motor 102 when the characteristics of the electrical energy to the motor 102 are obtained (and from which the motor electrical signature 500, 600 is generated). The analysis module 308 cart refer to the stored speeds of the motor 102 stored in the medium 302 to identify the harmonic or fundamental frequencies ($f_0$) that are associated with the speed.

One or more of the peaks 508, 510, 512, 514, 516, 518 or 608, 610, 612, 614, 616, 618 may be associated with temporary or non-periodic conditions. A "temporary" or "non-periodic" condition is a condition that lasts for a relatively short period of time (e.g., a few seconds or less) and/or is not regularly repeated over time. Examples of temporary or non-periodic conditions may include slippage of the wheels 108 (shown in FIG. 1) on a track or surface, uneven portions of tracks or surfaces that the wheels 108 travel along, and the like. Such conditions generally occur over relatively short time periods as the vehicle 104 (shown in FIG. 1) travels and/or may be unlikely to occur at regular, repeated time intervals.

One or more of the peaks 508, 510, 512, 514, 516, 518 or 608, 610, 612, 614, 616, 618 may be associated with periodic conditions. A "periodic" condition is a condition that repeatedly occurs and/or occurs at approximately regular intervals. Examples of periodic conditions may include a partially stuck, stuck or otherwise faulty bearing 204 (shown in FIG. 2) that rotates with the rotor 202 (shown in FIG. 2) of the motor 102 (shown in FIG. 1), a faulty gear between the motor 102 and the axle 106 (shown in FIG. 1), and the like. The bearings 204, gears, and other mechanical components of the tractive components (e.g., the motor 102, axle 106, and wheels 108 shown in FIG. 1) of the vehicle 104 may rotate or move in a periodic manner. As a result, problems with the tractive components may periodically occur during operation of the motor 102. As a result, peaks that are associated with problems of the tractive components may repeatedly appear in the motor electrical signatures 500, 600.

The signature generation module 306 (shown in FIG. 3) of the system 100 can create several motor electrical signatures 500 and/or 600 from different sets of characteristics that are measured by the sensors 310 (shown in FIG. 3). For example, the sensors 310 can measure the characteristics 404, 406 (shown in FIG. 4) of the electrical energy supplied to the motor 102 (shown in FIG. 1) over several overlapping or non-overlapping time periods. Several motor electrical signatures 500 and/or 600 may be generated for the characteristics 404, 406 associated with each time period. The analysis module 308 (shown in FIG. 3) can calculate a representative electrical signature based on the plurality of motor electrical signatures 500 and/or 600 created by the signature generation module 306.

The representative electrical signature can represent an average, median, root mean square, or other statistical measure of the several motor electrical signatures 500 and/or 600. In one embodiment, the signature generation module 306 calculates a representative electrical signature based on a moving average of a predetermined number of recent motor electrical signatures 500 and/or 600. For example, the signature generation module 306 may create a representative electrical signature of a motor 102 that is an average of the two, three, four, five, and the like, previously generated motor electrical signatures 500 and/or 600 for the motor 102. Alternatively, a different number of previously created motor electrical signatures 500 and/or 600 may be used.

Figure 7:
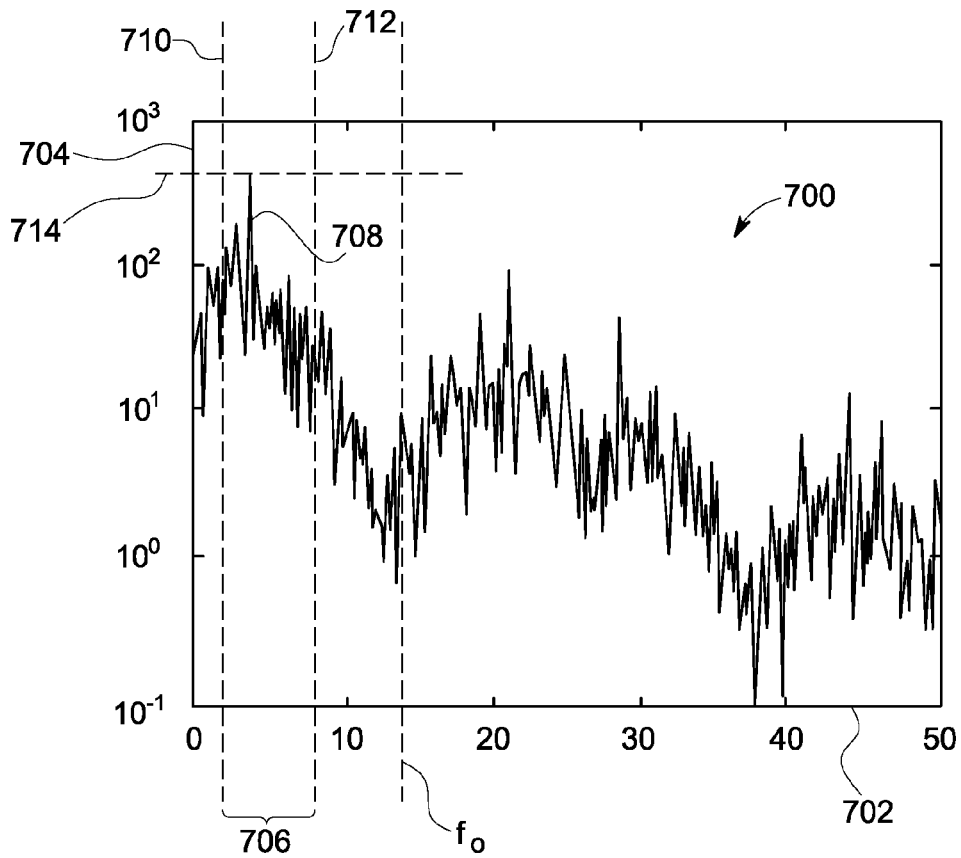
FIG. 7 is one example of a representative electrical signature.

FIG. 7 is one example of a representative electrical signature 700. The representative electrical signature 700 is shown alongside a horizontal axis 702 representative of frequency and a vertical axis 704 representative of amplitude, or prevalence, of the frequencies in the representative electrical signature 700. The representative electrical signature 700 can be based on a plurality of the motor electrical signatures 500 (shown in FIG. 5) and/or 600 (shown in FIG. 6) that represent frequency spectra of characteristics of the electrical energy supplied to the motor 102 (shown in FIG. 1) when the motor 102 is operating at a constant speed, or within a predetermined range of speeds. For example, the representative electrical signature 700 may be calculated as an average, root mean square, or other statistical measure of several motor electrical signatures 500 and/or 600 that are created from one or more characteristics 404, 406 (shown in FIG. 4) obtained when the motor 102 is operating at one or more speeds that are within 5%, 10%, 15%, 20%, and the like, of each other. Alternatively, a different range may be used. In another embodiment, the representative electrical signature 700 may be calculated based on several motor electrical signatures 500 and/or 600 obtained when the motor 102 is operating at different speeds, or speeds that are not within the predetermined range of each other.

The representative electrical signature 700 may be generated to reduce or eliminate the peaks in the motor electrical signatures 500 or 600 (shown in FIGS. 5 and 6) that are based on temporary or non-periodic conditions. For example, by averaging several motor electrical signatures 500 and/or 600, the amplitude of a peak caused by a temporary or non-periodic condition (e.g., wheel slippage, or uneven track or surface) may be smaller relative to peaks associated with periodic conditions (e.g., faulty traction components). The peaks of the temporary or non-periodic conditions may appear less frequently than the peaks of periodic conditions. As a result, the amplitude of the peaks of the temporary or non-periodic conditions may be significantly smaller than the peaks of periodic conditions in the representative electrical signature 700.

In one embodiment, the analysis module 308 (shown in FIG. 3) removes the peaks representative of the speed of the motor 102 (shown in FIG. 1) from the representative electrical signature 700. For example, if the motor electrical signatures 500, 600 (shown in FIGS. 5 and 6) used to form the representative electrical signature 700 are based on characteristics of the electrical energy obtained at different operating speeds of the motor 102, then the peaks 506, 606 (shown in FIGS. 5 and 6) associated with the speed of the motor 102 may be dampened or removed from the representative electrical signature 700. Alternatively, the signature generation module 306 may identify the peaks 506, 606 and remove the portion of the frequency spectrum in the representative electrical signature 700 that is based on the peaks 506, 606. As a result, the representative electrical signature 700 can be derived without the presence of the peaks 506, 606 associated with the speed of the motor 102. For example, the representative electrical signature 700 may not include one or more of the harmonic or fundamental frequency ($f_0$) of the motor electrical signatures 500, 600 used to generate the representative electrical signature 700.

As shown in FIG. 7, the representative electrical signature 700 includes a disturbance peak 708. The disturbance peak 708 is shown as a waveform segment in the signature 700 having a vertical height or amplitude that is larger than one or more other peaks 708 in the signature 700. The disturbance peak 708 may be identified by comparing the amplitude of multiple peaks in the signature 700 and selecting the one or more peaks having larger amplitudes as the disturbance peak 708 and/or as candidate disturbance peaks 708. In one embodiment, the disturbance peak 708 is identified as a dominant peak that has an amplitude greater than the other peaks in the signature 700. While only one disturbance peak 708 is shown in FIG. 7, alternatively, the representative electrical signature 700 may include a plurality of the disturbance peaks 708.

The disturbance peak 708 may be caused by a periodic condition, such as a faulty bearing 204 (shown in FIG. 2), faulty gear, or other faulty traction component. For example, the disturbance peak 708 may be a pre-failure indicator of the motor 102 (shown in FIG. 1), or an indicator that some mechanical component of the traction components (e.g., the motor 102, one or more bearings 204 shown in FIG. 2, gears, axle 106 shown in FIG. 1, and the like) is failing, has failed, or is more likely to fail than one or more other components of the same vehicle 104 (shown in FIG. 1). The disturbance peak 708 may be detected by the analysis module 308 (shown in FIG. 3) of the system 100 (shown in FIG. 1) as a pre-failure indicator of the motor 102 in that the disturbance peak 708 may be identified while the motor 102 is still operating to propel the vehicle 104, but before the motor 102 seizes or locks up and is no longer able to propel the vehicle 104.

In one embodiment, the analysis module 308 (shown in FIG. 3) identifies the disturbance peak 708 by examining a low frequency range 706 of the frequency spectrum represented by the representative electrical signature 700. In the illustrated embodiment, both the frequency limits 710, 712 are located at frequencies that are smaller than the fundamental frequency ($f_0$) of one or more of the motor electrical signatures 500, 600 (shown in FIGS. 5 and 6) that are used to produce the representative electrical signature 700. For example, the analysis module 308 may store the harmonic frequencies or the fundamental frequencies ($f_0$) identified for one or more of the motor electrical signatures 500, 600 used to produce the representative electrical signature 700. The analysis module 308 can calculate a statistical measure of the fundamental frequencies ($f_0$), such as an average, median, root mean square, and the like. Alternatively, the analysis module 308 may use a single fundamental frequency ($f_0$) from the motor electrical signatures 500, 600. In another embodiment, the analysis module 308 may obtain the fundamental frequency ($f_0$) from the medium 302, such as in a table, database, list, or other memory structure that associates the operating speed of the motor 102 with a harmonic frequency or a fundamental frequency ($f_0$), as described above.

The low frequency range 706 may be based on the harmonic frequency or the fundamental frequency ($f_0$). For example, the lower frequency limit 710 and/or the upper frequency limit 712 may be a predetermined fraction of the harmonic frequency or the fundamental frequency ($f_0$). In one embodiment, the low frequency range 706 encompasses, or extends across, one half of the harmonic frequency or the fundamental frequency ($f_0$). For example, in FIG. 7, the fundamental frequency ($f_0$) is determined by the analysis module 308 (shown in FIG. 3) to be approximately 12 hertz and the low frequency range 706 encompasses and extends across 6 hertz. The lower frequency limit 710 is illustrated as approximately 2 hertz and the upper frequency limit 712 is approximately 8 hertz.

In another example, the lower frequency limit 710 may be 30% of the harmonic frequency or the fundamental frequency ($f_0$), for example. Alternatively and by way of example, the lower frequency limit 710 may be a different fraction of the harmonic frequency or the fundamental frequency ($f_0$), such as 1%, 5%, 10%, 15%, 20%, 25%, 33%, 40%, 45%, and the like. In another embodiment, the lower frequency limit 710 can be 0 hertz. The upper frequency limit 712 may be 70% of the harmonic frequency or the fundamental frequency ($f_0$). Alternatively and by way of example, the upper frequency limit 712 may be a different fraction of the harmonic frequency or the fundamental frequency ($f_0$), such as 99%, 95%, 90%, 85%, 80%, 75%, 67%, 60%, 55%, and the like. In another embodiment, the upper frequency limit 712 can be equivalent to the harmonic frequency or the fundamental frequency ($f_0$), or may be a predetermined difference from the harmonic frequency or the fundamental frequency ($f_0$).

The analysis module 308 (shown in FIG. 3) can identify the disturbance peak 708 by examining the amplitudes (or vertical heights along the vertical axis 704) of the peaks in the representative electrical signature 700 that are located within the low frequency range 706. For example, the analysis module 308 can select the peak within the low frequency range 706 having an amplitude that is larger than one or more other peaks within the low frequency range 706 as the disturbance peak 708. In the illustrated embodiment, the disturbance frequency 708 has an amplitude of approximately 500 along the vertical axis 704, while the remaining portion of the representative electrical signature 700 within the low frequency range 706 is less than 500. As another example, the analysis module 308 can select the peak within the low frequency range 706 having an amplitude that is larger than all other peaks within the low frequency range 706 as the disturbance peak 708. In the illustrated embodiment, the analysis module 308 identifies the disturbance peak 708 at a frequency of approximately 3 hertz.

The analysis module 308 (shown in FIG. 3) may generate several representative electrical signatures 700 of the motor 102 (shown in FIG. 1). For example, the analysis module 308 may periodically create a representative electrical signature based on recently obtained motor electrical signatures 500 and/or 600 (shown in FIGS. 5 and 6). The analysis module 308 can identify disturbance frequencies 708 in one or more of the representative electrical signatures, as described above. Alternatively, or in addition, the analysis module 308 may calculate a fault measure based on the several representative electrical signatures 700. The fault measure includes one or more quantities that represent amplitudes of the disturbance frequencies 708 identified for the motor 102 during a time period. For example, the fault measure may be calculated as one or more of a root mean square, average, median, and the like, of the representative electrical signatures 700 created by the analysis module 308. A fault measure can represent a prospective motor failure, or a prospective failure of one or more components of the motor 102 (e.g., a bearing, gear, axle, and the like).

Figure 8:
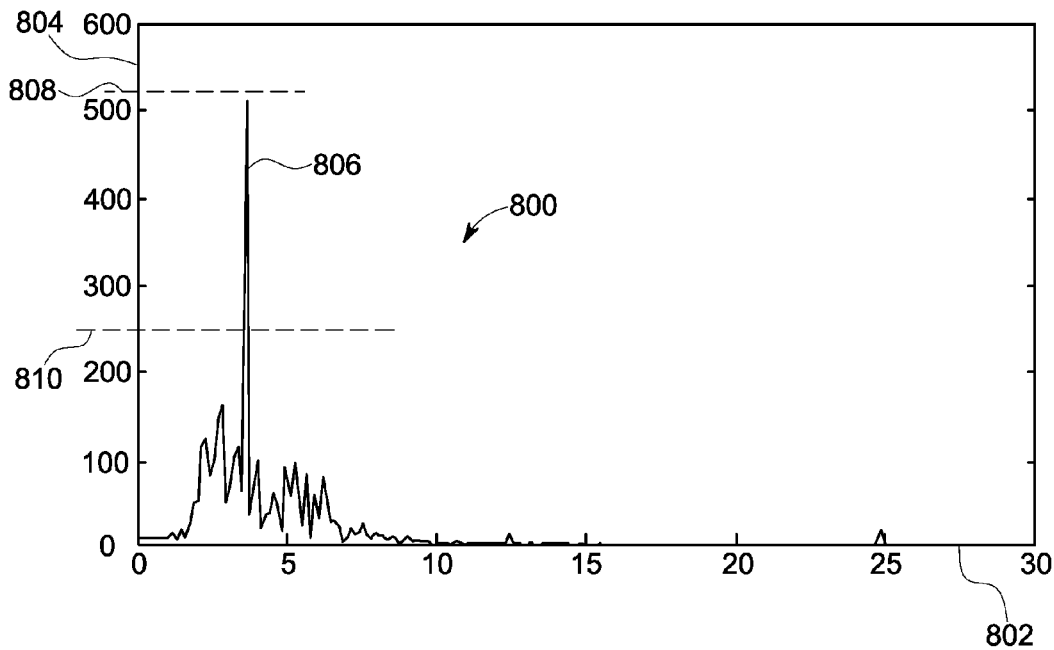
FIG. 8 is one example of a fault signature of the motor shown in FIG. 1.

FIG. 8 is one example of a fault signature 800 of the motor 102 (shown in FIG. 1). The fault signature 800 is shown alongside a horizontal axis 802 representative of frequency and a vertical axis 804 representative of amplitude, or prevalence, of the frequencies in the fault signature 800. The fault signature 800 represents a plurality of the representative electrical signatures 700 shown in FIG. 7. In one embodiment, the fault signature 800 is a root mean square of a plurality of the representative electrical signatures 700 representative of the characteristics of the electrical energy delivered to the motor 102 at different time periods. For example, the fault signature 800 can be created from representative electrical signatures that are based on periodically (e.g., every 1 to 3 seconds) obtained motor electrical signatures. Alternatively, the fault signature 800 may be an average, media, or other statistical measure of a plurality of the representative electrical signatures 700.

In another embodiment, the fault signature 800 may be based on one or more of the motor electrical signatures 500, 600 (shown in FIGS. 5 and 6). For example, instead of the fault signature 800 being a root mean square (or other statistical measure) of two or more representative electrical signatures 700, the fault signature 800 may be an average, median, root mean square, or other statistical measure of a plurality of the motor electrical signatures 500 and/or 600.

As shown in FIG. 8, the fault signature 800 includes a fault peak 806 having an amplitude 808 that is larger than one or more other peaks, or all other peaks, in the fault signature 800. The amplitude 808 of the fault peak 806 and/or the presence of the fault peak 806 can be used as a fault measure of the motor 102 (shown in FIG. 1). By "fault measure," it is meant that the amplitude 808 of the fault peak 806 and/or the existence of the fault peak 806 can be used as an indicator that the motor 102 (and/or a traction component connected to the motor 102) is likely to fail in the near future (e.g., within minutes, hours, days, or weeks). The existence of the fault peak 806 can be determined by comparing the amplitude 808 to a threshold amplitude 810. The fault measure represents a potential indicator of impending mechanical failure of the motor 102 (shown in FIG. 1). For example, the amplitude 808 of the fault peak 806 may indicate that the motor 102 includes a bearing 204 (shown in FIG. 2) of the motor 102, a gear connected to the motor 102, axle 106 (shown in FIG. 1), or other traction component of the vehicle 104 (shown in FIG. 1), that is likely to fail in the near future.

In one embodiment, the analysis module 308 (shown in FIG. 3) obtains fault measures for a plurality of the motors 102 (shown in FIG. 1) of the same vehicle 104 (shown in FIG. 1) and compares the fault measures of the motors 102 to determine which motor 102 is likely to mechanically fail and/or is more likely to mechanically fail than one or more other motors 102. For example, the analysis module 308 can track a number of fault measures for each motor 102, such as the number of times that the fault peaks 806 of the motor 102 have an amplitude 808 that exceeds the threshold 810. The analysis module 308 may compare the number of fault peaks 806 to the numbers of fault peaks 806 identified for the other motors 102 in the same vehicle 104 in order to reduce the possibility of incorrectly identifying one or more motors 102 as being likely to mechanically fail when several fault peaks 806 are identified for several of the motors 102.

Figure 9:
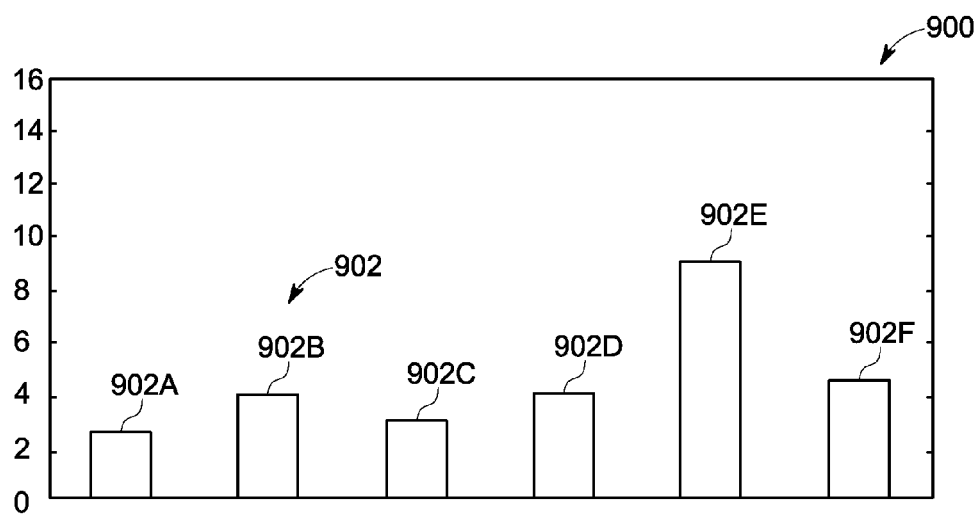
FIG. 9 is an example of a histogram showing several fault measures for several motors shown in FIG. 1.

FIG. 9 is an example of a histogram 900 showing several fault measures 902 identified for several motors 102 (shown in FIG. 1). The fault measures 902 are generally referred to by the reference number 902 and individually referred to by the reference numbers 902A, 902B, 902C, and so on. The fault measures 902 represent the number of fault measures for each of several motors 102. In one embodiment, each fault measure 902 corresponds to a different motor 102 of a common vehicle 104 (shown in FIG. 1). For example, the fault measure 902A may correspond to the number of fault measures for the motor 102A, the fault measure 902B may correspond to the number of fault measures for the motor 102B, the fault measure 902C may correspond to the number of fault measures for the motor 102C, and so on.

The analysis module 308 (shown in FIG. 3) of the system 100 (shown in FIG. 1) can examine the fault measures 902 of each motor 102 with the fault measures 902 of the other motors 102 (shown in FIG. 1) to determine which, if any, of the motors 102 are likely to mechanically fail or are more likely to mechanically fail than one or more other motors 102. In one embodiment, the analysis module 308 compares the fault measures 902 of the motors 102 by comparing the average, median, or other statistical measure of the fault measures 902 for all or a plurality of the motors 102 of the vehicle 104 with the average, median, or other statistical measure of the fault measures 902 for all or the plurality of the motors 102 other than a motor of interest. For example, if an Nth motor 102 is under examination by the analysis module 308, the analysis module 308 may calculate first and second statistical measures ($\mu_1$, $\mu_2$) for the motors 102 of the vehicle 104 and compare a difference between the first and second statistical measures $\mu_1$, $\mu_2$) to a threshold to determine if the Nth motor 102 is likely to mechanically fail or is more likely to mechanically fail than one or more other motors 102.

Comparing the fault measures 902 of each motor 102 (shown in FIG. 1) with the fault measures 902 of the other motors 102 can reduce the possibility of a false positive determination that one or more motors 102 are likely to mechanically fail. For example, instead of individually comparing the fault measures 902 of each motor 102 with a static threshold to determine if the motor 102 is likely to mechanically fail, the fault measures 902 of each motor 102 can be compared to the fault measures 902 of all or at least a plurality of the motors 102. In one embodiment, it may be less likely that several of the motors 102 in the same vehicle 104 (shown in FIG. 1) have bearings 204 (shown in FIG. 2), gears, axles 106 (shown in FIG. 1), or other mechanical components that are tending to fail or lock up at the same time. However, due to one or more thresholds (e.g., thresholds 520, 620, 810 shown in FIGS. 5, 6, and 8) used to identify the fault measures 902 being too low, several of the motors 102 may have relatively large numbers of fault measures 902 even though the motors 102 are not likely to fail or are not more likely than one or more other motors 102 to fail. As a result, the fault measures 902 of each motor 102 are compared to the collective fault measures 102 of the group of motors 102 in the vehicle 104 to identify which of the motors 102 has a number of fault measures 902 that is significantly different from the group of the motors 102.

In one embodiment, the first statistical measure ($\mu_1$) is calculated as an average, median, or other calculation based on the fault measures 902 for the motors 102 of the vehicle 104 other than the fault measures 902 of the Nth motor 102. The second statistical measure ($\mu_2$) is calculated as an average, median, or other calculation based on the fault measures 902 for the motors 102 of the vehicle 104 including the fault measures 902 of the Nth motor 102. If the difference between the first and second statistical measures ($\mu_1$, $\mu_2$) has a value that is smaller or more negative than a threshold, then the Nth motor 102 is identified as likely to mechanically fail and/or more likely to mechanically fail than one or more other motors 102 of the vehicle 104. For example, the Nth motor 102 may be identified as a predicted failure motor.

On the other hand, if the difference between the first and second statistical measures ($\mu_1$, $\mu_2$) is larger or more positive than the threshold, then the Nth motor 102 is not identified as likely to mechanically fail and/or more likely to mechanically fail than one or more other motors 102 of the vehicle 104. Alternatively, the absolute value of the difference between the first and second statistical measures ($\mu_1$, $\mu_2$) may be compared to a threshold and, if the absolute value of the difference exceeds the threshold, then the Nth motor 102 is likely to mechanically fail and/or more likely to mechanically fail than one or more other motors 102 of the vehicle 104. The calculation and comparison of the first and second statistical measures ($\mu_1$, $\mu_2$) can be repeated for all motors 102 of the vehicle 104.

With respect to the example shown in FIG. 9, Table 1 below displays the fault measures 902 associated with the various motors 102, the first statistical measure ($\mu_1$), the second statistical measure ($\mu_2$), the difference between the first and second statistical measures ($\mu_1$, $\mu_2$), and an example of a threshold difference. The threshold difference is provided merely as an example. A different threshold difference may be used.

TABLE 1

| | Motor 102A | Motor 102B | Motor 102C | Motor 102D | Motor 102E | Motor 102F |
|---|---|---|---|---|---|---|
| Fault measures (902) | 2.0 | 4.0 | 3.0 | 4.0 | 9.0 | 4.0 |
| First statistical measure ($\mu_1$) | 4.8 | 4.4 | 4.6 | 4.4 | 3.4 | 4.4 |
| Second statistical measure ($\mu_2$) | 4.3 | 4.3 | 4.3 | 4.3 | 4.3 | 4.3 |
| Difference ($\mu_1 - \mu_2$) | 0.47 | 0.07 | 0.27 | 0.07 | −0.93 | 0.7 |

TABLE 1-continued

| | Motor 102A | Motor 102B | Motor 102C | Motor 102D | Motor 102E | Motor 102F |
|---|---|---|---|---|---|---|
| Threshold | −0.8 | −0.8 | −0.8 | −0.8 | −0.8 | −0.8 |
| Fault? | N | N | N | N | Y | N |

As shown in the bottom three rows of Table 1, all of the motors 102 except for the motor 102E have differences between the first and second statistical measures ($\mu_1$, $\mu_2$) that are larger, or more positive, than the threshold. Alternatively, the absolute values of the differences between the first and second statistical measures ($\mu_1$, $\mu_2$) for all motors 102 except for the motor 102E are smaller than the absolute value of the above threshold (e.g., +0.8). The motor 102E has a difference between the first and second statistical measures ($\mu_1$, $\mu_2$) that meets the threshold. Therefore, the motor 102E can be identified by the analysis module 308 (shown in FIG. 3) as likely to fail or more likely to mechanically fail than the motors 102A-D and 102F. The analysis module 308 can direct the I/O module 304 (shown in FIG. 3) of the system 100 (shown in FIG. 1) to visually present text or indicia on the display device 112 (shown in FIG. 1) that warns an operator of the vehicle 104 (shown in FIG. 1) that motor 102E is likely to mechanically fail.

Figure 10:
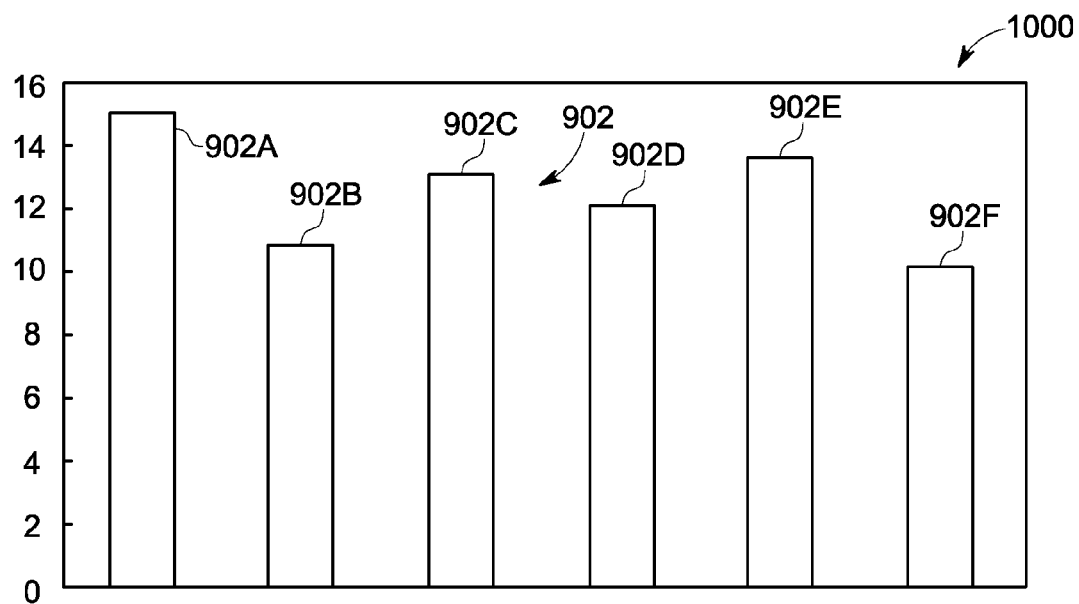
FIG. 10 is another example of a histogram showing several fault measures for several motors shown in FIG. 1.

FIG. 10 is another example of a histogram 1000 showing several fault measures 902 identified for several motors 102 (shown in FIG. 1). The histogram 1000 is similar to the histogram 900 of FIG. 9 but with different fault measures 902 for the motors 102. Table 2 below displays the fault measures 902 associated with the various motors 102, the first statistical measure ($\mu_1$), the second statistical measure ($\mu_2$), the difference between the first and second statistical measures ($\mu_1$, $\mu_2$), and an example of a threshold difference of the histogram 1000. The threshold difference is provided merely as an example. A different threshold difference may be used. For example, different vehicles 104 (shown in FIG. 1) may have different associated thresholds.

TABLE 2

| | Motor 102A | Motor 102B | Motor 102C | Motor 102D | Motor 102E | Motor 102F |
|---|---|---|---|---|---|---|
| Fault measures (902) | 15.0 | 11.0 | 13.0 | 12.0 | 13.0 | 10.0 |
| First statistical measure ($\mu_1$) | 11.8 | 12.6 | 12.2 | 12.4 | 12.2 | 12.8 |
| Second statistical measure ($\mu_2$) | 12.3 | 12.3 | 12.3 | 12.3 | 12.3 | 12.3 |
| Difference ($\mu_1 - \mu_2$) | −0.53 | 0.27 | −0.13 | 0.07 | −0.13 | 0.47 |
| Threshold | −0.8 | −0.8 | −0.8 | −0.8 | −0.8 | −0.8 |
| Fault? | N | N | N | N | N | N |

As shown in the bottom three rows of Table 2, all of the motors 102 have differences between the first and second statistical measures ($\mu_1$, $\mu_2$) that are smaller than the threshold. Alternatively, the absolute values of the differences between the first and second statistical measures ($\mu_1$, $\mu_2$) for all motors 102 are smaller than the absolute value of the above threshold (e.g., +0.8). Therefore, the analysis module 308 (shown in FIG. 3) may not identify any motor 102 as likely to fail or more likely to mechanically fail than any of the other motors 102.

The analysis module 308 (shown in FIG. 3) can generate a failure detection signal based on identification of a predicted failure motor. For example, once the analysis module 308 determines that one or more of the motors 102 (shown in FIG. 1) is likely to mechanically fail or is more likely to mechanically fail before one or more other motors 104, the analysis module 308 can generate a failure detection signal. The failure detection signal may be an electric signal that is conveyed to an output device, such as the display device 112 (shown in FIG. 1). The display device 112 may generate a visual output, such as text and/or graphics, to an operator based on the failure detection signal to notify the operator of the potential motor failure. Based on the failure detection signal, the operator may stop the vehicle 104 (shown in FIG. 1) and/or shut down operation of the predicted failure motor.

In another embodiment, the failure detection signal may be used to control operation of the vehicle 104 (shown in FIG. 1). For example, the system 100 (shown in FIG. 1) may convey the failure detection signal from the analysis module 308 (shown in FIG. 3) to the control subsystem 114 (shown in FIG. 1) of the vehicle 104. The control subsystem 114 may automatically shut down or reduce the operating speed of the motor 102 that is identified as the predicted failure motor based on the failure detection signal.

In another embodiment, the failure detection signal may be used to automatically schedule or arrange for maintenance on the motor 102 (shown in FIG. 1) that is identified as the predicted failure motor by the failure detection signal. For example, the analysis module 308 (shown in FIG. 3) may communicate the failure detection signal to the control subsystem 114 (shown in FIG. 1). The control subsystem 114 may communicate with a service center, such as a rail yard or other facility capable of repairing the motor 102, when the failure detection signal is received to schedule a time for the motor 102 to be serviced. Alternatively, the control subsystem 114 may change the direction and/or tracks that the vehicle 104 is traveling upon receipt of the failure detection signal. For example, the control subsystem 114 may change the course of the vehicle 104 so that the vehicle 104 travels to a location where the motor 102 associated with the failure detection signal can be serviced (e.g., a service center). In one embodiment, the control subsystem 114 may direct the display device 112 to output one or more steps or operations that may be used to identify and/or repair the motor 102 associated with the failure detection signal.

Returning to the discussion of the system 100 shown in FIG. 3, in another embodiment, the analysis module 308 (shown in FIG. 3) may examine a subset or portion of characteristics of the electrical energy delivered to the motor 102 from the power source 110 in order to identify fault measures 902 (shown in FIG. 9) of the motors 102. For example, the signature generation module 306 (shown in FIG. 3) can create a discrete electrical signature 1100 (shown in FIG. 11) by converting a subset of the time domain-based characteristics of the electrical energy into the frequency domain, with the subset based on the operating speed of the motor 102. The subset of the characteristics may be referred to a "frequency band of interest."

In one embodiment, the signature generation module 306 receives the characteristics of the electrical energy that are sensed by the sensors 310. The signature generation module 306 receives the operating speed of the motor 102 from the speed sensor 318. Based on the operating speed, the signature generation module 306 can determine the fundamental frequency ($f_0$) that is associated with the operating speed. For example, the signature generation module 306 may refer to a table, list, database, or other memory structure that correlates different operating speeds with different fundamental frequencies ($f_0$). The signature generation module 306 can retrieve the fundamental frequency ($f_0$) that corresponds to the operating speed. Alternatively, a frequency other than the fundamental frequency ($f_0$) can be identified based on the operating speed.

The signature generation module 306 may determine the frequency band of interest based on the operating speed. For example, the signature generation module 306 may establish the frequency band of interest encompassing a range of frequencies that include the fundamental frequency ($f_0$). The signature generation module 306 establishes the frequency band of interest from a lower frequency limit to an upper frequency limit, with the lower and upper frequency limits based on the fundamental frequency ($f_0$). The frequency band of interest may be determined according to the following relationships:

$$f_L = f_0 - \Delta f \quad \text{(Equation \#1)}$$

$$f_U = f_0 + \Delta f \quad \text{(Equation \#2)}$$

$$\Delta f = \frac{f_0}{C} \quad \text{(Equation \#3)}$$

where $f_L$ represents the lower frequency limit, $f_0$ represents the fundamental frequency, $f_U$ represents the upper frequency limit, $\Delta f$ represents a portion of the fundamental frequency ($f_0$), and C represents a numerical constant. The value of C may vary depending on the type of vehicle 104, motor 102, and/or other factors. In one embodiment, the value of C is 3. Alternatively, the value of C may be 2, 4, or another value, for example.

The signature generation module 306 can apply a discrete Fourier transform based on the frequency band of interest to reduce the amount of data or information that is used by the system 100 to identify disturbance peaks associated with the motor 102. For example, in the matrix of time domain-based characteristics of the electrical energy that are received from the sensors 310, the signature generation module 306 may only transform those characteristics that correspond with frequencies within the frequency band of interest. In one embodiment, a discrete Fourier transform and/or a fast Fourier transform is used to convert the time domain-based characteristics associated with the frequency band of interest into the frequency domain. Alternatively, another transform may be used.

Figure 11:
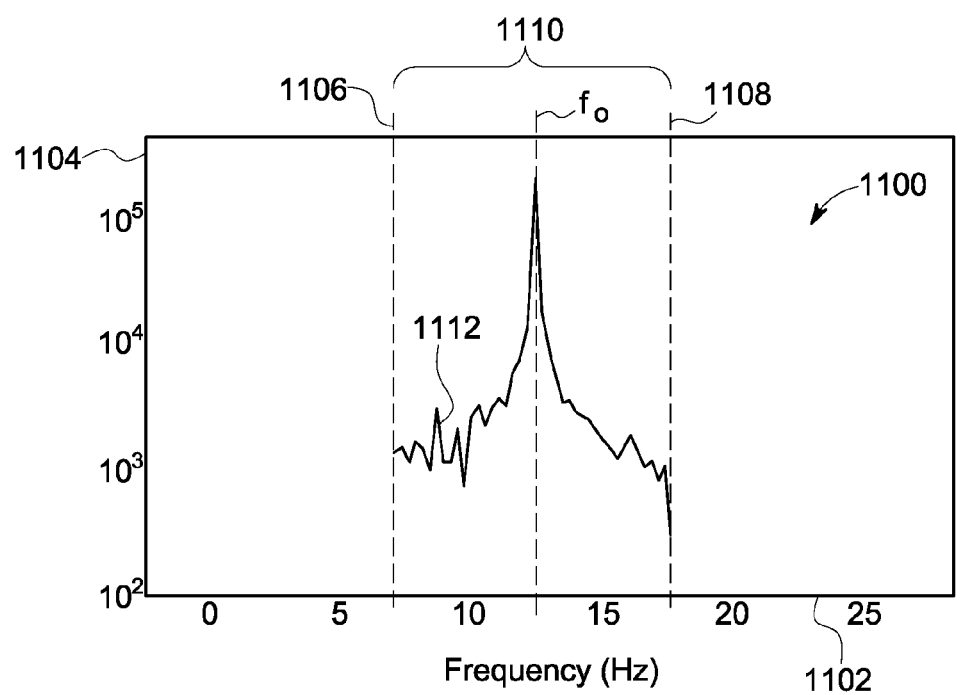
FIG. 11 is one example of a discrete electrical signature of the motor shown in FIG. 1.

FIG. 11 is one example of a discrete electrical signature 1100 of the motor 102 (shown in FIG. 1). The electrical signature 1100 is shown alongside a horizontal axis 1102 representative of frequency and a vertical axis 1104 representative of amplitude, or magnitude, of the frequencies. As shown in FIG. 11, the electrical signature 1100 extends from a lower frequency limit 1106 to an upper frequency limit 1108 of a frequency band of interest 1110 that encompasses the fundamental frequency ($f_0$) of the motor 102.

The analysis module 308 (shown in FIG. 3) of the system 100 (shown in FIG. 1) can use the electrical signature 1100 to identify one or more disturbance peaks 1112. For example, the analysis module 308 may examine a low frequency range of the electrical signature 1100 for disturbance peaks 1112, as described above. The analysis module 308 can obtain several electrical signatures 1100 and calculate an average, median, root mean square, or other statistical measure of the electrical signatures 1100 to identify the disturbance peak 1112 similar to the manner in which the disturbance peak 708 (shown in FIG. 7) is identified as described above. The identification of the disturbance peak 1112 may then be used to create a fault measure for the motor 102, as described above. The analysis module 308 can compare the fault measures of the motors 102 to identify which motors 102 are likely to mechanically fail, or are more likely than one or more other motors 102 of the vehicle 104 (shown in FIG. 1), as described above. The use of the frequency band of interest 1110 to identify disturbance peaks 1112 can result in faster computation and identification of fault measures of the motors 102, and/or can involve lower computational and power costs.

Returning to the discussion of the system 100 shown in FIG. 3, in another embodiment, the analysis module 308 (shown in FIG. 3) may examine and compare several peaks in a frequency spectrum that are associated with characteristics of the electrical energy delivered to the motor 102 from the power source 110 in order to identify fault measures 902 (shown in FIG. 9) of the motors 102. For example, the signature generation module 306 (shown in FIG. 3) can create a motor electrical signature 1200 (shown in FIG. 12) that is similar to one or more of the motor electrical signatures 500, 600 (shown in FIGS. 5 and 6). The analysis module 308 can examine peaks of the motor electrical signature 1200 to identify a speed-related peak and one or more additional peaks. The analysis module 308 may then select one or more of the additional peaks as a disturbance peak. The disturbance peak may be used to calculate a fault measure. For example, the root mean square value of an amplitude of the disturbance peak may be used as a fault measure. As described above, the fault measures for each motor 102 can be compared to the fault measures of other motors 102 to identify a motor 102 that is likely to mechanically fail or is more likely than one or more other motors 102 to mechanically fail.

Figure 12:
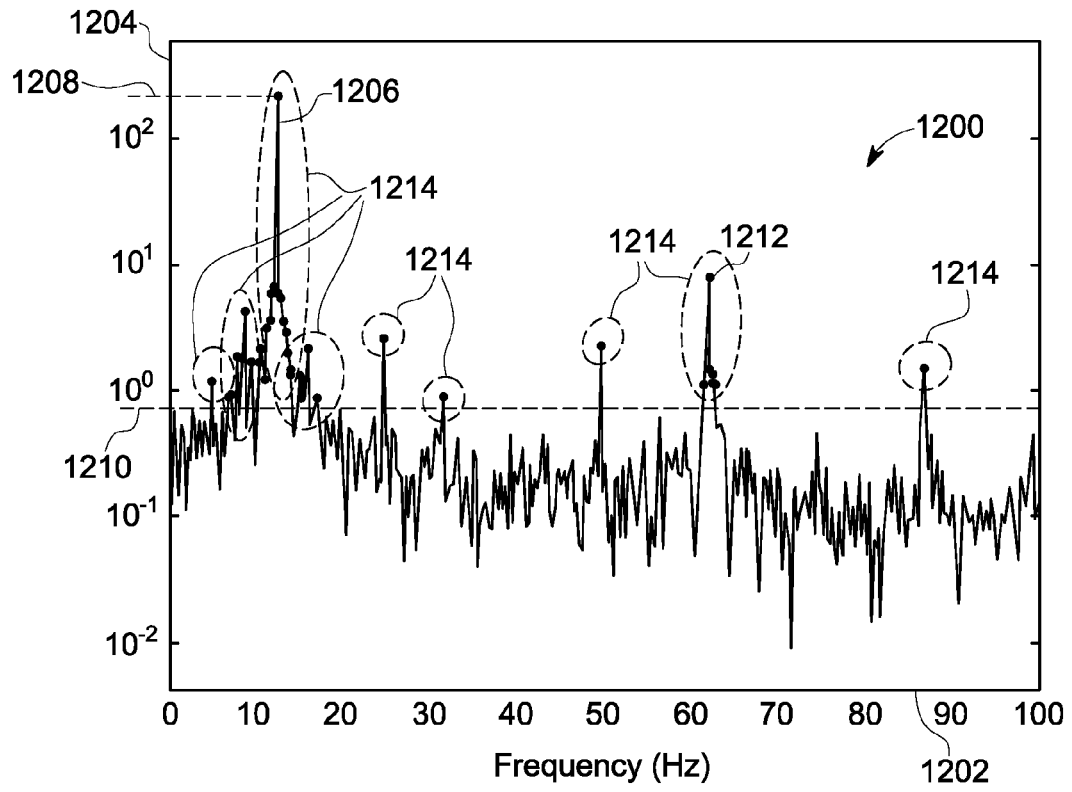
FIG. 12 is another example of a motor electrical signature.

FIG. 12 is another example of a motor electrical signature 1200 of the motor 102 (shown in FIG. 1). The electrical signature 1200 is shown alongside a horizontal axis 1202 representative of frequency and a vertical axis 1204 representative of amplitude, or magnitude, of the frequencies. The analysis module 308 (shown in FIG. 3) of the system 100 (shown in FIG. 1) can use the motor electrical signature 1200 to identify a speed-related peak 1206. For example, the analysis module 308 may identify the peaks having larger amplitudes than one or more other peaks. In one embodiment, the analysis module 308 identifies the speed-related peak 1206 by determining which peak has the largest amplitude 1208 or has an amplitude 1208 that exceeds a predetermined threshold.

The analysis module 308 (shown in FIG. 3) may then determine if the motor electrical signature 1200 includes additional peaks other than the speed-related peak 1206 based on amplitudes of the additional peaks. The additional peaks can be identified by determining which peaks of the motor electrical signature 1200 exceed a threshold 1210 that is based on the amplitude 1208 of the speed-related peak 1206. In the illustrated embodiment, the threshold 1210 is based on the amplitude 1208 such that the threshold 1210 is not a predetermined threshold, but is a threshold that varies with the magnitude of the speed-related peak 1206.

The analysis module 308 (shown in FIG. 3) identifies several additional peaks 1212 that exceed the threshold 1210. For the sake of clarity, not all of the additional peaks 1212 are shown with the reference number 1212 in FIG. 12. Instead, a dot is placed at each of the additional peaks 1212 in FIG. 12. In the illustrated embodiment, approximately 27 additional peaks 1212 are shown hi FIG. 12. The analysis module 308 can examine where the additional peaks 1212 occur, such as by determining which frequencies along the horizontal axis 1202 correspond to each of the additional peaks 1212. Based on the frequencies at which the additional peaks 1212 occur, the analysis module 308 may identify "clusters," or groups 1214 of the additional peaks 1212.

A "cluster" or group 1214 of the additional peaks 1212 can represent one or more additional peaks 1212 that are relatively close to one another and/or separated from one or more other groups 1214. For example, a group 1214 may include additional peaks 1212 that are within a predetermined range or band of frequencies along the horizontal axis 1202. In another example, a group 1214 may include one or more additional peaks 1212 that are separated from one or more other peaks 1212 by at least a predetermined range or band of frequencies. With respect to the embodiment shown in FIG. 12, there are four groups 1214 that each includes a plurality of the additional peaks 1212 and that are located in the range of frequencies from 0 to 20 Hertz. Another group 1214 of a plurality of the additional peaks 1212 is located near 60 Hertz. Several groups 1214 include a single additional peak 1212. For example, the groups 1214 located at or near the frequencies of 22 Hertz, 30 Hertz, 48 Hertz, and 85 Hertz each include a single additional peak 1212. The single additional peak 1212 of each of these groups 1214 may be separated from the other additional peaks 1212 by at least 5 Hertz, in one example. The analysis module 308 examines the additional peaks 1212 within each group 1214 and selects at least one of the additional peaks 1212 in each group 1214 as a representative disturbance peak.

Figure 13:
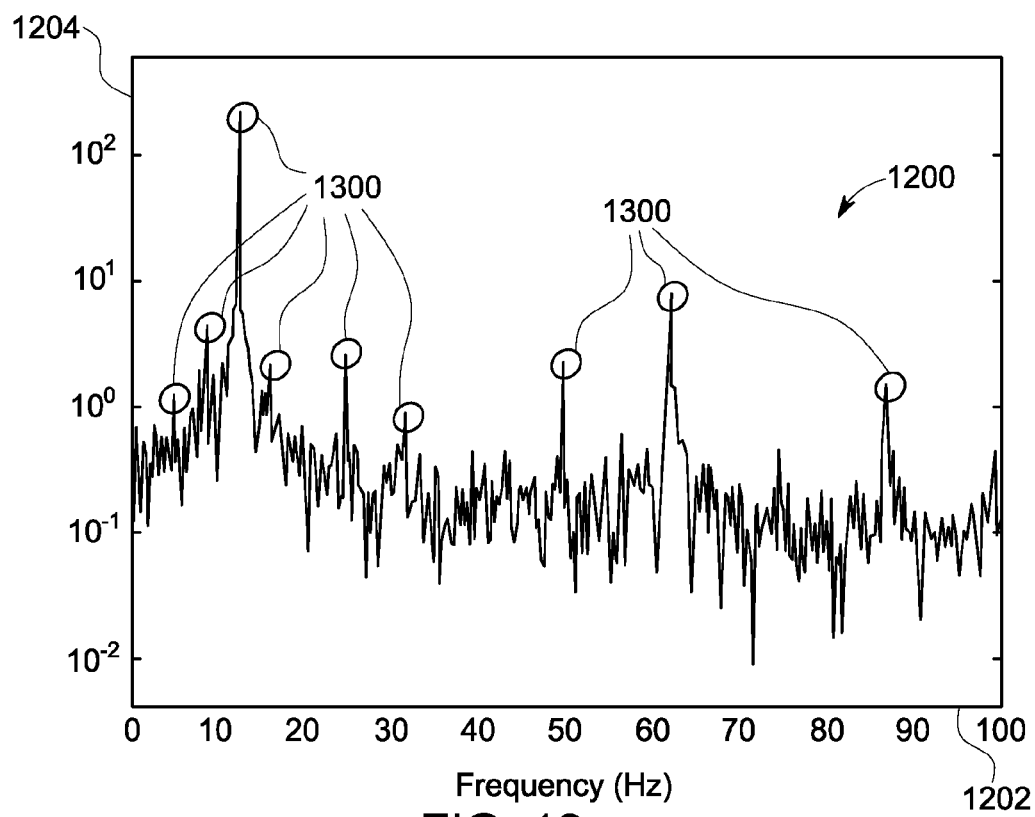
FIG. 13 illustrates the motor electrical signature of FIG. 12 with several representative disturbance peaks.

FIG. 13 illustrates the motor electrical signature 1200 of FIG. 12 with several representative disturbance peaks 1300. Similar to FIG. 12, FIG. 13 illustrates the electrical signature 1200 alongside the horizontal axis 1202 representative of frequency and the vertical axis 1204 representative of amplitude, or magnitude, of the frequencies. The analysis module 308 (shown in FIG. 3) selects the representative disturbance peaks 1300 from the groups 1214 shown in FIG. 12 by comparing the additional peaks 1212 (shown in FIG. 12) within each group 1214. For example, the analysis module 308 may select the additional peak 1212 in each group 1214 having the largest amplitude or an amplitude that is larger than one or more other additional peaks 1212 within the same group 1214 as the representative disturbance peak 1300 of that group 1214. Alternatively, the analysis module 308 may select the additional peak 1212 in the group 1214 having an amplitude that is closest to an average, median, or other statistical measure of the additional peaks 1212 in the same group 1214 as the representative disturbance peak 1300 of that group 1214. In another embodiment, another technique may be used to identify the representative disturbance peaks 1300 of the groups 1214.

As described above, the disturbance peaks 1300 can be analyzed to determine fault measures for the motor 102 (shown in FIG. 1) for which the motor electrical signature 1200 is generated. For example, root mean square or other statistical measures may be obtained for the amplitudes of the disturbance peaks 1300 and the room mean square or other measures may be compared to one or more thresholds. Those disturbance peaks 1300 having root mean square or other measures that exceed the threshold may be identified as fault measures of the motor 102 while other disturbance peaks 1300 may not be identified as fault measures. As described above, the fault measures for each motor 102 can be compared to the fault measures of other motors 102 to determine if one or more of the motors 102 is likely to mechanically fail or is more likely than one or more other motors 102 to mechanically fail.

Returning to the discussion of the system 100 shown in FIG. 1, in another embodiment, the system 100 may examine one or more electrical inductance characteristics of the motor 102 to generate a motor electrical signature and, based on the signature, determine if the motor 102 is associated with one or more fault measures. For example, the motor electrical signature of the motor 102 may represent one or more inductance characteristics, such as mutual inductances between the rotor 202 (shown in FIG. 2) and the stator 200 (shown in FIG. 2) of the motor 102, self inductance of the rotor 202 or stator 200, and/or leakage inductance of the rotor 202 and/or stator 200. Variation of one or more of the inductance characteristics over time may indicate fault measures of the motor 102. As described above, the fault measures can be used to determine if one or more motors 102 are likely to fail.

In one embodiment, one or more of the sensors 310 monitor electric voltage and electric current that is supplied to, and/or demanded by, the motor 102 along the corresponding conductive pathways 312, 314, 316. For example, one or more of the sensors 310 may include a voltage sensor and a current sensor. The sensors 310 measure voltage and current supplied to the motor 102 and report the measured voltage and current to the system 100. The signature generation module 306 calculates one or more inductance characteristics based on the voltage and current and can generate a motor electrical signature that represents the inductance characteristics and/or variations in the inductance characteristics over time. The analysis module 308 examines the inductance characteristics to determine if one or more changes in the inductance characteristics indicate or are associated with a fault measure of the motor 102. As described above, the fault measures are used to determine if the motor 102 is likely to mechanically fail before the motor 102 actually fails.

In order to generate the motor electrical signature, the signature generation module 306 may transform the measured voltages and currents supplied to a three-phase AC motor 102 to two direct current (DC) quantities. For example, the signature generation module 306 may transform the three-phase AC circuits of the motor 102 into two DC circuits in order to calculate the inductance characteristics of the motor 102. In one embodiment, the signature generation module 306 uses a direct-quadrature transformation, such as a direct-quadrature-zero transformation (e.g., a dq0 or dqo transformation), a zero-direct-quadrature transformation (e.g., a 0dq or odq transformation), or Park's transformation, to transform the three-phase voltage and current measured by the sensors 310 into direct and quadrature (d and q, respectively) axes.

For example, the three phase voltages ($V_A$, $V_B$, $V_C$) and the three phase currents ($I_A$, $I_B$, $I_C$) that are supplied along the three conductive pathways 312, 314, 316 can be transformed into the d-q axes, or into d-q voltages ($V_D$, $V_Q$) and d-q currents ($I_D$, $I_Q$) using techniques known in the art, such as the transforms referred to above. The d-q voltages ($V_D$, $V_Q$) and d-q currents ($I_D$, $I_Q$) and used by the signature generation module 306 to calculate inductance characteristics and generate a motor electrical signature of the inductance characteristics.

Figure 14:
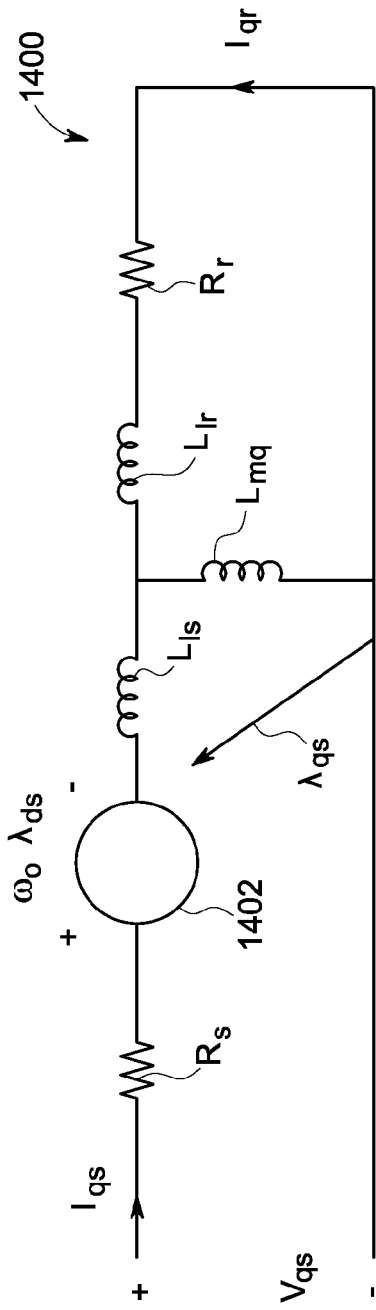
FIGS. 14 and 15 are diagrams of electric circuits of a three-phase alternating current motor in one embodiment.
Figure 15:
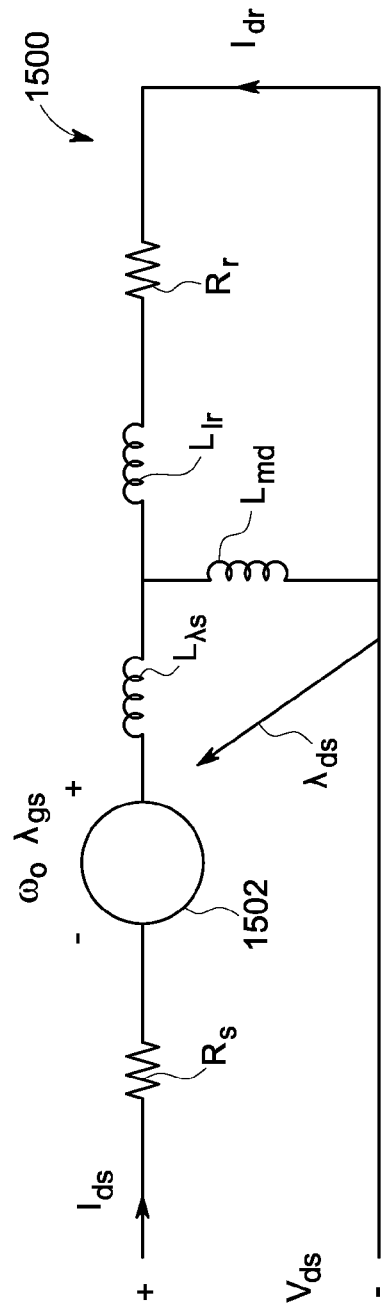

FIGS. 14 and 15 are diagrams of electric circuits 1400, 1500 that represent the d-q transformation of the three-phase AC motor 102 in one embodiment. For example, the circuit 1400 represents the direct axis portion of the d-q transformation of the voltage and current supplied to the motor 102 and may be referred to as the d-axis circuit 1400. The circuit 1500 represents the quadrature axis portion of the d-q transformation of the voltage and current and may be referred to as the q-axis circuit 1500. The circuits 1400, 1500 include several components representative of different electrical characteristics of the motor 102 and the voltage and current supplied to the motor 102. For example, the circuit 1400 includes a stator resistor ($R_S$) that represents an electric resistance characteristic of the stator 200 (shown in FIG. 2) of the motor 102, a coil 1402 representative of the conductive coils wound around the stator 200 and that receive the three-phase current to power the motor 102, as is known in the art, a stator inductor ($L_{LS}$) representative of a leakage inductance characteristic of the stator 200, a q-axis mutual inductor ($L_{MQ}$) representative of a mutual inductance characteristic of the rotor 202 and the stator 200, a rotor inductor ($L_{LR}$) representative of a leakage inductance characteristic of the rotor 202, and a rotor resistor ($R_R$) that represents an electric resistance characteristic of the rotor 202. The symbol $\lambda_{DS}$ represents d-axis flux linkage on the stator side of the motor 102. The symbol $\lambda_{QS}$ represents q-axis flux linkage on the stator side of the motor 102. The symbol $\omega_0$ represents a rotation speed of the rotor 202 inside the stator 200. The symbol $I_{QS}$ represents the q-axis transformation of the electric current that is supplied to the stator 200. The symbol $I_{QR}$ represents the q-axis transformation of the electric current that is induced in the rotor 202. The symbol $V_{QS}$ represents the q-axis transformation of the voltage supplied to the stator 200.

Similarly, the circuit 1500 includes the stator resistor ($R_S$), a coil 1502 representative of the conductive coils wound around the stator 200 (shown in FIG. 2) of the motor 102 and that receive the three-phase current to power the motor 102, as is known in the art, the stator inductor ($L_{LS}$), a d-axis mutual inductor ($L_{MD}$) representative of a mutual inductance characteristic of the rotor 202 and the stator 200, the rotor inductor ($L_{LR}$), and a rotor resistor ($R_R$) that represents an electric resistance characteristic of the rotor 202. The symbol $I_{DS}$ represents the d-axis transformation of the electric current that is supplied to the stator 200. The symbol $I_{DR}$ represents the d-axis transformation of the electric current that is induced in the rotor 202. The symbol $V_{DS}$ represents the d-axis transformation of the voltage supplied to the stator 200.

Based on the d-axis circuit 1400 and the q-axis circuit 1500, several equations are derived that represent relationships between various electric characteristics of the voltage, current, and the components of the circuits 1400, 1500, as is known in the art. For example, the following relationships may be derived from the circuits 1400, 1500:

$$V_{QS} = (I_{QS} \times R_S) + (\omega_0 \times \lambda_{DS}) + \lambda_{QS} \quad \text{(Equation \#4)}$$

$$V_{DS} = (I_{DS} \times R_S) + (\omega_0 \times \lambda_{QS}) + \lambda_{DS} \quad \text{(Equation \#5)}$$

$$\lambda_{QS} = I_{QS} \times (L_{LS} + L_{MQ}) + (I_{QR} \times L_{MQ}) \quad \text{(Equation \#6)}$$

$$\lambda_{DS} = I_{DS} \times (L_{LS} + L_{MD}) + (I_{DR} \times L_{MD}) \quad \text{(Equation \#7)}$$

The above relationships expressed in Equations 5 through 7 can be used to solve for the values of the d-axis mutual inductance characteristic of the circuit 1400 (e.g., solve for $L_{MD}$) and the values of the q-axis mutual inductance characteristic of the circuit 1500 (e.g., solve for $L_{MQ}$). For example, the electric resistance characteristic of the stator resistor ($R_S$) may be known, the rotational speed ($\omega_0$) of the rotor 202, the d-axis flux linkage ($\lambda_{DS}$) and the q-axis flux linkage ($\lambda_{QS}$) may have known values. The values of the d-axis and q-axis voltages ($V_{DS}$, $V_{QS}$) and the values of the d-axis and q-axis currents ($I_{DS}$, $I_{QS}$) may be calculated based on the measured three-phase voltages ($V_A$, $V_B$, $V_C$), and the three phase currents ($I_A$, $I_B$, $I_C$), as described. As the three-phase voltages ($V_A$, $V_B$, $V_C$) and the three phase currents ($I_A$, $I_B$, $I_C$) (and, as a result, the d-axis and q-axis voltages ($V_{DS}$, $V_{QS}$) and the d-axis and q-axis currents ($I_{DS}$, $I_{QS}$)) may change over time, the signature generation module 306 may calculate various values the d-axis mutual inductance characteristic ($L_{MD}$) and the q-axis mutual inductance characteristic ($L_{MQ}$) as time passes.

Figure 16:
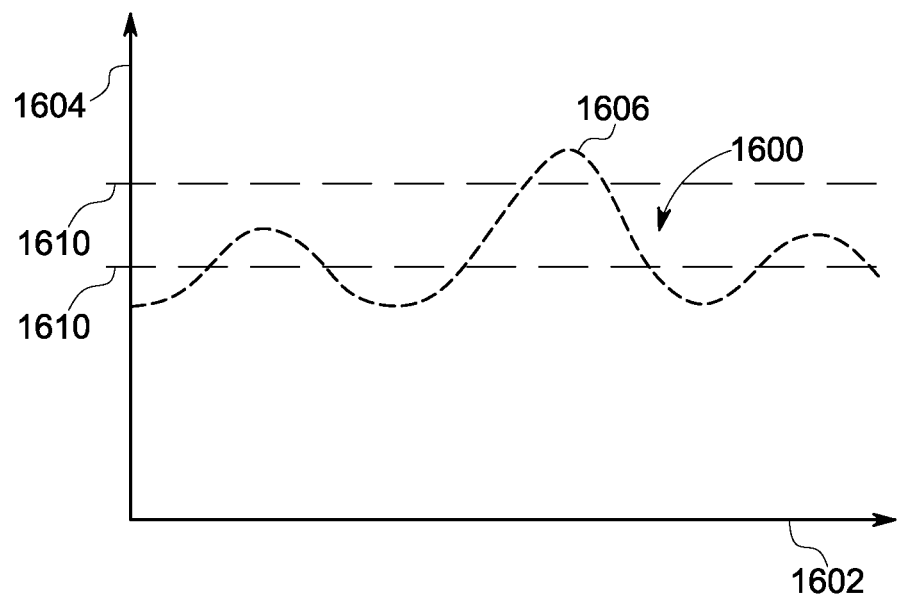
FIG. 16 is another example of a motor electrical signature.

FIG. 16 is another example of a motor electrical signature 1600 of the motor 102 (shown in FIG. 1). The motor electrical signature 1600 is shown alongside a horizontal axis 1602 that represents time and a vertical axis 1604 that represents magnitudes the motor electrical signature 1600. The motor electrical signature 1600 represents one or more of the inductance characteristics of the motor 102 (shown in FIG. 1) over time. For example, the motor electrical signature 1600 can represent a mutual inductance characteristic ($L_M$) of the motor 102 that is based on the following relationship:

$$L_M = (L_{MQ} + jL_{MD})e^{j\theta} \qquad \text{(Equation \#8)}$$

where $L_M$ represents the mutual inductance characteristic used to generate the motor electrical signature 1600, $L_{MQ}$ represents the q-axis mutual inductance characteristic of the d-axis circuit 1500 (shown in FIG. 15), $L_{MD}$ represents the d-axis mutual inductance characteristic of the q-axis circuit 1600 (shown in FIG. 16), j represents a tessarine number (e.g., $i*j=j*i$, $j^2=+1$, and $i^2=-1$), and $\theta$ represents a rotation position of the rotor 202 (shown in FIG. 2) of the motor 102 within the stator 200 (shown in FIG. 2) of the motor 102. The rotation position of the rotor 202 changes over time as the rotor 202 rotates within the stator 200. For example, a baseline value 1610 can represent an idealized mutual inductance characteristic ($L_M$) of an ideal motor 102. Deviations in the actual mutual inductance characteristic ($L_M$) from the baseline value 1610 (e.g., the undulating shape of the motor electrical signature 1600 shown in FIG. 16) may indicate imperfections in the motor 102 and/or a component of the motor 102 that is tending toward failure (e.g., a bearing, gear, or axle that is locking up or exhibiting increased friction).

As shown in FIG. 16, the motor electrical signature 1600 may change over time in an approximately periodic manner. For example, the mutual inductance characteristic ($L_M$) may periodically vary. The variation in the mutual inductance characteristic ($L_M$) may be due at least in part to a mechanical component of the motor 102 (shown in FIG. 1) (e.g., a bearing) or connected to the motor 102 (e.g., a gearbox or axle). For example, each time that a bearing in the motor 102 having increased friction with the rotor 202 and/or stator 200 (relative to other bearings) cycles around within the motor 102, the bearing can cause an increase in the mutual inductance characteristic ($L_M$) when the bearing reaches the same or similar position. In the motor electrical signature 1600 shown in FIG. 16, a peak 1606 in the motor electrical signature 1600 may be associated with a bearing, gear, axle, or the like, having increased friction. Additional peaks 1606 may periodically appear in the motor electrical signature 1600 over time.

The analysis module 308 (shown in FIG. 3) of the system 100 (shown in FIG. 3) can compare the motor electrical signature 1600 to one or more thresholds. In the illustrated embodiment, the analysis module 308 compares the motor electrical signature 1600 to an upper threshold 1608. If the motor electrical signature 1600 exceeds the upper threshold 1608, as does the motor electrical signature 1600 at the peak 1606, the analysis module 308 may identify the peak 1606 as a disturbance peak. For example, the peak 1606 may be identified as a disturbance peak representative of a fault measure of the motor electrical signature 1600. The detection of the disturbance peak in the motor electrical signature 1600 may be treated as a fault measure of the motor 102 (shown in FIG. 1). For example, the occurrence of the disturbance peak 1606 may be counted as a fault measure. Additional disturbance peaks 1606 may be counted as additional fault measures. As described above, the number of fault measures for the motor 102 may be compared to the number of fault measures of the other motors 102 to identify motors 102 that are likely to mechanically fail.

Returning to the discussion of the system 100 shown in FIG. 3, in another embodiment, the system 100 (shown in FIG. 1) may obtain one or more characteristics associated with, the motor 102 from the speed sensor 318. For example, the system 100 may receive electric inductance characteristics from the speed sensor 318 and the signature generation module 306 can create a motor electrical signature based on the inductance characteristics. The inductance characteristics can be based on an electric current that is induced in the speed sensor 318 by the magnetic field created within the motor 102 between the stator 200 (shown in FIG. 2) and the rotor 202 (shown in FIG. 2).

Figure 17:
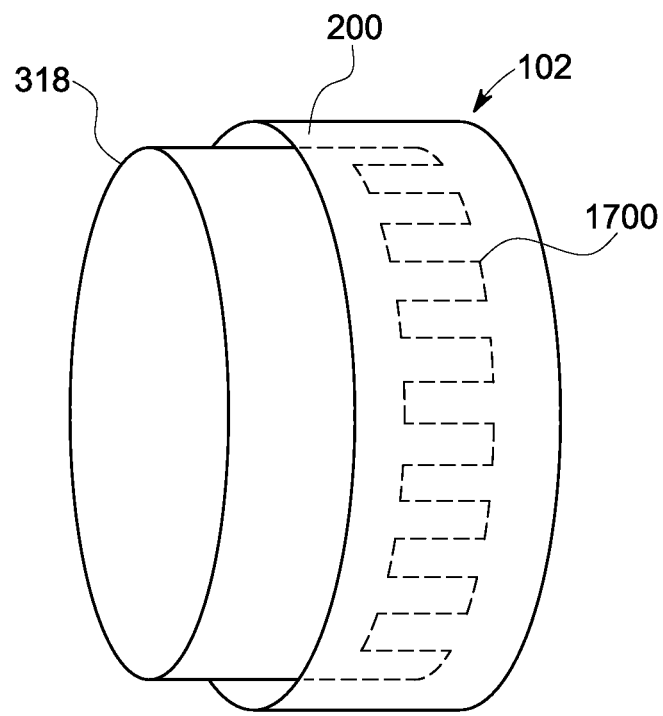
FIG. 17 is a schematic illustration of a speed sensor shown in FIG. 3 coupled to the motor shown in FIG. 1 in accordance with one embodiment.

FIG. 17 is a schematic illustration of the speed sensor 318 coupled to the motor 102 in accordance with one embodiment. The speed sensor 318 includes one or more conductive extensions 1700 that are disposed between the rotor 202 (shown in FIG. 2) and the stator 200 of the motor 102. The rotor 202 is not visible in the view shown in FIG. 17 as the speed sensor 318 is disposed over the rotor 202. The speed sensor 318 may be coupled with the rotor 202 such that the rotor and the extensions 1700 of the speed sensor 318 rotate within the stator 200.

As described above, the stator 200 generates a magnetic field based on the electric energy received from the power source 110 (shown in FIG. 1). Electric current can be induced in the extensions 1700 of the speed sensor 318 by the magnetic field. Changes in the magnetic field can cause the rotation speed of the rotor 202 (shown in FIG. 2) and the induced current in the extensions 1700 to change. For example, increases in the magnetic field can speed up rotation of the rotor 202 and increase the induced current in the extensions 1700. Conversely, decreases in the magnetic field can reduce rotation of the rotor 202 and decrease the induced current in the extensions 1700. If one or more components of the motor 102 are tending toward failure (e.g., friction is increasing with a bearing between the rotor 202 and the stator 200), then an increased amount of current may be demanded by the motor 102 to keep the rotor 202 rotating at a desired or set rotational speed. The increase in current associated with the failing component can result in a temporary increase in the magnetic field of the motor 102 and, as a result, a temporary increase in the induced current in one or more of the extensions 1700.

Figure 18:
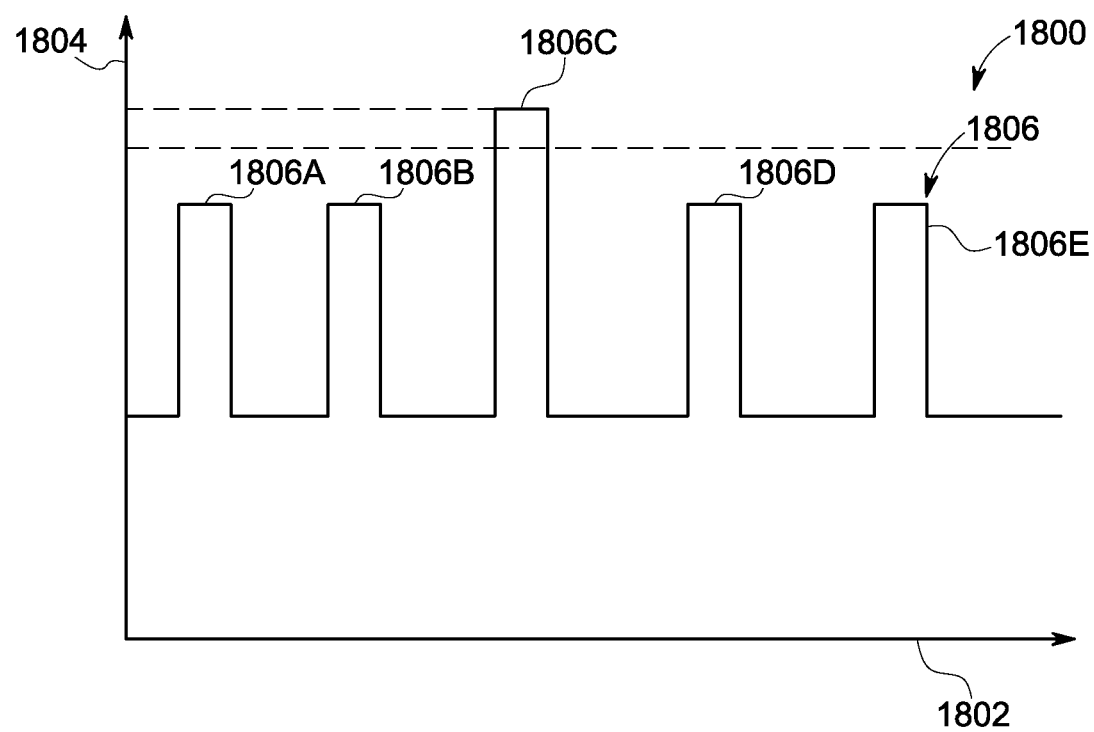
FIG. 18 is another example of a motor electrical signature.

FIG. 18 is another example of a motor electrical signature 1800 of the motor 102 (shown in FIG. 1). The motor electrical signature 1800 is shown alongside a horizontal axis 1802 that represents time and a vertical axis 1804 that represents magnitude of an electric current that is induced in one or more of the extensions 1700 (shown in FIG. 17) of the speed sensor 318 (shown in FIG. 3). The motor electrical signature 1800 represents the magnitude of electric current that is induced in one or more of the extensions 1700 of the speed sensor 318 over time. As shown in FIG. 18, the motor electrical signature 1800 includes several peaks 1806, or temporary increases, in the electric current that is induced in the one or more extensions 1700. Each peak 1806 can represent the extension 1700 passing by one or more of the windings in the stator 200 (shown in FIG. 2) of the motor 102 in one embodiment. The peaks 1806 are generally referred to by the reference number 1806 and are individually referred to by the reference number 1806A, 1806B, 1806C, and so on.

In one embodiment, the peaks 1806 represent averages, medians, or other statistical measures of the current that is induced in the extension 1700. For example, the increases in induced current in an extension 1700 may occur at predictable, predetermined, or known times based on the speed at which the extension 1700 and the rotor 202 (shown in FIG. 2) of the motor 102 rotate within the stator 202. The increases in the induced current in the extension 1700 may occur each time that the extension 1700 moves between one of the coils of the stator 200 and the rotor 202. Each peak 1806 may represent an average, median, or other statistical measure of the induced currents measured in the extension 1700 when the extension 1700 moves near the same coil in the stator 200.

The magnitude, or vertical height, of the peaks 1806 may be normalized based on an operating speed of the motor 102 (shown in FIG. 1). As described above, the magnetic field generated by the coils of the stator 200 (shown in FIG. 2) of the motor 102 increases to increase the operating speed of the motor 102 and decreases to decrease the operating speed of the motor 102. The measured current that is induced in the one or more extensions 1700 (shown in FIG. 17) of the speed sensor 318 (shown in FIG. 3) may be normalized for such increases in magnetic field so that the peaks 1806 do not significantly change due solely to changes in the operating speed of the motor 102.

In one embodiment, the analysis module 308 (shown in FIG. 3) of the system 100 (shown in FIG. 1) examines amplitudes of the peaks 1806 to determine if one or more bearings of the motor 102 (shown in FIG. 1) are tending toward failure. The amplitudes can be represented as the magnitudes or vertical heights of the peaks 1806. As described above, a bearing that is beginning to lock up, seize up, or otherwise fail may cause increased friction between the rotor 202 (shown in FIG. 2) and the stator 200 (shown in FIG. 2) of the motor 102. The increased friction may require additional current to be at least temporarily supplied to one or more coils of the stator 200 (shown in FIG. 2) of the motor 102 in order for the motor 102 to maintain an operating speed. The additional current may cause a temporary increase in the magnetic field at or near the coil of the stator 200 that receives the increased current. The temporary increase in the magnetic field can increase the amount of current that is induced in one or more of the extensions 1700 (shown in FIG. 17) of the speed sensor 318 (shown in FIG. 3). In the illustrated example, such an increase in the induced current is shown in the peak 1806C.

The analysis module 308 (shown in FIG. 3) may identify the peak 1806C (and other peaks 1806 that may be the result of an increased magnetic field in the motor 102 that is associated with a bearing having increased friction with the rotor 202 or stator 200) by comparing the motor electrical signature 1800 to one or more energy thresholds 1808. In the illustrated example, the analysis module 308 identifies only the peak 1806C as exceeding the threshold 1808 because the peak 1806C has an amplitude 1810 that exceeds the threshold 1808, while the other peaks 1806A, 1806B, 1806D, 1806E do not have amplitudes that exceed the threshold 1808. As a result, the analysis module 308 may identify the peak 1806C as a disturbance peak.

As described above, disturbance peaks in the motor electrical signature 1800 may indicate a potential impending mechanical failure of the motor 102 (shown in FIG. 1) associated with the motor electrical signature 1800. The analysis module 308 (shown in FIG. 3) can calculate a fault measure based on the disturbance peaks in the motor electrical signature 1800. The fault measure may be the number of disturbance peaks that are identified in the motor electrical signature 1800, as described above. The fault measures for each of the motors 102 of a common vehicle 104 (shown in FIG. 1) can be compared to determine which, if any, of the motors 102 are likely to mechanically fail and/or are more likely to mechanically fail than one or more other motors 102.

Figure 19:
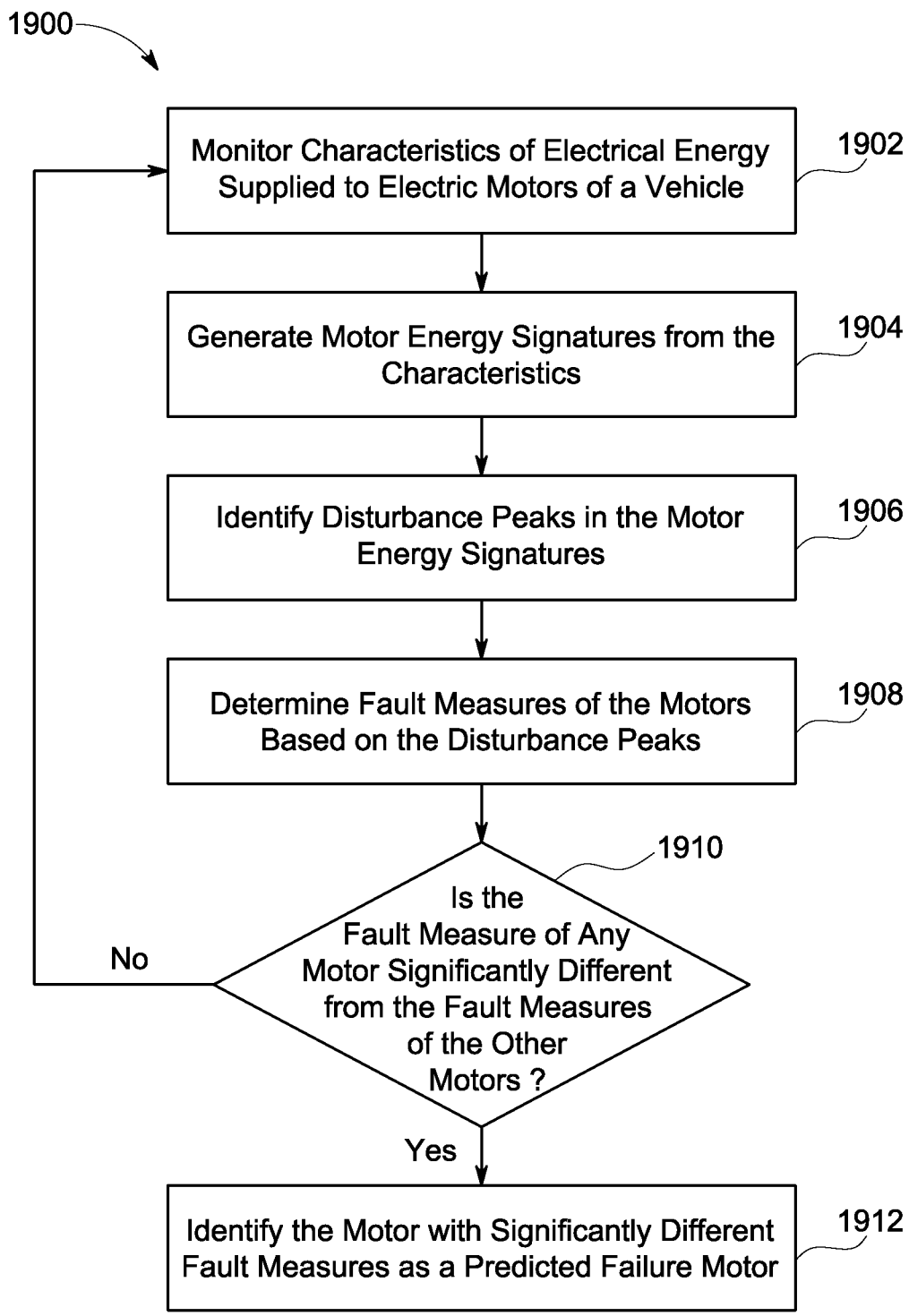
FIG. 19 is a flowchart of a method for predicting mechanical failure of a motor in a vehicle.

FIG. 19 is a flowchart of a method 1900 for predicting mechanical failure of a motor in a vehicle. The method 1900 may be used in conjunction with the failure prediction system 100 (shown in FIG. 1) to predict which motors 102 (shown in FIG. 1) of a vehicle 104 (shown in FIG. 1) are likely to mechanically fail in the relatively near future and/or which motors 102 are more likely to mechanically fail than one or more other motors 102. The motors 102 that are predicted as likely to mechanically fail may be identified as motors 102 that require repair or service.

At 1902, one or more characteristics of electrical energy that is supplied to each of a plurality of motors 102 (shown in FIG. 1) of a vehicle 104 (shown in FIG. 1) are monitored. For example, the current or voltage that is supplied to the motors 102, the inductances of the motors 102, the current that is induced in one or more conductive bodies (e.g., the extensions 1700 of the speed sensor 318 shown in FIG. 17) by the magnetic fields of the motors 102, and the like, may be monitored over time.

At 1904, one or more motor electrical signatures of the characteristics are generated for the motors. As described above, the motor electrical signatures may include frequency-domain representations of the characteristics (e.g., the motor electrical signatures 500, 600, 700, 1100, 1200 shown in FIGS. 5, 6, 7, 11, and 12), time-domain representations of mutual inductances between the rotor 202 and the stator 200 (shown in FIG. 2) of the motor 102 (e.g., the motor electrical signature 1600 shown in FIG. 16), time-domain representations of current that is induced by the magnetic field of the motor 102 (e.g., the motor electrical signature 1800 shown in FIG. 18), and the like.

At 1906, the motor electrical signatures of the motors 102 (shown in FIG. 1) are examined to identify disturbance peaks in the motor electrical signatures. As described above, the disturbance peaks may indicate a potential impending mechanical failure of the motor 102. The motor electrical signatures can be examined in a variety of manners to identify the disturbance peaks, as described above.

At 1908, fault measures are determined for one or more of the motors 102 (shown in FIG. 1) based on the disturbance peaks identified in the motor electrical signatures of the motors 102. A fault measure for a motor 102 may be a count of the number of disturbance peaks that are detected for a motor 102. Alternatively, the fault measure may represent the number of disturbance peaks for a motor 102 that exceed one or more thresholds.

At 1910, a determination is made as to whether the fault measure of one or more of the motors 102 (shown in FIG. 1) is significantly different from the fault measures of one or more other motors 102 of the vehicle 104 (shown in FIG. 1).

In one embodiment, the average, median, or other statistical measure of the fault measures for a plurality or all of the motors 102 of the same vehicle 104 are compared to the average, median, or other statistical measure of the fault measures for a plurality or all of the motors 102 but for the motor 102 being examined. Alternatively, the fault measures for the motors 102 may be compared in another manner. If the average, median, or other measure of the fault measures for a plurality or all of the motors 102 differs by at least a threshold amount from the average, median, or other measure of the fault measures for a plurality or all of the motors 102 other than a motor 102 being examined, then the fault measures of the motor 102 being examined may indicate that the motor 102 being examined is likely to mechanically fail or is more likely to mechanically fail that one or more other motors 102. As a result, flow of the method 1900 flows to 1912.

On the other hand, if the average, median, or other measure of the fault measures for a plurality or all of the motors 102 does not differ by at least a threshold amount from the average, median, or other measure of the fault measures for a plurality or all of the motors 102 other than a motor 102 being examined, then the fault measures of the motor 102 being examined may not indicate that the motor 102 being examined is likely to mechanically fail or is more likely to mechanically fail that one or more other motors 102. As a result, flow of the method 1900 returns to 1902. For example, the method 1900 may return to 1902 in a loop-wise manner to collect more characteristics of the electrical energy supplied to the motors 102 and examine the characteristics to predict which motors 102, if any, are likely to mechanically fail or require repair.

At 1912, the motor 102 (shown in FIG. 1) having the fault measures that significantly differs from the fault measures of one or more, or all, of the other motors 102 of the same vehicle 104 (shown in FIG. 1) is identified as likely to fail. For example, the motor 102 may be identified as a predicted failure motor that requires repair or inspection to identify the cause(s) of the fault measures. The method 1900 may be used to identify the motors 102 that are likely to fail and/or require repair during operation of the vehicle 104 and the motors 102.

Another embodiment relates to a system and method for predicting mechanical failures of bearings (e.g., pinion-end bearings or other bearings) of electric traction motors in a vehicle (e.g., a locomotive or other rail vehicle) having plural traction motors. According to one aspect, a method comprises generating motor electrical signatures for the motors. The motor electrical signatures are representative of one or more characteristics of electrical energy that is supplied to the motors. Each motor can be a same type of motor and/or can include a same type of bearing as the other motors. (As discussed above, "same type" means the motors have one or more of the following characteristics: the same manufacturer part or part number, the same non-trivial electrical or mechanical characteristics, such that one motor or bearing could be swapped out for another without re-work of the motor or vehicle interface; or sufficiently similar electrical or mechanical characteristics such that the motors and bearings could be compared, according to the aspects of the inventive subject matter described herein, with successful results.) Alternatively, the motors and/or bearings may differ. The method further comprises identifying one or more fault measures of each of the motor electrical signatures. The fault measures are indicative of mechanical characteristics of the bearings of the motors. The method further comprises performing a comparison the one or more fault measures of each motor with the one or more fault measures of the other motors in the same vehicle. The method further comprises predicting a mechanical failure (e.g., predicting an impending mechanical failure, or predicting a remaining lifespan) of the bearing of one of the motors based on the comparison.

Figure 20A:
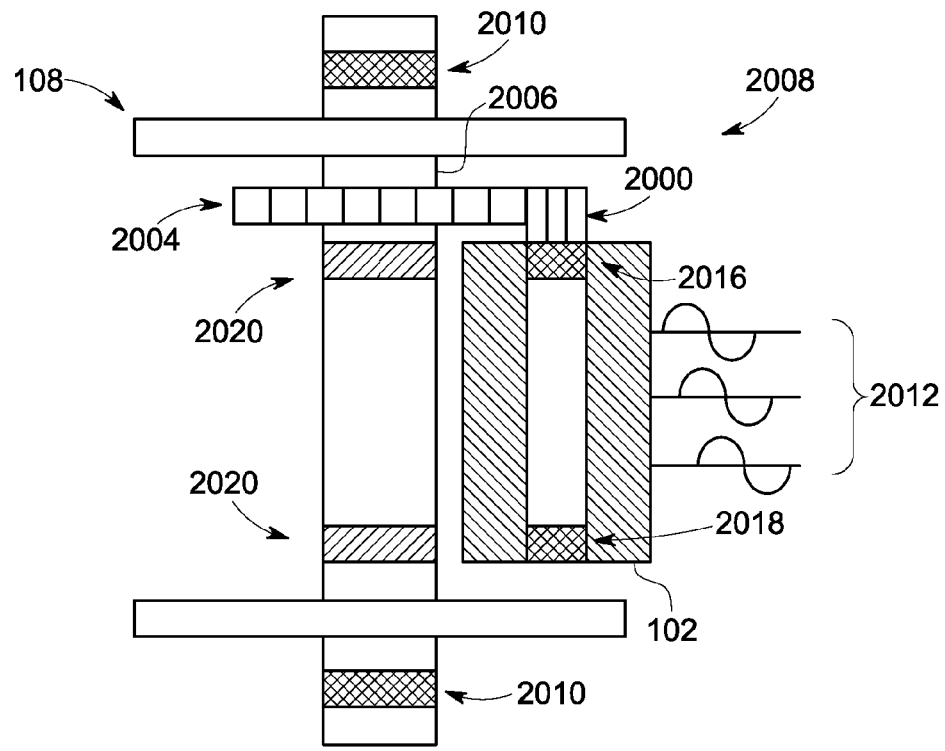
FIG. 20A is a schematic of an electric traction motor and related output drive assembly.

To explain further, and with reference to FIG. 20A, in a vehicle having plural electric traction motors (e.g., a locomotive or other rail vehicle), each traction motor 102 may be outfitted with a pinion gear 2000, such as by a pinion-end bearing 2016. A connection-end bearing 2018 may be disposed on an opposite side or end of the traction motor 102. The pinion gear 2000 is attached to a bull gear 2004, such as by an output shaft of the motor 102, for transferring energy from the motor 102 to the bull gear 2004 or other drive gear (e.g., connected to an axle 2006). For supporting the output shaft at a pinion end 2008 of the motor 102, the motor 102 is outfitted with one or more bearings 2010, 2020. The bearings 2010 may represent journal bearings that transfer torque from the axle and/or wheel to the vehicle. The bearings 2010 bear all or a substantial portion of the useful torque produced by a vehicle and may be subject to failure before a designed life time (e.g., expected or designed service life) because of, among other things, unpredictable load and/or road conditions during the operation of vehicles.

Figure 21:
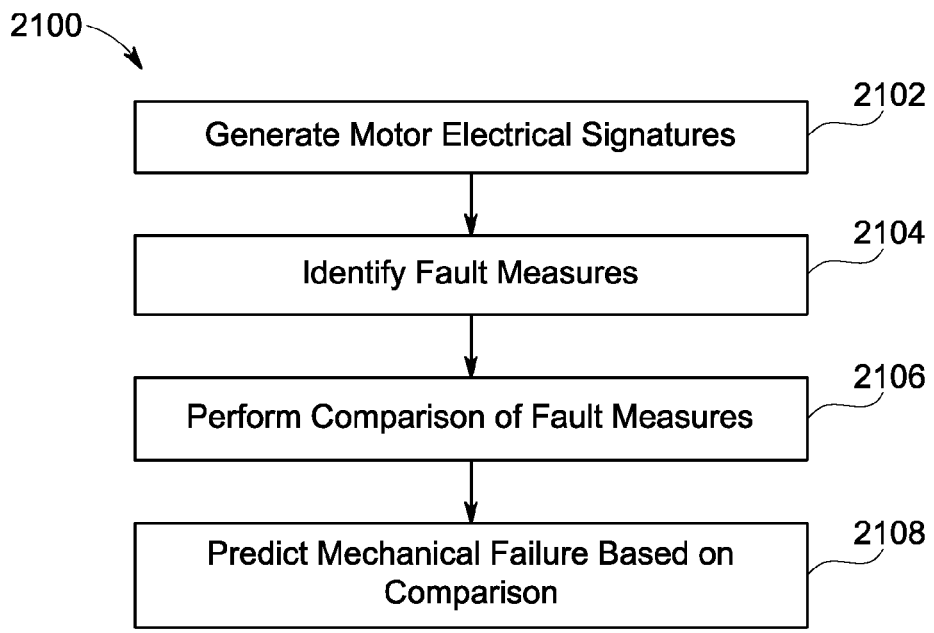
FIGS. 21 and 22 are flowcharts of methods for a vehicle, according to embodiments of the inventive subject matter.

FIG. 21 is a flowchart of one embodiment of a method 2100 for predicting mechanical failures of bearings of electric traction motors in a vehicle (e.g., locomotive or other rail vehicle) having plural traction motors. Alternatively, the method 2100 may be used to predict mechanical failures of other, non-bearing components that mechanically couple a traction motor to a wheel or otherwise cause movement of the traction motor to cause rotation of an axle and/or wheel of the vehicle. The method 2100 may be used in conjunction with the system 100 (shown in FIG. 1) to predict mechanical failures of the motors 102, axles 106, wheels 108, components that interconnect the motors 102, axles 106, 2006, and/or wheels 108 (e.g., bearings 2010, pinion gears 2000, shafts 2002, bull gear 2004, and the like), and/or other components associated with transferring rotary movement of the motors 102 to a propulsive force that moves the vehicle. The method 2100 may be a method of diagnosing (e.g., predicting or identifying) a mechanical failure of a motor 102. The method 2100 may be implemented by the system 100 (shown in FIG. 1). For example, software, hard-coded logic, and/or other sets of instructions (e.g., stored on the memory 302 shown in FIG. 3) may be used to direct operations of the processor 300 (shown in FIG. 3) to perform the operations of the method 2100.

At 2102, the method includes generating motor electrical signatures for the motors. As described above, the motor electrical signatures are representative of one or more characteristics of electrical energy that is supplied to the motors. In one embodiment, each motor may be a same or common type of motor and/or include a same or common type of bearing as one or more other motors in the same vehicle. Alternatively, one or more of the motors may be a different type and/or have one or more different bearings than one or more other motors in the same vehicle. The motor electrical signatures that are generated may include signatures that are similar to one or more of the motor electrical signatures 500, 600, 1200, 1600 (shown in FIGS. 5, 6, 12, and 16), the representative electrical signature 700 (shown in FIG. 7), the fault signature 800 (shown in FIG. 8), and/or the discrete electrical signature 1100 (shown in FIG. 11) described above. The signatures are based on or representative of the electrical characteristics that are measured of the electrical energy that is supplied to and/or demanded by the motor(s) 102 (shown in FIG. 1) to power the motor(s) 102, such as the electrical characteristics 404, 406 (shown in FIG. 4).

In one embodiment, the motor electrical signatures include representations of the characteristics acquired over a detection window. As described and shown above, the motor electrical signatures can include frequency-domain and/or time-domain representations of the characteristics measured over a period of time. The detection window is a time period over or during which the characteristics that are monitored in order to generate the motor electrical signatures. The detection window can be defined by one or more operational parameters of the traction motors. For example, a beginning and/or end of the detection window may occur when the speed at which a traction motor rotates exceeds a designated threshold, falls below the threshold, or is within a range of values. As another example, the beginning and/or end of the detection window may occur when the torque force generated by the traction motor (e.g., on the axle and/or wheels that are interconnected with the traction motor) exceeds a designated threshold, falls below the threshold, or is within a range of designated values.

The characteristics can be acquired (e.g., measured or sensed, such as by the sensors 310 shown in FIG. 3) only during the detection window. For example, the system 100 (shown in FIG. 1) may not acquire (e.g., record and/or sample) the characteristics during times that are outside of the detection window, and begin acquiring the characteristics once the detection window commences and stop acquiring the characteristics when the detection window ends. Alternatively, the system 100 may record or sample the characteristics during times outside of the detection window but only use the characteristics acquired during the detection window to generate the motor electrical signatures. For example, the system 100 may acquire a set of characteristics but only use a subset of the characteristics (e.g., the characteristics obtained during the detection window) to diagnose (e.g., predict) a potential mechanical failure of the motor 102 (e.g., a bearing failure) and/or generate a prognosis related to the potential mechanical failure of the motor 102 (e.g., estimate a service life or remaining service life of the motor 102). In another embodiment, the system 100 may acquire the characteristics and/or generate the signatures based on operator command, at designated times, or continuously (e.g., at periodic intervals over the course of a trip being traveled by the vehicle).

The detection window may be defined by the operational parameters of the motors 102 (shown in FIG. 1) that are associated with or more likely to exhibit signs or evidence of characteristics associated with an impending mechanical failure of the motors 102, axles 106 (shown in FIG. 1), wheels 108 (shown in FIG. 1), components that interconnect the motors, axles, and/or wheels, and/or other components associated with transferring rotary movement of the motors 102 to a propulsive force that moves the vehicle. For example, the detection window may be defined by elevated speeds or torques generated by the motors that are sufficiently fast or large to obtain characteristics representative of an impending bearing failure (e.g., based on heuristic data, empirical data, and the like) but not so fast, slow, small, or large, as to obtain characteristics representative of "healthy" components (e.g., components that are not likely to mechanically fail over the course of a current trip of the vehicle).

In one embodiment, the detection window may be defined by rotational speeds of a traction motor 102 (shown in FIG. 1). For example, the detection window may occur when the speed of the motor 102 is at least 400 revolutions per minute ("rpm") and no greater than 700 rpm (e.g., the electrical characteristics may be obtained when the rpm of the motor 102 are 400 to 700 rpm). As another example, the detection window may occur over 435 to 750 rpm. Alternatively, other speeds of the motor 102 may be used to define the bounds of the detection window. In another embodiment, the detection window may be defined by control settings (e.g., throttle notch settings, positions of a pedal, and the like) of the vehicle. For example, the detection window may occur when the throttle notch settings of the vehicle are at least at a notch position six (of between the notch positions at the integer values of one through eight, inclusive of one and eight). Alternatively, other notch settings may be used to define the bounds of the detection window.

In another embodiment, the values of the operational parameters that define the bounds of the detection window may be relative operational parameters. The values provided in the above examples are values. Relative values of the operational parameters include those values that are based on another value or operational parameter. For example, the detection window may be defined by notch settings that are at least a threshold percentage or fraction of a designated notch value, such as 70% of the upper notch setting (e.g., a notch position of eight). As another example, the detection window may be defined by speeds of the motor 102 that are between 60% and 80% of a designated speed (e.g., a speed limit of the route or of the vehicle).

The operational parameters associated with the detection window (e.g., the beginning and/or end of the detection window) may change based on a type of motor and/or components (e.g., the bearings 2010 shown in FIG. 20) of the motor. For example, the traction motors 102 (shown in FIG. 1) or the bearings 2010 that are the same type of motor or bearing may be associated with a first set of operational parameters indicative of the beginning and/or end of the detection window while the traction motors 102 or bearings 2010 that are a different type may be associated with a second set of different operational parameters indicative of the beginning and/or end of the detection window.

In one embodiment, the system 100 (shown in FIG. 1) may passively wait for the detection window to occur before acquiring the characteristics of the electrical energy supplied to the motors 102. For example, the system 100 may wait for the operational parameters of the motors 102 to indicate that the detection window has begun to start monitoring the characteristics. Alternatively, the system 100 may actively cause the detection window to occur. The processor 300 (shown in FIG. 3) of the system 100 may generate control signals that direct the operator of the vehicle and/or the control subsystem 114 (shown in FIG. 1) of the vehicle to change the operational parameters of the vehicle so that the detection window begins. The control signals may be communicated to the display device 112 (shown in FIG. 1) to direct the operator how to manually control the vehicle to cause the detection window to occur, such as by displaying a designated throttle setting, speed, brake setting, torque, and the like, to be implemented by the operator to cause one or more of the traction motors 102 to have operational parameters associated with the commencement of the detection window. Alternatively or additionally, the control signals may be communicated to the control subsystem 114 to cause the control subsystem 114 to automatically (e.g., without operator intervention) implement a throttle setting, speed, brake setting, torque, and the like, that is designated by the processor 300 to cause one or more of the traction motors 102 to have operational parameters associated with the commencement of the detection window. The system 100 may similarly generate the control signals that cause the detection window to be manually or automatically terminated.

The detection window may be applied to individual motors 102. For example, if a vehicle includes six motors 102, and only four of the motors 102 having operational parameters fall within the detection window while the other two motors 102 do not have operational parameters within the detection window, then the characteristics of the four motors 102 may be monitored while the characteristics of the other two motors 102 are not monitored, collected, and/or analyzed. If the operational parameters of one or more of the four motors 102 then fall outside of the detection window, then the characteristics of those one or more motors 102 may no longer be monitored. Conversely, if the operational parameters of the two motors 102 that were outside the detection window change to fall within the detection window, then the characteristics of those motors 102 may be monitored. In one embodiment, the detection windows may vary among different motors 102 of the same vehicle. For example, a first motor 102 in the vehicle may be associated with a detection window defined by a first set or group of operational parameters while a second motor 102 of the same vehicle may be associated with a different detection window that is defined by a different, second set or group of operational parameters. The detection windows may be tailored to the motors 102 so that operational differences between the motors 102 may be accounted for in collecting the characteristics (e.g., one type or class of motor may operate at higher speeds in order to produce the same or similar output as another motor).

At 2104, the method further comprises identifying one or more fault measures, signature values, and/or representative signature values of each (or at least one but not all) of the motor electrical signatures. The fault measures, signature values, and/or representative signature values can be indicative of mechanical characteristics (e.g., relative health) of the motors and/or the bearings of the motors, as described above. The fault measures, signature values, and/or representative signature values can include one or more quantitative measures of the electrical characteristics 404, 406 (shown in FIG. 4), the motor electrical signatures 500, 600, 1200, 1600 (shown in FIGS. 5, 6, 12, and 16), the representative electrical signature 700 (shown in FIG. 7), the fault signature 800 (shown in FIG. 8), and/or the discrete electrical signature 1100 (shown in FIG. 11), as described herein. For example, the fault measures that are identified may be determined or calculated similar to the fault measures 902 (shown in FIG. 9) described above.

At 2106, the method further comprises performing a comparison the one or more fault measures of at least one motor of the vehicle with the one or more fault measures of at least one other motor in the same vehicle. For example, the relative number of fault measures of a first motor 102A may be compared to the fault measures of one or more of second through sixth motors 102B-F, as described above.

At 2108, the method further comprises predicting a mechanical failure of one or more of the motors based on the comparison of the fault measures. For example, based on differences between the fault measures of the motors 102, a prediction may be made as to a motor 102 that is likely to fail, or more likely to fail, relatively soon and/or before one or more of the other motors 102, as described above. The predicted failure may be of a bearing 2010 of one of the motors 102.

In another embodiment, at 2108, the mechanical failure of a motor 102 may be predicted by analyzing the fault measures and/or signature values of only that motor 102. The mechanical failure may be predicted without comparing the characteristics or fault measures of a motor 102 with the characteristics or fault measures of another motor 102 in the same vehicle. In one embodiment, the characteristics or fault measures of a motor 102 may be compared to a designated or predetermined threshold. If the characteristics or fault measures of the motor 102 exceed the threshold, then mechanical failure of the motor 102 may be predicted. The threshold may be relatively large so that those motors 102 having characteristics or fault measures that are unusually large (e.g., atypical relative to the previous history of the motor 102 and/or for the same type or class of motor 102) are used to predict the mechanical failure of the motor 102.

Figure 22:
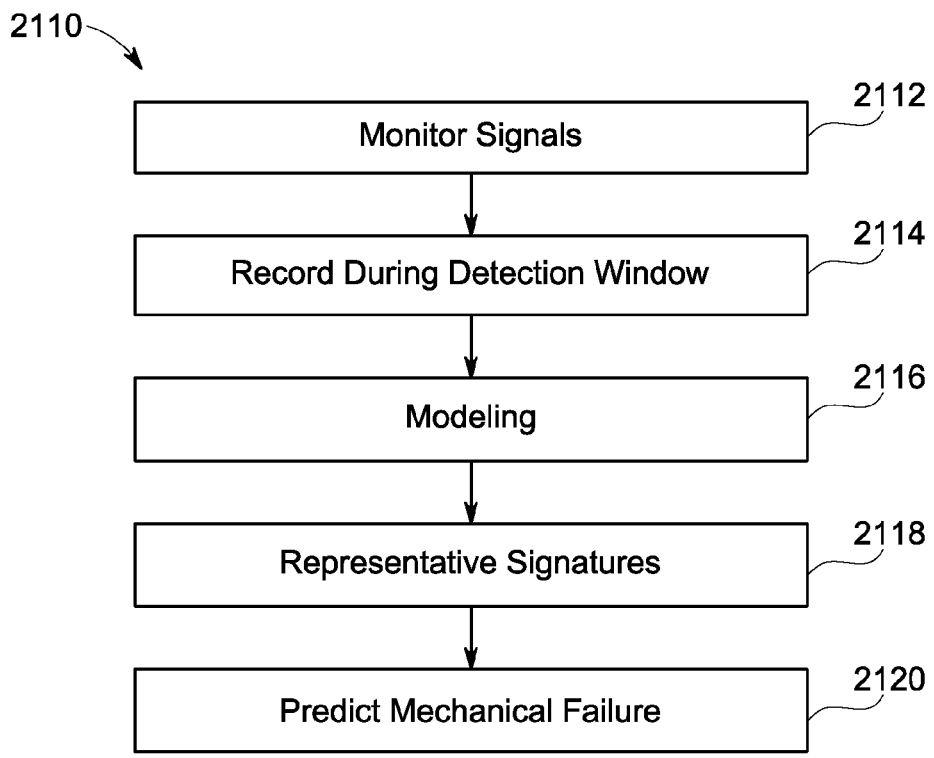

FIG. 22 is a flowchart of another embodiment of a method 2110 for predicting mechanical failures of one or more motors of a vehicle. The method 2110 may be used to diagnose (e.g., identify or predict) mechanical failures of bearings of electric traction motors in a vehicle (e.g., locomotive or other rail vehicle) having plural traction motors. The method 2110 can be implemented by the system 100 (shown in FIG. 1) described above. For example, software, hard-coded logic, and/or other sets of instructions (e.g., stored on the memory 302 shown in FIG. 3) may be used to direct operations of the processor 300 (shown in FIG. 3) to perform the operations of the method 2110.

At 2112, the method comprises monitoring signals 2012 (shown in FIG. 20A) that carry information of potential mechanical failures of one or more motors 102 (shown in FIG. 1). The signals 2012 may represent electric signals (e.g., current) that is supplied to motors 102 for powering the motors 102, such as traction motor phase current signals. The signals may be monitored using the sensors 310 (shown in FIG. 3), as described above.

Figure 20B:
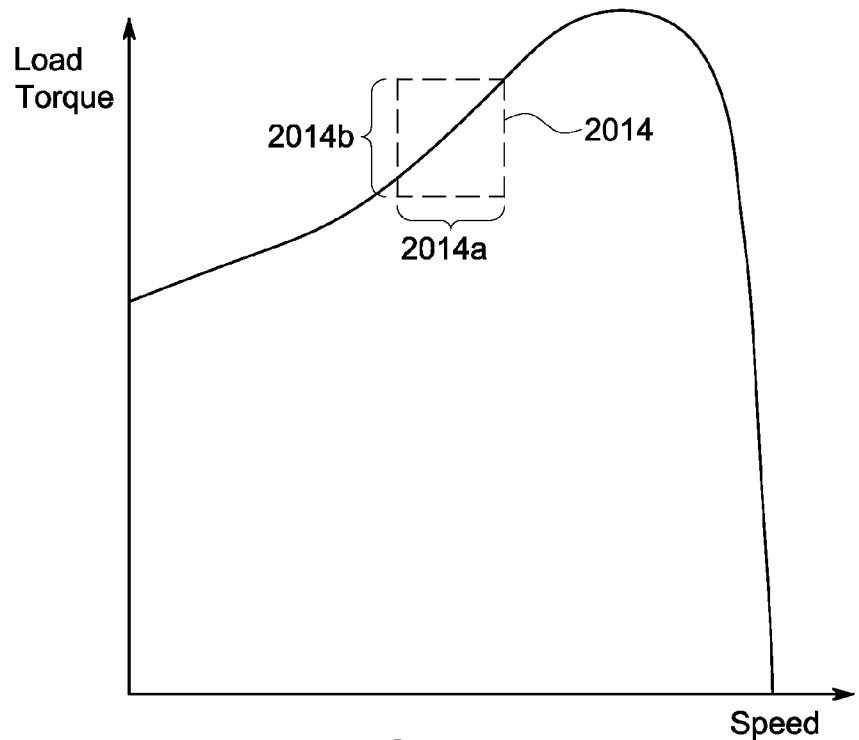
FIG. 20B is a theoretical speed-torque curve for a motor.

At 2114, the method comprises sampling and recording the monitored signals 2012 during a detection window 2014. An example detection window 2014 is shown in FIG. 20B for a theoretical speed-torque curve 2022 for a single phase AC induction motor 102. The speed-torque curves for other motors or types of motors may be different from that shown in FIG. 20B. As described above, the detection window 2014 may be defined, or bounded, by operational parameters of the vehicle. As one example, for a given one of the motors of a vehicle, the detection window 2014 may include or represent a time period when the motor 102 is operating within at least one of a designated speed range 2014a (represented in FIG. 20B as the horizontal component of the detection window 2014 that extends from a lower designated speed to an upper designated speed) and/or a designated torque range 2014b (e.g., represented in FIG. 20B as the vertical component of the detection window 2014 that extends from a lower designated torque to an upper designated torque). Thus, in an embodiment, data for generating the motor electrical signatures for a motor 102 is collected only during a detection window for the motor.

Alternatively, the data used to generate the motor electrical signatures for the motor 102 may be collected outside of (and/or within) the detection window 2014. The detection window 2014 can represent a designated operational state of the traction motor 102 to detect the failure of a bearing, and may be customized for different types of traction motors and different types of bearings. For example, the detection window 2014 can begin when actual operational parameters of the vehicle match, exceed, or fall within a range of designated operational parameters, as described above. The designated operational parameters that define when the detection window 2014 occurs can vary based on the type of motor 102 and/or bearings 2010 of the motor 102. As described above, the detection windows can be determined heuristically and/or empirically, based on, for example, identifying motor speeds or torques when a bearing is most subjected to stress or is subjected to more stress than one or more other motors speeds or torques.

In one embodiment, the detection window is waited for passively, that is, the vehicle is operated normally and the monitored signals are sampled and recorded (resulting the data for generating the motor electrical signals) when the motor in question happens to be operating within the detection window. In another embodiment, the detection window is realized actively by commanding the desired speeds and torques to the traction motor without affecting the normal operation of the vehicle.

At 2116, the method comprises building mathematical models of the characteristics measured from the signals 2012. For example, the characteristics can be measured and/or used to form signatures associated with the motors 102. One or more mathematical models can be formed, or built, based on the measured characteristics themselves (e.g., in the time domain) or the transform of the characteristics (e.g., in the frequency and time-frequency domain). This may be done using the methods described above. In one embodiment, the analysis module 308 obtains the models to be used or examined from the memory 302. The analysis module 308 may attempt to match or fit several designated or predetermined models to the signatures, and may vary the parameters of the models until one or more models match the signatures better than one or more, or all, of the other models. The analysis module 308 can use one or more data fitting techniques for measuring or quantifying how closely the various models match a signature, such as a least squares method (e.g., linear or ordinary least squares, non-linear least squares, and the like), a technique that measures uncertainty is present in a model used to fit the data, and the like. The model can be used to summarize a portion or all of the characteristics in the signatures.

The models can be expressed as mathematical functions that represent or approximate relationships between one or more of the characteristics of the signals 2012 in a signature and another value, such as time, motor speed, motor torque, and the like. For example, the characteristics of the signals 2012 that are monitored may be examined in the time domain and/or frequency domain to generate signatures of the motor 102, such as motor electrical signatures 500, 600, 800. Mathematical equations that approximate these signatures 500, 600, 800 (e.g., approximate the relationship between the characteristics and frequency or time) can be determined. Several models or equations with varying values of parameters (e.g., coefficients) of the models or equations in order to determine which of the models more closely matches a signature than one or more other models, or than all other models. By way of a non-limiting example, a sine wave equation such as:

$$y = A\sin(Bx+C)+D \qquad \text{(Equation \#9)}$$

may represent one model of a signature, where y represents the approximated value of the characteristic, x represents time (at which the characteristics of the signals 2012 are acquired), and A, B, C, and D represent parameters of the model. The values of the parameters can be varied to more closely match the model (e.g., Equation #9) to the signature, such as to shift the phase of the sine wave to a phase of the signature. Other examples of models may be used, such as cosine equations, arcsine equations, arctan equations, differential equations, and the like, also may be used to model the signatures. Alternatively, a non-oscillating equation or model may be used.

Signature values can be obtained from the model or models that are found to more closely match or fit a signature than other models. Parameters (e.g., coefficients) of the models can be examined to obtain one or more quantitative measurements of the signatures, such as signature values. In one embodiment, the coefficient values of the models that are used to fit the models to the signatures can be the signature values. For example, with respect to the example of Equation #9 above, the coefficient values of A, B, C, and/or D can be the signature values for the signature or signatures to which the model represented by Equation #9 fits. The values of the coefficients of the model may be established so that the actual values of the characteristics in the signature closely match the model of the characteristics. The model can be fit to the characteristics so that the model fits or matches the characteristics better or more closely than one or more other models, or than all other models.

In one embodiment, plural different models and/or plural different types of signature values are determined at 2116. By "different models," it is meant that different mathematical models of the same or different motor electrical signatures (or other types of signatures based on the signals 2012) can be determined. By "different types of signature values," it is meant that the values of different coefficients of the same or different mathematical models can be identified. For example, if the same mathematical relationship or equation is used to model signatures obtained for the same motor at different times (e.g., within the same or different detection windows), the values of different coefficients in the same mathematical relationship or equation may be the different types of signature values. Alternatively, if different mathematical relationships or equations are used to model signatures obtained for the same motor at different times (e.g., within the same or different detection windows), the values of coefficients in the different mathematical relationships or equations may be the different types of signature values.

In another embodiment, at 2116, signature values of the motor electrical signatures can be directly calculated from the signals 2012. For example, instead of forming mathematical models of the signatures, the actual characteristics measured from the signals 2012 (e.g., the phase current and/or voltage signals that are recorded as the signals 2012) can be used to calculate the signature values in the time, frequency, and/or time-frequency domains. The time-domain signature values that can be directly calculated from the signals 2012 include, but are not limited to, the variation of magnitude (e.g., amplitude) of the signal 2012 under a constant torque command (e.g., a torque command that remains the same or includes trivial changes), the variation of the fundamental (or other) frequency under a constant speed command (e.g., a speed command that remains the same or includes trivial changes), and/or a total signal energy of the signal 2012 under constant torque and/or speed commands. In one embodiment, the values are obtained may be calculated under constant torque and speed commands.

Alternatively, the signature values can include measurements of the signatures. For example, the amplitudes, widths, and/or frequencies of one or more peaks (e.g., the peaks 506, 508, 510, 512, 514, 516, 518, 606, 608, 610, 612, 614, 616, 618 shown in FIGS. 5 and 6), and the like, of the signatures.

The frequency-domain signature values can include, but are not limited to, a magnitude (e.g., amplitude) of one or more peaks in a signature (such as a disturbance peak), a statistical measure of the magnitude or amplitude (e.g., a mean, median, deviation, and the like) in a designated range of the frequency spectrum of the signal 2012, and/or a pattern of the frequency spectrum of the signal 2012 in a designated range of the frequency. The pattern can include an identification of the frequencies at which one or more peaks (e.g., disturbance peaks) appear in the signal 2012. The frequency spectrum of the signal 2012 can be obtained through various spectrum estimation methods, such as discrete Fourier transform, Hilbert-Huang transform, Lomb-Scargle periodogram (for varying sampling rate), and the like.

The time-frequency-domain signature values can include, but are not limited to, various types of quantities calculated from the results of a time-frequency transform of the signals 2012. The time-frequency transform can be short-time Fourier transform, wavelet transform, basis pursuit, matching pursuit, and the like.

At 2118, the different signature values that are determined at 2116 are fused to obtain one or more representative signature values. For example, the different signature values calculated from the signals 2012 associated with a first motor 102 can be combined with each other to calculate representative signature values of the first motor 102. The representative signature values that are based on the combined different signature values may be better correlated to (e.g., better represent) an impending mechanical failure of the first motor 102, such as a bearing failure, relative to relying on the signature values alone. This may be done through linear combination, such as the results of principle component analysis. Alternatively, a non-linear combination may be used. Equation #10 below illustrates one example of a linear combination that may be used to convert a set of signature values that may be correlated (e.g., such as by having values that are at least partially dependent on each other) to a set of representative signature values that may not be correlated (e.g., such as by having values that are not dependent on each other but may be dependent or representative of another common cause, such as an impending bearing failure):

$$\begin{bmatrix} y1 \\ y2 \end{bmatrix} = \begin{bmatrix} a11 & a12 & a13 \\ a21 & a22 & a23 \end{bmatrix} \begin{bmatrix} x1 \\ x2 \\ x3 \end{bmatrix}$$ (Equation #10)

In Equation #10, the variables $x_1$, $x_2$, $x_3$ (referred to as $x_i$) represent the signature values for a motor 102, the variables $y_1$, $y_2$ (referred to as $y_i$) represent a set of representative signature values for the motor 102, and the variables $a_{11}$, $a_{12}$, and so on (referred to as $a_{ij}$) represent coefficients of the combinations (e.g., linear combinations) of the signature values ($x_i$) that are used to obtain the representative signature values ($y_i$). The signature values ($x_i$) obtained over the same detection window 2014 are represented as a single-column matrix in Equation #10 and the set of representative signature values ($y_i$) are represented as another single-column matrix in Equation #10, while the coefficients of the linear combinations are shown in Equation #10 as a three column, two row matrix. Alternatively, one or more of the signature values, representative signature values, and/or coefficients may be represented as different matrix or other mathematical representation.

At 2120, mechanical failure (impending mechanical failure, for example) of the motor 102 can be predicted based on the one or more representative signature values using one or more of the classification methods described above. For example, fault measures can be determined from the representative signature values and these fault measures can be compared among or between different motors 102 of the same vehicle in order to identify which, if any, of the motors 102 is more likely to experience a mechanical failure before one or more other motors 102 of the same vehicle, as described above. Various classification methods including neural networks and support vector machine can be used for this prediction, as described below in connection with generating a classification boundary 2308 (shown in FIG. 23).

Alternatively, the representative signature values for a single motor 102 of a vehicle can be examined to predict mechanical failure of the motor 102. As described above, several representative signature values ($y_i$) can be obtained from a set of signatures associated with a single motor 102. These representative signature values ($y_i$) can be compared with one or more thresholds to determine if the motor 102 is likely to experience a mechanical failure, such as by the motor 102 being more likely than not or more likely than one or more other motors 102 of the same vehicle to experience mechanical failure during a current trip of the vehicle.

Figure 23:
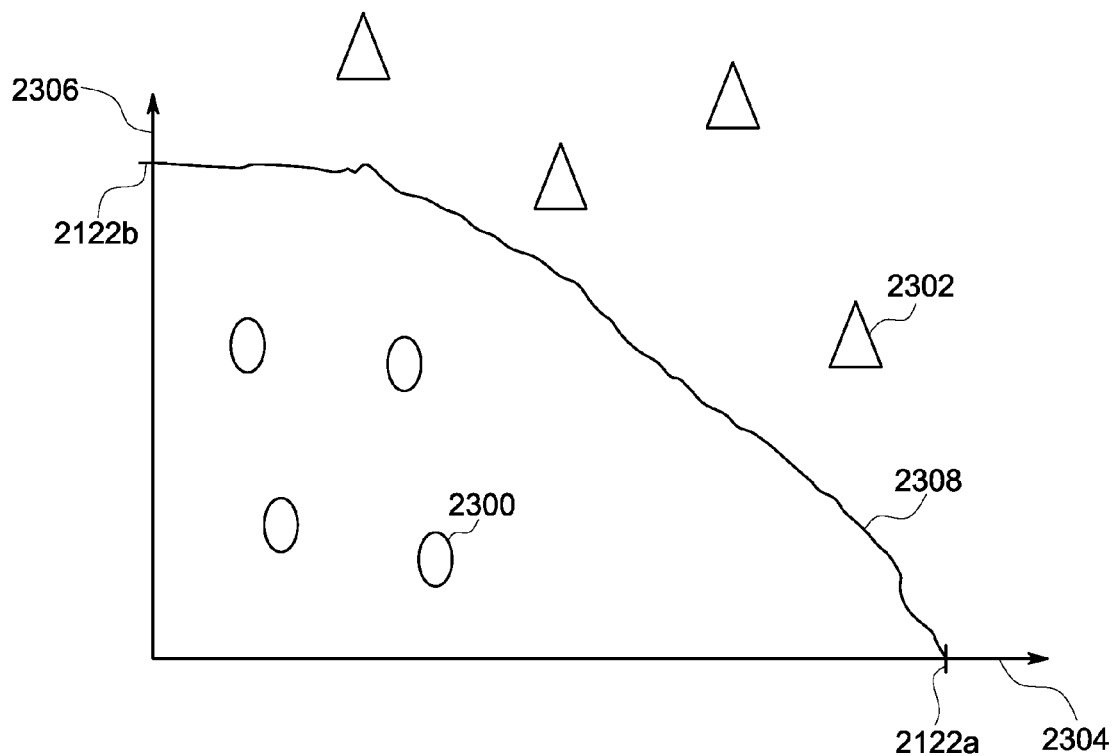
FIG. 23 is a schematic diagram of a threshold boundary.

FIG. 23 illustrates one example of a classification method for predicting mechanical failure of a single motor using several representative signature values. One or more sets 2300, 2302 of representative signature values for a single motor 102 are obtained. The sets 2300, 2302 of the representative signature values (e.g., the values of $y_i$ in Equation #10) can be those representative signature values calculated from a linear combination (e.g., using principal component analysis) of a set of signature values (e.g., the values of $x_i$ in Equation #10), as described above. The set of signature values can include those signature values obtained from the signals 2012 recorded over a detection window 2014 (shown in FIG. 20).

Each set 2300, 2302 of the representative signature values can be derived from the signature values ($x_i$) obtained from the signals 2012 recorded during the same detection window 2014. Alternatively, one or more of the sets 2300, 2302 of the representative signature values and/or the signature values from which the sets 2300, 2302 of the representative signature values are derived may be obtained in different detection windows 2014. "Different" detection windows can include detection windows 2014 that do not entirely overlap with respect to time, that only partially overlap with respect to time, or that do not overlap at all with respect to time.

The sets 2300, 2302 of representative signature values are shown in FIG. 23 alongside a horizontal axis 2304 and a vertical axis 2306. The horizontal axis 2304 represents values of one of the representative signature values in the sets 2300, 2302 and the vertical axis 2306 represents values of another one of the representative signature values in the sets 2300, 2302. In one embodiment and with respect to the example described above in connection with Equation #10, the sets 2300, 2302 of representative signature values can include the representative signature values of $y_1$ and $y_2$, with the horizontal axis 2304 representative of the values of the first representative signature value $y_1$ and the vertical axis 2306 representative of the values of the second representative signature value $y_2$. In another embodiment, additional axes representative of additional representative signature values in the sets 2300, 2303 may be used. For example, a third axis for values of a third representative signature value (e.g., $y_3$) in one or more of the sets 2300, 2302, a fourth axis for values of a fourth representative signature value (e.g., $y_4$), and the like, may be provided in addition to the horizontal and vertical axes 2304, 2306.

A classification boundary 2308 can be formed to distinguish between those sets 2302 of representative signature values that indicate a potential mechanical failure of the motor 102 (shown in FIG. 1) and the sets 2300 of the representative signature values that do not indicate the potential mechanical failure (e.g., do not indicate that a bearing is tending toward failure or is likely to fail). The classification boundary 2308 can be a designated threshold that is manually created, empirically derived from previously derived representative signature values, heuristically determined, or otherwise created. In one embodiment, neural networks or a support vector machine can be used for generating the classification boundary 2308. The classification boundary 2308 is shown in FIG. 23 as being a two-dimensional boundary. Alternatively, the classification boundary 2308 may be another type of boundary, such as a single dimensional boundary (e.g., signature values are compared along a single axis to a threshold) or a three- or more dimensional boundary (e.g., signature values are compared along three or more axes to a boundary that extends along each of the axes).

The system 100 (e.g., the analysis module 308 shown in FIG. 3) can compare the sets 2300, 2302 of representative signature values for a motor 102 to the classification boundary 2308 to classify the sets 2300, 2302 as being indicative of an impending mechanical failure (as described above) or not being indicative of an impeding mechanical failure. For example, those sets 2302 of the representative signature values that exceed the classification boundary 2308 (e.g., have values of the representative signature values $y_1$ and $y_2$ that are greater than the classification boundary 2308) may indicate that the motor 102 is likely to have a mechanical failure (e.g., a failed bearing) in the relatively near future. Such a motor 102 may be flagged or identified for repair or maintenance in the near future. The sets 2300 of the representative signature values that do not exceed the classification boundary 2308 (e.g., have values of the representative signature values $y_1$ and $y_2$ that are smaller than the classification boundary 2308) may indicate that the motor 102 is not likely to have a mechanical failure (e.g., a failed bearing) in the relatively near future, such as during the current trip of the vehicle.

As shown in FIG. 23, relatively large values of one of the representative signature values ($y_1$ or $y_2$) in a set 2300, 2302 can cause the set 2300, 2302 to exceed the classification boundary 2308, even if another representative signature value ($y_1$ or $y_2$) in the same set 2300, 2302 has a relatively small value. The classification boundary 2308 intersects the horizontal and vertical axes 2304, 2306 at thresholds 2122a, 2122b in the illustrated embodiment. A set 2300, 2302 having a single, large representative signature value that exceeds the threshold 2122 associated with that representative signature value may be identified as being indicative of an impending mechanical failure, even if other representative signature values in the same set 2300, 2302 are relatively small and/or do not exceed the thresholds 2122 associated with the other representative signature values.

In another embodiment, a failure mode and/or quantified degree of failure of the motor 102 (shown in FIG. 1) may be predicted. The failure mode represents a type of failure, such as a failure associated with a bearing, a failure associated with an axle, a failure associated with a gear, and the like. With respect to predicting the failure mode of a motor 102, different detection windows 2014 may be used to obtain the characteristics of the signals 2102. For example, different types of failure modes may emerge at different operating conditions (e.g., speeds and torques) of the motor 102. A series or set of two or more detection windows 2014 may be designed to occur at different operating conditions of the motor 102. For example, a first failure mode may be associated with lower speeds than a second failure mode, a third failure mode may be associated with different torques than a fifth failure mode, and the like. The different detection windows 2014 can be associated with the different failure modes, and with the different operating conditions associated with the different failure modes. The correlation between the different failure modes, the different detection windows, and/or the types of features can be determined through theoretical model-based simulation and/or empirical data-driven methods.

When one or more of the detection windows 2014 occurs (e.g., either passively or actively, as described above), the characteristics of the signals 2012 are monitored. The characteristics for each of the one or more detection windows 2014 are examined (e.g., by determining signature values, representative signature values, and the like). The failure mode may be identified based on which detection window 2014 provided the characteristics that were used to predict the impending failure. For example, if the characteristics obtained during a first detection window 2014 associated with a bearing failure indicate an impending failure but the characteristics obtained during a different, second detection window 2014 associated with a gear failure do not indicate an impending failure, then the failure mode may be identified as the bearing failure. This identified failure mode can be transmitted to a repair or maintenance facility automatically so that the facility can prepare for the necessary repairs in advance of the arrival of the vehicle at the facility, as described herein.

The degree of failure of the motor 102 (shown in FIG. 1) that can be predicted may represent the severity of the predicted failure. The degree of failure can be quantified so some values of the degree of failure can represent a slight failure (such as a failure that allows the motor 102 to continue operating at a lower or restricted output or speed), a moderate failure (such as a failure that allows the motor 102 to stop operating but allowing the vehicle to continue moving without the motor 102 operating), and/or a severe failure (such as a failure that requires the vehicle to stop moving until the motor 102 is repaired). The degrees of failure may vary based on the identified failure modes. The degree of failure for a given failure mode can be quantified by comparing the health data 2506 (shown in FIG. 25) and/or trends 2508 (shown in FIG. 25) with different levels of thresholds 2510 (shown in FIG. 25). The thresholds 2510 may be associated with different degrees of failure. Additionally or alternatively, one or more characteristics of the trends 2508 may be associated with different degrees of failure. For example, the coefficients (e.g., slope) of the relationship between the health data 2506 and time for a trend 2508 may be associated with different degrees of failure. The comparison of the health data 2506 and/or trend 2508 to different thresholds can provide an index for the degree of failure. Statistics can be applied to the comparison to further provide confidence intervals for the degree of failure.

Figure 24:
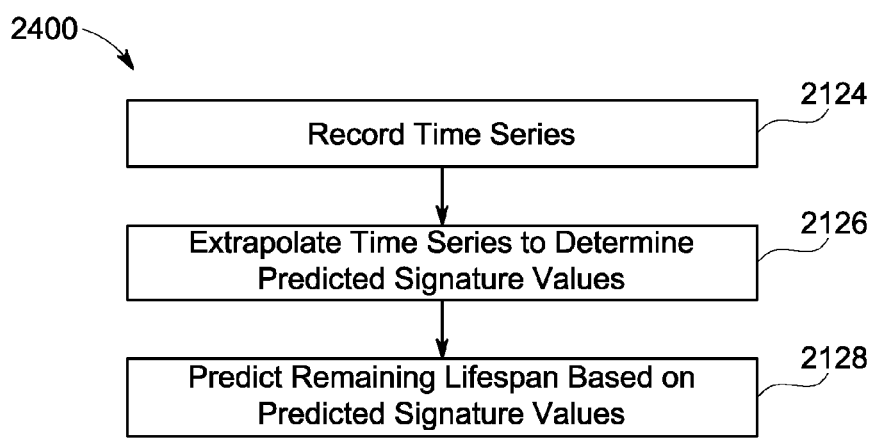
FIG. 24 is a flowchart of a method for a vehicle, according to another embodiment.

FIG. 24 illustrates another embodiment of flowchart of a method 2400 for predicting a mechanical failure of a motor 102 (shown in FIG. 1), such as the failure of a bearing. The method 2400 may be used by the system 100 (shown in FIG. 1) to predict mechanical failure of one or more of the motors 102. For example, software, hard-coded logic, and/or other sets of instructions (e.g., stored on the memory 302 shown in FIG. 3) may be used to direct operations of the processor 300 (shown in FIG. 3) to perform the operations of the method 2400.

At 2124, a time series of the motor electrical signals for at least one of the motors 102 (shown in FIG. 1) is obtained. As described above, this can involve monitoring one or more characteristics of the electric current supplied to the motor 102 and recording at least some of the characteristics during a detection window. The characteristics can be monitored over time, such as over a single detection window, or over several detection windows. Alternatively, signature values may be derived from the characteristics obtained over one or more detection windows and/or representative signature values can be calculated from the signature values, as described above. The characteristics, signature values, and/or representative signature values can be tracked over time, such as by monitoring changes and/or trends in health data of the motor 102. The term "health data" includes the characteristics, signature values, and/or representative signature values obtained or derived from the electrical current supplied to the motor 102.

Figure 25:
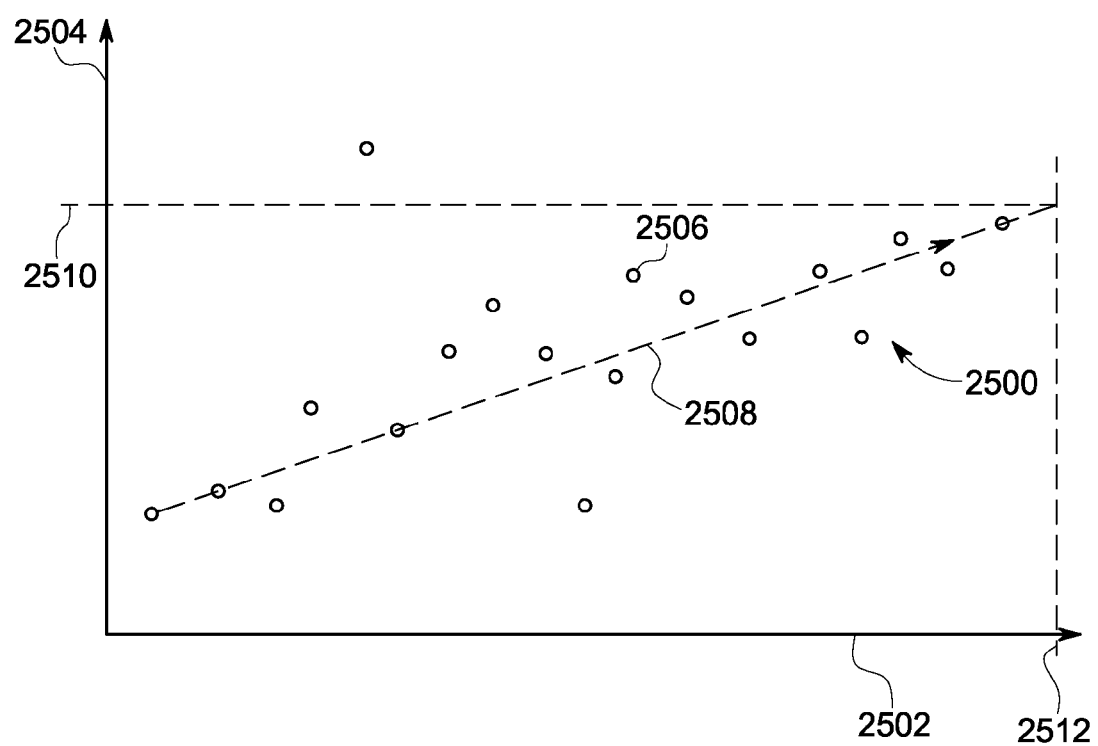
FIG. 25 illustrates a time series of health data of a motor shown in FIG. 1 in accordance with one example.

FIG. 25 illustrates a time series 2500 of the health data 2506 of a motor 102 (shown in FIG. 1) in accordance with one example. The time series 2500 is shown alongside a horizontal axis 2502 representative of time (e.g., absolute time, numbers of sequential, but not necessarily consecutive, detection windows, or the like) and a vertical axis 2504 representative of values of the health data of the motor 102. The time series 2500 represents the health data 2506 that is obtained over time for the motor 102. As shown, the health data 2506 varies over time. The changes and/or trend in the health data 2506 over time can be monitored to predict an impending mechanical failure of the motor 102 and/or to predict an estimated service life or remaining service life of the motor 102. The service life includes the total time that the motor 102 is expected or designed to work before non-trivial (e.g., not routine maintenance) is required for the motor 102, for example such as when the motor 102 or vehicle is taken off-line for repair or replacement of the motor 102. The remaining service life of the motor 102 includes the remaining service life of the motor 102 from a current time or state of the motor 102.

With continued reference to the time series 2500 shown in FIG. 25, and returning to the discussion of the method 2400 shown in FIG. 24, at 2126, the time series 2500 can be extrapolated to predict the future health of the motor 102 (shown in FIG. 1). For example, the health data 2506 can be extrapolated using one or more techniques, such as linear extrapolation, polynomial extrapolation, conic extrapolation, French curve extrapolation, and the like, to identify a trend 2508 in the health data 2506. The trend 2508 can be identified by a mathematical function or relationship between the health data 2506 and time, such as by fitting one or more mathematical functions using one or more techniques (e.g., least squares method). While the trend 2508 is shown as a linear relationship between the health data 2506 and time, alternatively, the trend 2508 may be non-linear. The trend 2508 can be extrapolated to determine future values of the health data 2506. For example, once the trend 2508 is identified, the analysis module 308 (shown in FIG. 3) of the system 100 (shown in FIG. 1) can estimate when the health data 2506 will or is expected to exceed or fall below one or more values.

At 2128, a remaining lifespan or service life of the motor 102 (shown in FIG. 1) is estimated based on the predicted health data 2506. For example, the trend 2508 can be used to determine when the health data 2506 is estimated to exceed a designated threshold 2510. The threshold 2510 can be associated with an expected mechanical failure of the motor 102. The threshold 2510 can be set (either manually based on empirical data or otherwise) such that, when the health data 2506 meets or exceeds the threshold 2510, the motor 102 (shown in FIG. 1) is likely (e.g., above a designated probability) to mechanically fail. An intersection of the trend 2508 and the threshold 2510 can be identified, and an estimated service life 2512 of the motor 102 can be determined based on this intersection. In the illustrated embodiment, the estimated service life 2512 of the motor 102 is identified as occurring at the intersection between the trend 2508 and the threshold 2510. Alternatively, the estimated service life 2512 can be identified as occurring at a different time, such as a designated buffer time period before or after the intersection of the trend 2508 and the threshold 2510.

In one embodiment, repair or maintenance of the motor 102 (shown in FIG. 1) can be scheduled based on the estimated service life 2512. For example, the system 100 (shown in FIG. 1) may automatically transmit instructions to a repair facility to arrange for the repair of the motor 102 when the estimated service life 2512 is relatively close (e.g., within a designated time range) from a current time. The instructions may identify a location of the vehicle, a heading of the vehicle, an estimated time of arrival by the vehicle at the repair facility, a type of failure that is predicted by the system, and the like.

As described above, the fundamental frequency of characteristics of the signals 2012 of a motor 102 (shown in FIG. 1) and/or of the signals 2012 may change with changing motor speeds as the vehicle travels. The characteristics can be sampled based on the fundamental frequency. For example, in one embodiment, the sampling period is based on the fundamental frequency of one or more characteristics of the signals 2012 or based on the fundamental frequency of the signals 2012. The sampling period may represent the time period between consecutive samples of the characteristics. For example, the length of time between measuring a characteristic of the signal 2012 a first time and a second time can be the sampling period and can change when the fundamental frequency of the signal 2012 changes. In one embodiment, the sampling period can be increased for greater fundamental frequencies and reduced for smaller fundamental frequencies. The amount or rate of change in the sampling period may be proportional (e.g., according to a linear or non-linear relationship) to a change in the fundamental frequency. Alternatively, the amount of change or the rate of change in the sampling period can be inversely proportional to the change in the fundamental frequency. In another embodiment, the amount or rate of change in the sampling period can be related to the change in the fundamental frequency by another relationship.

Significant changes in the fundamental frequency of the signals 2012 may result in undesirable (e.g., inaccurate) measurements of the characteristics. In one embodiment, the characteristics are measured only when the fundamental frequency is constant or substantially constant. The fundamental frequency may be constant or substantially constant when the fundamental frequency remains at the same frequency (such as 60 Hz) or within a designated range of the same frequency for at least a predetermined amount of time (e.g., a sufficient amount of time to obtain at least a designated number of measurements of the characteristics, such as 10, 20, 30, 50, 100, 1000, or another number).

Because the fundamental frequency of the signals 2012 may not continually remain constant over the course of a trip of the vehicle, however, the signals 2012 may be sampled (e.g., measured) to obtain the characteristics when the period (T) of the cycles of the signals 2012 do not significantly vary over time. For example, the fundamental frequency of the signals 2012 may be monitored by tracking the period (T) of each or at least a predetermined number of cycles of the signals 2012 (e.g., the phase current supplied to the motor 102). The signals 2012 may be sampled to measure the characteristics when the period (T) of the cycles does not vary by more than a designated amount. For example, the signals 2012 may be sampled when the period (T) of the signals 2012 does not vary such that the fundamental frequency remains within a range of 22 to 35 Hz. Alternatively, another range may be used, such as 25 to 32 Hz, 28 to 30 Hz, 19 to 38 Hz, 16 to 41 Hz, and the like.

In other embodiments, the full cycles of current or voltage signals 2012 are sampled. Here, full cycles of the fundamental frequencies of the signals 2012 can be sampled, to reduce or minimize frequency leakage. As a result, the frequency range for bearing detection (e.g., a "frequency range of interest") can be relatively close to the fundamental frequency. For example, the leakage from the fundamental frequency may be reduced to avoid contaminating measurements made at other frequencies so that the leakage will not contaminate the frequency range of interest.

In other embodiments, discrete Fourier Transforms (DFT) and/or the coefficients of the DFT of the signals 2012 and/or of the characteristics of the signals 2012 are calculated in real time. By "real time," it is meant that the discrete Fourier Transform is calculated as the data is collected, instead of after storing the data for a non-trivial period of time. In one embodiment, the definition of the discrete Fourier Transform is used to generate the coefficient. In another embodiment, only the coefficients of the fundamental frequency are saved. Coefficients for higher frequencies are derived from those of the fundamental frequency.

In another embodiment, a method for a vehicle having plural electric motors includes generating motor electrical signatures for the motors. The motor electrical signatures represent one or more characteristics of electrical energy that is supplied to the motors. The method also includes identifying one or more fault measures of each of the motor electrical signatures. The fault measures are indicative of mechanical characteristics of the motors. The method further includes comparing the one or more fault measures of each motor with the one or more fault measures of the other motors in the same vehicle and predicting an impending mechanical failure of one or more of the motors based on comparing the fault measures of the motors.

In another aspect, the motor electrical signatures are frequency-domain spectra of the characteristics of the electrical energy supplied to the motors. The identifying step can include identifying one or more disturbance peaks in the frequency domain spectra based on amplitudes of the disturbance peaks, and the fault measures are based on the number of disturbance peaks that are identified.

In another aspect, the identifying step includes determining harmonic frequencies of the motor electrical signatures that are based on operating speeds of the motors and identifying the disturbance peaks in subharmonic frequency ranges of the motor electrical signatures.

In another aspect, the identifying step includes determining which of a plurality of the disturbance peaks in the motor electrical signatures exceed one or more first thresholds, selecting one or more groups of the peaks that exceed the thresholds, identifying at least one of the peaks in each of the groups as a representative disturbance peak, and comparing the representative disturbance peaks to one or more second thresholds to determine if the representative disturbance peaks represent the fault measures.

In another aspect, the comparing step includes, for each of the motors being examined, calculating a first average or median of the fault measures associated with the plural motors, calculating a second average or median of the fault measures associated with each of the plural motors other than the motor being examined, and comparing the first average or median with the second average or median, wherein the predicting step includes predicting the impending mechanical failure of the motor being examined based on the comparing step.

In another aspect, the method also includes determining the one or more characteristics of electrical energy that is supplied to the motors, by calculating mutual impedance characteristics of the motors. The identifying step can include determining if the mutual impedance characteristics exceed one or more thresholds.

In another aspect, the method also includes determining the one or more characteristics of electrical energy that is supplied to the motors, by measuring electric currents that are induced by magnetic fields generated by the motors. The identifying step can include determining if the electric currents exceed one or more thresholds.

In another aspect, the generating step includes generating the motor electrical signatures for traction motors in a rail vehicle capable of self-propulsion, the comparing step includes comparing the one or more fault measures of each of the traction motors with the one or more fault measures of the other traction motors in the same rail vehicle, and the predicting step includes predicting the impending mechanical failure of one or more of the traction motors based on comparing the fault measures of the traction motors.

In another aspect, the predicting step includes predicting the impending mechanical failure of one or more bearings of the one or more of the motors.

In another aspect, the method also includes communicating a vehicle control signal in response to predicting the impending mechanical failure.

In another embodiment, a failure prediction system includes an input/output (I/O) module, a signature generation module, and an analysis module. The I/O module is configured to determine one or more characteristics of electrical energy that is supplied to plural electric motors in a vehicle. The signature generation module is configured to create motor electrical signatures for the motors. The motor electrical signatures represent the characteristics of the electrical energy supplied to the motors. The analysis module is configured to determine one or more fault measures of the motor electrical signatures of one or more of the motors. The fault measures are indicative of mechanical characteristics of one or more of the motors. The analysis module also is configured to compare the fault measures of each motor with the fault measures of the other motors in the same vehicle and predict an impending mechanical failure of one or more of the motors based on comparing the fault measures of the motors.

In another aspect, the motor electrical signatures are frequency-domain spectra of the characteristics of the electrical energy supplied to the motors, and the analysis module is configured to identify one or more disturbance peaks in the frequency-domain spectra based on amplitudes of the disturbance peaks. The fault measures can be based on the number of disturbance peaks that are identified.

In another aspect, the analysis module is configured to determine harmonic frequencies of the motor electrical signatures that are based on operating speeds of the motors and to identify the disturbance peaks in subharmonic frequency ranges of the motor electrical signatures.

In another aspect, the analysis module is configured to determine which of the disturbance peaks in the motor electrical signatures exceed one or more first thresholds, to select one or more groups of the peaks that exceed the thresholds, to identify at least one of the peaks in each of the groups as a representative disturbance peak, and to compare the representative disturbance peaks to one or more second thresholds to determine if the representative disturbance peaks represent the fault measures.

In another aspect, the analysis module is configured to, for each of the motors being examined, calculate a first average or median of the fault measures associated with the plural motors, calculate a second average or median of the fault measures associated with each of the plural motors other than the motor being examined, and compare the first average or median with the second average or median, the analysis module further configured to predict the impending mechanical failure of the motor being examined based on the comparison.

In another aspect, the analysis module is configured to calculate mutual impedance characteristics of the motors and to predict the impending mechanical failure based on whether the mutual impedance characteristics exceed one or more thresholds.

In another aspect, the I/O module is configured to receive measurements of electric currents that are induced by magnetic fields generated by the motors and the analysis module is configured to predict the impending mechanical failure based on whether the electric currents exceed one or more thresholds.

In another aspect, the signal generation module is configured to generate the motor electrical signatures for traction motors in a rail vehicle capable of self-propulsion and the analysis module is configured to predict the impending mechanical failure of one or more of the traction motors based on comparing the fault measures of the traction motors.

In another aspect, the analysis module is configured to predict the impending mechanical failure of one or more bearings of the one or more of the motors.

In another aspect, the I/O module is configured to communicate a vehicle control signal in response to predicting the impending mechanical failure.

In another embodiment, a computer readable storage medium for a system having a processor is provided. The computer readable storage medium includes one or more sets of instructions that direct the processor to generate motor electrical signatures for plural electric motors of a common vehicle. The motor electrical signatures are representative of one or more characteristics of electrical energy that is supplied to the motors. The one or more sets of instructions also direct the processor to identify one or more fault measures of each of the motor electrical signatures. The fault measures are indicative of mechanical characteristics of the motors. The one or more sets of instructions also direct the processor to compare the one or more fault measures of each motor with the one or more fault measures of the other motors in the same vehicle and predict an impending mechanical failure of one or more of the motors based on comparing the fault measures of the motors.

In another aspect, the computer readable storage medium is a tangible and non-transitory computer readable storage medium.

In another aspect, the motor electrical signatures are frequency-domain spectra of the characteristics of the electrical energy supplied to the motors. The one or more sets of instructions direct the processor to identify one or more disturbance peaks in the frequency-domain spectra based on amplitudes of the disturbance peaks, and the fault measures are based on the number of disturbance peaks that are identified.

In another aspect, the one or more sets of instructions direct the processor to determine harmonic frequencies of the motor electrical signatures that are based on operating speeds of the motors and to identify the disturbance peaks in subharmonic frequency ranges of the motor electrical signatures.

In another aspect, the one or more sets of instructions direct the processor to, for each of the motors being examined, calculate a first average or median of the fault measures associated with the plural motors, calculate a second average or median of the fault measures associated with each of the plural motors other than the motor being examined, compare the first average or median with the second average or median, and predict the impending mechanical failure of the motor being examined based on the comparison.

In another aspect, the one or more sets of instructions direct the processor to calculate mutual impedance characteristics of the motors and to predict the impending mechanical failure based on whether the mutual impedance characteristics exceed one or more thresholds.

In another aspect, the one or more sets of instructions direct the processor to receive measurements of electric currents that are induced by magnetic fields generated by the motors and to predict the impending mechanical failure based on whether the electric currents exceed one or more thresholds.

In another embodiment, a method for a vehicle having plural electric motors includes obtaining respective electrical signatures of the plural electric motors. The electrical signatures relate to respective electrical energy supplied to the motors. The method also includes performing a comparison of the electrical signature of one of the motors to the electrical signatures of the other motors in the same vehicle, determining an impending mechanical failure of said one of the motors based on the comparison, and communicating a signal in response to determining the impending mechanical failure.

In another aspect, the comparison is of subharmonic frequency ranges of the electrical signatures.

In another aspect, the comparison is of frequency ranges of the electrical signatures, and wherein the frequency range for each electrical signature is smaller than a fundamental frequency of the electrical signature.

In another aspect, the signal is communicated to off-board the vehicle.

In another embodiment, a diagnostics method includes receiving a first signal relating to an automatic on-board determination of an impending mechanical failure of one of a plurality of motors of a vehicle and at least one of the following steps, in response to receiving the first signal: scheduling a maintenance operation for the vehicle, generating second signals for controlling the vehicle to at least one of stop the vehicle or cause the vehicle to travel to a designated maintenance facility, generating an alert signal relating to the impending mechanical failure, or generating information relating to performing the maintenance operation.

In another aspect, the first signal is received off-board the vehicle, and the method includes scheduling the maintenance operation for the vehicle and, in response to the first signal received off-board the vehicle, transmitting a third signal to the vehicle. The third signal can include information relating to at least one of a time of the maintenance operation, an identity of the designated maintenance facility, or a location of the designated maintenance facility.

In another aspect, the on-board determination is based on a comparison of an electrical signature of said one of the motors to electrical signatures of the other motors in the same vehicle. The electrical signatures can relate to respective electrical energy supplied to the motors.

In another aspect, the comparison is of subharmonic frequency ranges of the electrical signatures.

In another aspect, the comparison is of frequency ranges of the electrical signatures, and wherein the frequency range for each electrical signature is smaller than a fundamental frequency of the electrical signature.

Another embodiment relates to a method for a vehicle having plural electric motors. The method comprises a step of generating motor electrical signatures of the motors (e.g., a respective motor electrical signature is generated for each motor) based on one or more characteristics of respective electrical energy that is supplied to the motors. The method further comprises identifying or otherwise determining one or more fault measures of the motor electrical signatures. The fault measures are indicative of mechanical characteristics of the motors, e.g., they are potentially indicative of impending mechanical failures of the motors. The method further comprises comparing the one or more fault measures of each motor with the one or more fault measures of the other motors in the same vehicle. The method further comprises predicting an impending mechanical failure of one or more of the motors based on comparing the fault measures of the motors. The steps may be carried out automatically, using a processor-based system (e.g., controlled via software) or other electronic system. In one aspect, predicting an impending mechanical failure includes generating an output signal indicative of the impending mechanical failure. The output signal may be a vehicle control signal that is used by the vehicle to automatically change tractive effort and/or braking effort of the vehicle, and/or to notify an operator of the vehicle to change the tractive effort and/or the braking effort of the vehicle.

Another embodiment relates to a method for a vehicle having plural electric motors (e.g., plural traction motors for propelling the vehicle). The method comprises a step of obtaining, for each motor, a measurement relating to electrical energy that is supplied to the motor. The method further comprises performing a comparison of the measurements of the motors to one another. The method further comprises predicting an impending mechanical failure of at least one of the motors based on the comparison. In an embodiment, the prediction of an impending mechanical failure is based only on the comparison of the plural motors. In another embodiment, the measurement for each motor is a frequency spectrum of the electrical energy supplied to the motor, and the comparison is of subharmonic portions of the frequency spectrum.

In another embodiment, a method (e.g., a method for predicting failure of a traction motor in a vehicle) includes monitoring first characteristics of an electrical signal supplied to a traction motor of a vehicle during a first detection window. The first characteristics represent a first motor electrical signature for the traction motor. The method also includes deriving one or more signature values from a first mathematical model of the first motor electrical signature and predicting a mechanical failure of the traction motor based on the one or more signature values.

In another aspect, the first detection window is associated with one or more designated operating conditions of the traction motor and monitoring the characteristics occurs when one or more actual operating conditions of the traction motor exceed the one or more designated operating conditions and/or fall within a range of designated operating conditions.

In another aspect, the one or more designated operating conditions include at least one of a designated speed or a designated torque of the actual traction motor and the one or more actual operating conditions include at least one of an actual speed or an actual torque of the traction motor.

In another aspect, monitoring the first characteristics includes recording the first characteristics when the one or more actual operating conditions of the traction motor exceed the one or more designated operating conditions or falls within a range of designated operating conditions, and disregarding the first characteristics when the one or more actual operating conditions of the traction motor does not exceed the one or more designated operating conditions or fall within the range of designated operating conditions.

In another aspect, the method also includes controlling the traction motor to cause the at least one of the actual speed or the actual torque to exceed the at least one of the designated speed or the designated torque associated with the first detection window.

In another aspect, predicting the mechanical failure includes determining that the traction motor will mechanically fail when the one or more signature values exceed one or more designated thresholds.

In another aspect, the method also includes monitoring different, second characteristics of the electrical signal supplied to the traction motor. The second characteristics represent a second motor electrical signal for the traction motor. The method can also include deriving one or more signature values from a second mathematical model of the second motor electrical signature and combining the one or more signature values from the first mathematical model of the first motor electrical signature with the one or more signature values from the second mathematical model of the second motor electrical signal to form one or more representative signature values. Predicting the mechanical failure can include comparing the one or more representative signature values to one or more designated thresholds.

In another aspect, predicting the mechanical failure includes comparing a set of at least two of the representative signature values to a classification boundary and identifying the mechanical failure as likely to occur if at least one of the representative signature values in the set exceeds the classification boundary.

In another aspect, combining the one or more signature values from the first mathematical model with the one or more signature values from the second mathematical model includes combining the one or more signature values from the first mathematical model with the one or more signature values from the second mathematical model to derive the one or more representative signature values. In one embodiment, the combining includes linearly combining the signature values from the first and second mathematical models.

In another aspect, predicting the mechanical failure includes tracking the one or more signature values over time to determine a trend in the one or more signature values and estimating when the mechanical failure will occur based on the trend.

In another aspect, monitoring the first characteristics of the electrical signal supplied to the traction motor includes sampling the first characteristics at a rate that is based on a speed at which the traction motor operates.

In another aspect, the method also includes monitoring second characteristics of the electrical signal supplied to the traction motor during a different, second detection window. The first detection window and the second detection window are associated with different operating conditions of the traction motor. Predicting the mechanical failure includes identifying a failure mode based on which of the first characteristics or the second characteristics are used to predict the mechanical failure.

In another aspect, predicting the mechanical failure includes comparing the one or more signature values to two or more designated thresholds and identifying a degree of predicted failure based on which of the two or more designated thresholds are exceeded by the one or more signature values.

In another embodiment, a system (e.g., a system for predicting mechanical failure of a traction motor in a vehicle) includes a signature generation module and an analysis module. The signature generation module is configured to monitor first characteristics of an electrical signal supplied to a traction motor of a vehicle during a first detection window. The first characteristics represent a first motor electrical signature for the traction motor. The analysis module is configured to determine a first mathematical model of the first motor electrical signal and to derive one or more signature values from the first mathematical model. The analysis module is further configured to predict a mechanical failure of the traction motor based on the one or more signature values.

In another aspect, the first detection window is associated with one or more designated operating conditions of the traction motor and the signature generation module is configured to monitor the characteristics occurs when one or more actual operating conditions of the traction motor exceed the one or more designated operating conditions.

In another aspect, the one or more designated operating conditions include at least one of a designated speed or a designated torque of the actual traction motor and the one or more actual operating conditions include at least one of an actual speed or an actual torque of the traction motor.

In another aspect, the signature generation module is configured to monitor the first characteristics by recording the first characteristics when the one or more actual operating conditions of the traction motor exceed the one or more designated operating conditions. The signature generation module also is configured to disregard the first characteristics when the one or more actual operating conditions of the traction motor does not exceed the one or more designated operating conditions.

In another aspect, the system also includes an input/output (I/O) module configured to generate control signals for transmission to a control subsystem disposed onboard the vehicle to cause the at least one of the actual speed or the actual torque to exceed the at least one of the designated speed or the designated torque associated with the first detection window.

In another aspect, the analysis module is configured to predict the mechanical failure by determining that the traction motor will mechanically fail when the one or more signature values exceed one or more designated thresholds.

In another aspect, the signature generation module is configured to monitor different, second characteristics of the electrical signal supplied to the traction motor. The second characteristics represent a second motor electrical signal for the traction motor. The analysis module can be configured to derive one or more signature values from a second mathematical model of the second motor electrical signature and to combine the one or more signature values from the first mathematical model of the first motor electrical signature with the one or more signature values from the second mathematical model of the second motor electrical signal to form one or more representative signature values. The analysis module can be further configured to predict the mechanical failure by comparing the one or more representative signature values to one or more designated thresholds.

In another aspect, the analysis module is configured to predict the mechanical failure by comparing a set of at least two of the representative signature values to a classification boundary and to identify the mechanical failure as likely to occur if at least one of the representative signature values in the set exceeds the classification boundary.

In another aspect, the analysis module is configured to combine the one or more signature values from the first mathematical model with the one or more signature values from the second mathematical model by combining the one or more signature values from the first mathematical model with the one or more signature values from the second mathematical model to derive the one or more representative signature values. In one embodiment, the combining may include linearly combining the signature values, such as by linearly extrapolating the signature values.

In another aspect, the analysis module is configured to predict the mechanical failure by tracking the one or more signature values over time to determine a trend in the one or more signature values and estimating when the mechanical failure will occur based on the trend.

In another aspect, the signature generation module is configured to monitor the first characteristics of the electrical signal supplied to the traction motor by sampling the first characteristics at a rate that is based on a speed at which the traction motor operates.

In another aspect, the signature generation module is configured to monitor second characteristics of the electrical signal supplied to the traction motor during a different, second detection window. The first detection window and the second detection window can be associated with different operating conditions of the traction motor. The analysis module can be configured to predict the mechanical failure by identifying a failure mode based on which of the first characteristics or the second characteristics are used to predict the mechanical failure.

In another aspect, the analysis module is configured to predict the mechanical failure by comparing the one or more signature values to two or more designated thresholds and to identify a degree of predicted failure based on which of the two or more designated thresholds are exceeded by the one or more signature values.

In another embodiment, another method for a vehicle having plural electric motors is provided. The method includes generating motor electrical signatures for the motors. The motor electrical signatures represent one or more characteristics of electrical energy that is supplied to the motors. Each motor is a same type of motor and includes a same type of bearing as the other motors. The method also includes identifying one or more fault measures of each of the motor electrical signatures. The fault measures are indicative of mechanical characteristics of the bearings of the motors. The method also includes performing a comparison of the one or more fault measures of each motor with the one or more fault measures of the other motors in the same vehicle and predicting a mechanical failure of the bearing of one of the motors based on the comparison.

In another aspect, for each motor, data for generating the motor electrical signatures for the motor is collected only during a detection window when the motor is operating within at least one of a designated speed range or a designated torque range.

In another aspect, predicting the mechanical failure of said one of the motors comprises recording a time series of the motor electrical signals for said one of the motors, extrapolating the time series to determine predicted signature values for said one of the motors, and predicting a remaining lifespan of said one of the motors based on the predicted signature values.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Many other embodiments will be apparent to one of ordinary skill in the art upon reviewing the above description. The scope of the subject matter described herein should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose several embodiments of the inventive subject matter, including the best mode, and also to enable any person of ordinary skill in the art to practice the embodiments disclosed herein, including making and using any devices or systems and performing any incorporated methods. The patentable scope of the subject matter is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

The foregoing description of certain embodiments of the disclosed subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, and the like). Similarly, the programs may be stand alone programs, may be incorporated as subroutines in an operating system, may be functions in an installed software package, and the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the present inventive subject matter are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described systems and methods, without departing from the spirit and scope of the subject matter herein involved, it is intended that all of the subject matter of the above description or shown in the accompanying drawings shall be interpreted merely as examples illustrating the inventive concepts herein and shall not be construed as limiting the disclosed subject matter.

What is claimed is:

1. A method comprising:
monitoring first characteristics of an electrical signal supplied to a traction motor of a vehicle during a first detection window, the first characteristics representing a first motor electrical signature for the traction motor, wherein the first characteristics are monitored as measurements of electric current supplied to the traction motor prior to the electric current reaching the traction motor;
deriving one or more signature values from a first mathematical model of the first motor electrical signature;
predicting a mechanical failure of the traction motor based on the one or more signature values; and
automatically generating a vehicle control signal for changing one or more of tractive effort or braking effort of the vehicle in response to predicting the mechanical failure.

2. The method of claim 1, wherein the first detection window is associated with one or more designated operating conditions of the traction motor and monitoring the characteristics occurs when one or more actual operating conditions of the traction motor exceed the one or more designated operating conditions.

3. The method of claim 2, wherein the one or more designated operating conditions include at least one of a designated speed or a designated torque of the traction motor and the one or more actual operating conditions include at least one of an actual speed or an actual torque of the traction motor.

4. The method of claim 2, wherein monitoring the first characteristics includes recording the first characteristics when the one or more actual operating conditions of the traction motor exceed the one or more designated operating conditions and disregarding the first characteristics when the one or more actual operating conditions of the traction motor does not exceed the one or more designated operating conditions.

5. The method of claim 2, further comprising controlling the traction motor to cause the at least one of the actual speed or the actual torque to exceed the at least one of the designated speed or the designated torque associated with the first detection window.

6. The method of claim 1, wherein predicting the mechanical failure includes determining that the traction motor will mechanically fail when the one or more signature values exceed a designated threshold.

7. The method of claim 1, further comprising:
monitoring different, second characteristics of the electrical signal supplied to the traction motor, the second characteristics representing a second motor electrical signal for the traction motor;
deriving one or more signature values from a second mathematical model of the second motor electrical signature; and
combining the one or more signature values from the first mathematical model of the first motor electrical signature with the one or more signature values from the second mathematical model of the second motor electrical signal to form one or more representative signature values,
wherein predicting the mechanical failure includes comparing the one or more representative signature values to one or more designated thresholds.

8. The method of claim 7, wherein predicting the mechanical failure includes comparing a set of at least two of the representative signature values to a classification boundary and identifying the mechanical failure as likely to occur if at least one of the representative signature values in the set exceeds the classification boundary.

9. The method of claim 7, wherein combining the one or more signature values from the first mathematical model with the one or more signature values from the second mathematical model includes combining the one or more signature values from the first mathematical model with the one or more signature values from the second mathematical model to derive the one or more representative signature values.

10. The method of claim 1, wherein predicting the mechanical failure includes tracking the one or more signature values over time to determine a trend in the one or more signature values and estimating when the mechanical failure will occur based on the trend.

11. The method of claim 1, wherein monitoring the first characteristics of the electrical signal supplied to the traction motor includes sampling the first characteristics at a rate that is based on a speed at which the traction motor operates.

12. The method of claim 1, further comprising monitoring second characteristics of the electrical signal supplied to the traction motor during a different, second detection window, the first detection window and the second detection window associated with different operating conditions of the traction motor, and wherein predicting the mechanical failure includes identifying a failure mode based on which of the first characteristics or the second characteristics are used to predict the mechanical failure.

13. The method of claim 1, wherein predicting the mechanical failure includes comparing the one or more signature values to two or more designated thresholds and identifying a degree of predicted failure based on which of the two or more designated thresholds are exceeded by the one or more signature values.

14. A system comprising:
a signature generation module configured to monitor first characteristics of an electrical signal supplied to a traction motor of a vehicle during a first detection window, the first characteristics representing a first motor electrical signature for the traction motor, wherein the signature generation module is configured to monitor the first characteristics by measuring electric current supplied to the traction motor prior to the electric current reaching the traction motor; and
an analysis module configured to determine a first mathematical model of the first motor electrical signal and to derive one or more signature values from the first mathematical model, wherein the analysis module is further configured to predict a mechanical failure of the traction motor based on the one or more signature values.

15. The system of claim 14, wherein the first detection window is associated with one or more designated operating conditions of the traction motor and the signature generation module is configured to monitor the characteristics occurs when one or more actual operating conditions of the traction motor exceed the one or more designated operating conditions.

16. The system of claim 15, wherein the one or more designated operating conditions include at least one of a designated speed or a designated torque of the traction motor and the one or more actual operating conditions include at least one of an actual speed or an actual torque of the traction motor.

17. The system of claim 15, wherein the signature generation module is configured to monitor the first characteristics by recording the first characteristics when the one or more actual operating conditions of the traction motor exceed the one or more designated operating conditions, the signature generation module also configured to disregard the first characteristics when the one or more actual operating conditions of the traction motor does not exceed the one or more designated operating conditions.

18. The system of claim 15, further comprising an input/output (I/O) module configured to generate control signals for transmission to a control subsystem disposed onboard the vehicle to cause the at least one of the actual speed or the actual torque to exceed the at least one of the designated speed or the designated torque associated with the first detection window.

19. The system of claim 14, wherein the analysis module is configured to predict the mechanical failure by determining that the traction motor will mechanically fail when the one or more signature values exceed a designated threshold.

20. The system of claim 14, wherein the signature generation module is configured to monitor different, second characteristics of the electrical signal supplied to the traction motor, the second characteristics representing a second motor electrical signal for the traction motor,
wherein the analysis module is configured to derive one or more signature values from a second mathematical model of the second motor electrical signature and to combine the one or more signature values from the first mathematical model of the first motor electrical signature with the one or more signature values from the second mathematical model of the second motor electrical signal to form one or more representative signature values, and
wherein the analysis module is further configured to predict the mechanical failure by comparing the one or more representative signature values to one or more designated thresholds.

21. The system of claim 20, wherein the analysis module is configured to predict the mechanical failure by comparing a set of at least two of the representative signature values to a classification boundary and to identify the mechanical failure as likely to occur if at least one of the representative signature values in the set exceeds the classification boundary.

22. The system of claim 20, wherein the analysis module is configured to combine the one or more signature values from the first mathematical model with the one or more signature values from the second mathematical model by combining the one or more signature values from the first mathematical model with the one or more signature values from the second mathematical model to derive the one or more representative signature values.

23. The system of claim 14, wherein the analysis module is configured to predict the mechanical failure by tracking the one or more signature values over time to determine a trend in the one or more signature values and estimating when the mechanical failure will occur based on the trend.

24. The system of claim 14, wherein the signature generation module is configured to monitor the first characteristics of the electrical signal supplied to the traction motor by sampling the first characteristics at a rate that is based on a speed at which the traction motor operates.

25. The system of claim 14, wherein the signature generation module is configured to monitor second characteristics of the electrical signal supplied to the traction motor during a different, second detection window, the first detection window and the second detection window associated with different operating conditions of the traction motor, and
wherein the analysis module is configured to predict the mechanical failure by identifying a failure mode based on which of the first characteristics or the second characteristics are used to predict the mechanical failure.

26. The system of claim 14, wherein the analysis module is configured to predict the mechanical failure by comparing the one or more signature values to two or more designated thresholds and to identify a degree of predicted failure based on which of the two or more designated thresholds are exceeded by the one or more signature values.

27. A method for a vehicle having plural electric motors, the method comprising:
monitoring one or more characteristics of electric current supplied to the motors prior to the electric current reaching the motors;
generating motor electrical signatures for the motors, the motor electrical signatures representative of the one or more characteristics of the electrical current that is supplied to the motors, wherein each motor is a same type of motor and includes a same type of bearing as the other motors;
identifying one or more fault measures of each of the motor electrical signatures, the fault measures indicative of mechanical characteristics of the bearings of the motors;
performing a comparison of the one or more fault measures of each motor with the one or more fault measures of the other motors in the same vehicle;
predicting a mechanical failure of the bearing of one of the motors based on the comparison; and
generating a vehicle control signal to change one or more of tractive effort or braking effort of the vehicle responsive to predicting the mechanical failure.

28. The method of claim 27, wherein for each motor, data for generating the motor electrical signatures for the motor is collected only during a detection window when the motor is operating within at least one of a designated speed range or a designated torque range.

29. The method of claim 27, wherein predicting the mechanical failure of said one of the motors comprises:
recording a time series of the motor electrical signals for said one of the motors;
extrapolating the time series to determine predicted signature values for said one of the motors; and
predicting a remaining lifespan of said one of the motors based on the predicted signature values.

* * * * *